(12) United States Patent
Gabel et al.

(10) Patent No.: US 9,292,262 B2
(45) Date of Patent: Mar. 22, 2016

(54) DYNAMICALLY EVOLVING COGNITIVE ARCHITECTURE SYSTEM BASED ON CONTRIBUTIONS FROM THIRD-PARTY DEVELOPERS

(71) Applicant: VIV LABS, INC., San Jose, CA (US)

(72) Inventors: Mark Gabel, San Jose, CA (US); Christopher Brigham, San Jose, CA (US); Adam Cheyer, San Jose, CA (US); Joshua Levy, San Jose, CA (US)

(73) Assignee: VIV LABS, INC., San Jose, CA (US)

( * ) Notice: Subject to any disclaimer, the term of this patent is extended or adjusted under 35 U.S.C. 154(b) by 0 days.

(21) Appl. No.: 14/509,844

(22) Filed: Oct. 8, 2014

(65) Prior Publication Data

US 2015/0100943 A1 Apr. 9, 2015

Related U.S. Application Data

(60) Provisional application No. 61/888,907, filed on Oct. 9, 2013, provisional application No. 61/917,541, filed on Dec. 18, 2013.

(51) Int. Cl.
| | | |
|---|---|---|
| *G06F 9/44* | (2006.01) | |
| *G06F 17/24* | (2006.01) | |
| *G06F 17/27* | (2006.01) | |
| *G06Q 30/02* | (2012.01) | |
| *G06Q 30/06* | (2012.01) | |

(52) U.S. Cl.
CPC .............. *G06F 8/30* (2013.01); *G06F 17/241* (2013.01); *G06F 17/27* (2013.01); *G06Q 30/02* (2013.01); *G06Q 30/0631* (2013.01)

(58) Field of Classification Search
CPC ............ G06F 17/20; G06F 8/30; G06Q 10/06
USPC ......................................................... 717/106
See application file for complete search history.

(56) References Cited

U.S. PATENT DOCUMENTS

| | | | |
|---|---|---|---|
| 8,776,011 B2 * | 7/2014 | Sharma et al. ................ 717/106 |
| 2005/0160414 A1 * | 7/2005 | Parnanen et al. ............ 717/148 |
| 2007/0255826 A1 | 11/2007 | Billingsley | |
| 2011/0295722 A1 | 12/2011 | Reisman | |
| 2013/0152092 A1 | 6/2013 | Yadgar | |
| 2014/0250428 A1 * | 9/2014 | Marks ........................... 717/126 |
| 2015/0095880 A1 * | 4/2015 | Lee ............................... 717/108 |
| 2015/0135160 A1 * | 5/2015 | Gauvin et al. ................ 717/109 |
| 2015/0205810 A1 * | 7/2015 | Baker et al. .................... 707/737 |

* cited by examiner

*Primary Examiner* — John Chavis
(74) *Attorney, Agent, or Firm* — Dergosits & Noah LLP; Todd A. Noah

(57) ABSTRACT

A dynamically evolving cognitive architecture system based on contributions from third-party developers is described. A system receives a span of natural language annotated with an object from a first third-party developer. The system forms an intent based on a user input, which includes a natural language span which corresponds to an action object, a first concept object, and/or a second concept object. The action object, the first concept object, and/or the second concept object is provided by a second third-party developer. The annotating object is the action object, the first concept object, or the second concept object. Forming the intent enables executing the action object to transform the first concept object into the second concept object based on the annotated span of natural language, and also enables outputting a value associated with the second concept object associated with a goal of the intent.

20 Claims, 32 Drawing Sheets 402      400
Tokens:                    What  wine  goes  well  with  chicken  parmesan?
Value matches:
Route matches:

| Value labels | Route labels | Goal labels |
|---|---|---|
| 1.000 Ou | 0.883 Be wine.WineRecommendation | 0.883 Be wine.WineRecommendation |
|  | 0.083 Ou | 0.033 In food.FindIngredient |
|  | 0.033 food.FindIngredient | 0.017 In air.FindAirplaneSeat |
|  |  | 0.017 In air.FindAirCarrierCode |
|  |  | 0.017 In air.FindAirCarrier |
|  |  | 0.017 In movie.MovieListing |
|  |  | 0.017 In stock.Volume |

Interpretation 1
0.804 Overall Confidence
1.000 Coverage
0.966 Contained Match Confidence     source: menu.MenuItemName (chicken parmesan)
0.250 Plan Simplicity
1.000 Signal Satisfaction           FIG. 4

700

Paste some aligned or unaligned utterances here (quotes optional)

Where can I park near the White House?

Where can I park[v:biz.BusinessCategory] {near (the White House)[v:biz.BusinessName: "White House'])} [g:geo.GeoRegion]?

Tokens: Where can I    park           near the White House ?
Values:                biz.BusinessCategory        biz.BusinessName
                       Canonical form              "White House"
Routes:
Sub-plans:                                         geo.GeoRegion Current NL parse for "Where can I park near the White House ?"
Tokens:        Where can I    park    near the White House?
Value matches:                Business        BusinessName
Sub-plan matches:             GeoRegion

Paste some aligned or unaligned utterances here (quotes optional)

What's a good place to park near the White House?

What's a good place [r:food.Restaurant] to park (near (the White House)[v:biz.BusinessName: "White House']} [g:geo.GeoRegion]?

Tokens: What's a good     place     to park near the White House ?
Values:                                                                biz.BusinessName "White House"
Routes:              Route:Food.Restaurant
Sub-plans:                                  geo.GeoRegion Current NL parse for "What's a good place to park near the White House ?"
Tokens:       What's a good     place    to park near the White House?
Value matches:                                    BusinessName
Route matches:           Restaurant
Sub-plan matches:                         GeoRegion

Paste some aligned or unaligned utterances here (quotes optional)

What's a good place to park near the White House?

What's a (goodplace)[r:biz.Business] to park[v:biz.BusinessCategory] (near (the White House)[v:biz.BusinessName: "White House"]] [g:geo.GeoRegion]?

Tokens: What's a good place    to    park    near the White House ?
Values:     biz.BusinessCategory    biz.BusinessName "White House"

Routes:
Sub-plans:     geo.GeoRegion

Current NL parse for "What's a good place to park near the White House ?"
Tokens:    What's a good place to    park    near the White House?
Value matches:    Business    BusinessName
Route matches:
Sub-plan matches:    GeoRegion

```
model/geo.GeoRegion.model.6t x
1 structure (geo.GeoRegion) {
2   property (centroid) {
3     type (geo.GeoPoint)
4   }
5 }
```

```
model/geo.CityRegion.model.6t x
1 structure (geo.CityRegion) {
2   extends (geo.GeoRegion)
3   property (city) {
4     type (geo.CityName)
5     min-cardinality (Required)
6   }
7   property (country) {
8     type (geo.Country)
9   }
10  property (postalCode) {
11    type (geo.PostacalCode)
12    max-cardinality (Many)
13  }
14  property (state) {
15    type (geo.State)
16  }
17 }
```

```
model/geo.CityName.model.6t x
1 primitive (geo.CityName) {
2   type (String)
3   extends (entity.Name)
4 }
```

```
model/money.Price.model.6t x
1 structure (money.Price) {
2   constructible (true)
3   extends (money.Currency)
4 }
```

```
model/stock.PricePerShare.model.6t x
1 structure (stock.PricePerShare) {
2   extends (money.Price)
3 }
```

1502

```
model/food.FindRestaurant.model.6t x
1 action (food.FindRestaurant) {
2   input (address) {
3     type (geo.GeoRegion)
4     min-cardinality (Required)
5   }
6   input (booleanAttribute) {
7     type (food.BooleanAttribute)
8     max-cardinality (Many)
9   }
10  input (menuItem) {
11    type (menu.MenuItemName)
12  }
13  input (name) {
14    type (food.ReastaurantName)
15  }
16  input (restuarantStyle) {
17    type (food.RestaurantStyle)
18  }
19  output (food.Restaurant)
20 }
```

```
dialog/geo.dialog.6t x (Saved 19:34:06)
1 template (labelOne) {
2 pattern {
3 at (geo.CityName)
4 }
5 expression (city.name)
6 }
7
8 template (labelMany) {
9 pattern {
10 at (geo.CityName)
11 }
12 expression (city.names)
13 }
14
15 template (input) {
16 pattern {
17 at (geo.GeoPoint)
18 }
19 expression("at $(value,latitude.value)" latitude,
    $ (value,longitude.value)" longitude")
20 }
21
22 template (paraphrase) {
23 pattern {
24 source (geo.CityRegion)
25 at (geo.CountryName)
26 }
27 pattern {
28 source (geo.StateRegion)
29 at (geo.Countryname)
30 }
31 pattern {
32 source (geo.PostalRegion)
33 at (geo.CountryName)
34 }
35 pattern {
36 source (geo.CityRegion)
37 at (geo.StateName)
```

```
38 }
39 pattern {
40   source (geo.Postal Region)
41   at (geo.StateName)
42 }
43 pattern {
44   source (geo.PostalRegion)
45   at (geo.CityName)
46 }
47 expression ("$ (this.made ('labelMany' )) with $
     (source. model('paraphrase'))"
48 }
49
50 template (paraphrase) {
51 pattern {
52   at (geo.GetCityRegionByName)
53 }
54 Expression ("cities named ${input.city } [in $
     {input.state} $ (input.country}])")
55 }
```

1602 →

```
dialog/stock.dialog.model.6t x
1 template (labelOne) {
2 pattern {
3   at (stock.StockInfo)
4 }
5 expression (stock.data)
6 }
7
8 template (labelMany)
9 pattern {
10   at (stock.StockInfo)
11 }
12 expression (stock.datasheets)
13 }
```

FIG. 16B

1700 

```
equiv/sample.equiv.6t (Saved 19:40:07) X
1 equivalence (biz.Business) {
2  and-maybe {
3   convertible-concepts
4     equivalent-values (name)
5     equivalent-values (address)
6   }
7 }
8
9 equivalence (food.Restaurant) {
10 and-maybe {
11  convertible-concepts
12    equivalent-values (name)
13    equivalent-values (address)
14  }
15 }
16
17 equivalence (food.Restaurant) {
18    fuzzy-string-equality {
19        trueTolearnace(0.9)
20        uncertainTolerance(0.7)
21    }
22 }
23
24 equivalence (geo.GeoPoint) {
25  and {
26    fuzzy-numeric-equality(latitude) {
27        trueTolearnace(0.00005)
28        uncertainTolerance(0.005)
29    }
30    fuzzy-numeric-equality(longiitude) {
31        trueTolearnace(0.005)
32        uncertainTolerance(0.005)
33    }
34  }
35 }
36
```

FIG. 17

DYNAMICALLY EVOLVING COGNITIVE ARCHITECTURE SYSTEM BASED ON CONTRIBUTIONS FROM THIRD-PARTY DEVELOPERS

CLAIM OF PRIORITY

This application claims the benefit of U.S. Provisional Patent Application 61/888,907 entitled, INTERACTIVE COMPONENTS OF A COGNITIVE ARCHITECTURE FOR DYNAMICALLY EVOLVING SYSTEMS by Bastea-Forte, et al., filed Oct. 9, 2013; and U.S. Provisional Patent Application 61/917,541 entitled, QUALITY AND MARKETPLACE MECHANISMS FOR A COGNITIVE ARCHITECTURE FOR DYNAMICALLY EVOLVING SYSTEMS by Bastea-Forte, et al., filed Dec. 18, 2013, the entire contents of which are all incorporated herein by reference.

BACKGROUND

Some consumers and enterprises may desire functionality that is the result of combinations of services available on the World Wide Web or "in the cloud." Some applications on mobile devices and/or web sites offer combinations of third-party services to end users so that an end user's needs may be met by a combination of many services, thereby providing a unified experience that offers ease of use and highly variable functionality. Most of these software services are built with a specific purpose in mind. For example, an enterprise's product manager studies a target audience, formulates a set of use cases, and then works with a software engineering group to code logic and implement a service for the specified use cases. The enterprise pushes the resulting code package to a server where it remains unchanged until the next software release, serving up the designed functionality to its end user population.

BRIEF DESCRIPTION OF THE DRAWINGS

FIG. 4 illustrates an example set of inferences for a token of a given end user query for a dynamically evolving cognitive architecture system based on contributions from third-party developers, under an embodiment;

FIG. 7 illustrates an example user interface for third-party developers for a dynamically evolving cognitive architecture system based on contributions from third-party developers, under an embodiment;

FIG. 8 illustrates another example user interface for third-party developers for a dynamically evolving cognitive architecture system based on contributions from third-party developers, under an embodiment;

FIG. 10 illustrates another example user interface for third-party developers for a dynamically evolving cognitive architecture system based on contributions from third-party developers, under an embodiment;

FIG. 15 illustrates a block diagram of example object representations for a dynamically evolving cognitive architecture system based on contributions from third-party developers, under an embodiment;

FIGS. 16A and 16B illustrate a block diagram of example dialog templates for a dynamically evolving cognitive architecture system based on contributions from third-party developers, under an embodiment;

FIG. 17 illustrates a block diagram of an example description of an equivalence policy for a dynamically evolving cognitive architecture system based on contributions from third-party developers, under an embodiment;

DETAILED DESCRIPTION

Embodiments herein provide dynamically evolving cognitive architecture systems based on contributions from third-party developers. At a minimum, the system functions with one action object and two concept objects. For example, the system forms an intent based on a user input and creates a plan based on that intent. The plan includes a first action object that transforms a first concept object associated with the intent into a second concept object. The plan further includes a second action object that transforms the second concept object into a third concept object associated with a goal of the intent. The first action object and the second action object are selected from multiple action objects. The system executes the plan, and outputs a value associated with the third concept object.

Figure 1:
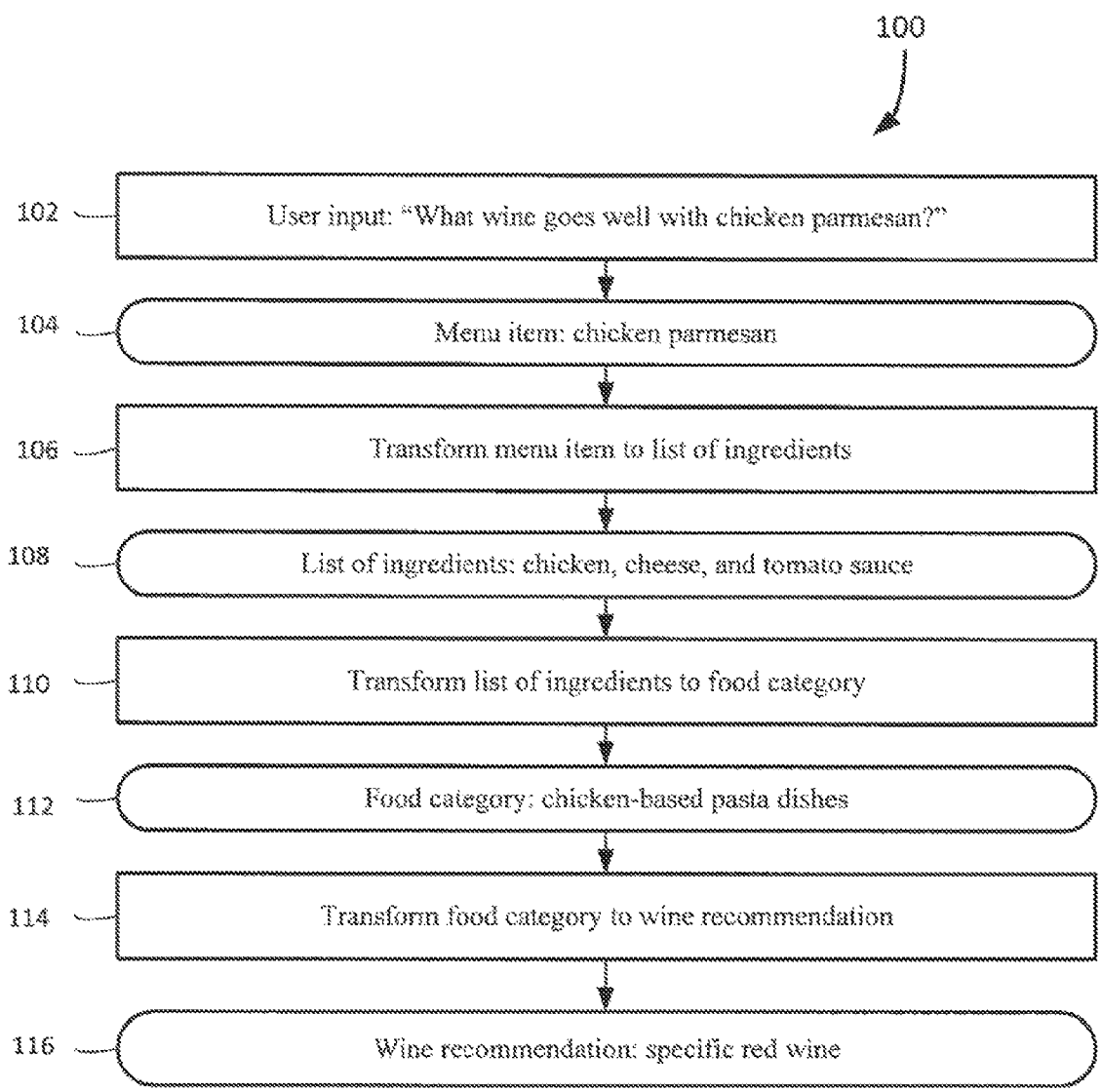
FIG. 1 illustrates a block diagram of an example plan created by a dynamically evolving cognitive architecture system based on contributions from third-party developers, under an embodiment.

FIG. 1 illustrates a block diagram of an example plan 100 created by a dynamically evolving cognitive architecture system based on contributions from third-party developers, in which action objects are represented by rectangles and concept objects are represented by ovals. User input 102 indicates that a user inputs "What wine goes well with chicken parmesan?" to the system. The system forms the intent of the user as seeking a wine recommendation based on a concept object 104 for a menu item, chicken parmesan. Since no single service provider offers such a use case, the system creates a plan based on the user's intent by selecting multiple action objects that may be executed sequentially to provide such a specific recommendation service. Action object 106 transforms the concept object 104 for a specific menu item, such as chicken parmesan, into a concept object 108 list of ingredients, such as chicken, cheese, and tomato sauce. Action object 110 transforms the list of ingredients concept object 108 into a concept object 112 for a food category, such as chicken-based pasta dishes. Action object 114 transforms the food category concept object 112 into a concept object 116 for a wine recommendation, such as a specific red wine, which the system outputs as a recommendation for pairing with chicken parmesan. Even though the system has not been intentionally designed to create wine recommendations based on the name of a menu item, the system is able to intelligently synthesize a way of creating such a recommendation based on the system's concept objects and action objects. Although FIG. 1 illustrates an example of a system creating a single plan with a linear sequence that includes three action objects and four concept objects, the system creates multiple plans each of which may include any combination of linear sequences, splits, joins, and iterative sorting loops, and any number of action objects and concept objects. Descriptions below of FIGS. 4, 5, and 6 offer examples of multiple non-linear plans with splits, joins, and other numbers of action objects and concept objects.

In a dynamically evolving cognitive architecture system based on contributions from third-party developers, the full functionality is not known in advance and is not designed by any one developer of the system. While some use cases are actively intended by developers of the system, many other use cases are fulfilled by the system itself in response to novel user requests. In essence, the system effectively writes a program to solve an end user request. The system is continually taught by the world via third-party developers, the system knows more than it is taught, and the system learns autonomously every day by evaluating system behavior and observing usage patterns. Unlike traditionally deployed systems, which are fixed in functionality, a dynamically evolving cognitive architecture system based on contributions from third-party developers is continually changed at runtime by a distributed set of third-party developers from self-interested enterprises around the globe. A third-party developer is a software developer entity that is independent of the dynamically evolving cognitive architecture system, independent of the end users of the dynamically evolving cognitive architecture system, and independent of other third-party developers.

Third-party developers provide the system with many types of objects through a set of tools, editors, and other mechanisms. These objects include concept objects that are structural definitions representing entities in the world. These objects also include action objects, which are similar to Application Programming Interfaces (APIs) or web service interfaces that define a set of concept object input dependencies, perform some computation or transaction, and return a set of zero or more resulting concept object values. These objects also include functions, which define specific logic that implement an action object interface created by a self-interested party, and monitors, which are specific types of action objects and associated functions that allow external services to keep track of the world, looking for certain conditions. Once the conditions become true, associated action objects are injected into the system for execution.

These objects additionally include tasks, for which a third-party developer specifies groupings of particular inference chains of action objects that make up an action object in a hierarchical way, and data, which provides instantiations of concept objects, such as product catalogs, business listings, contact records, and so forth. The objects further include linguistic data because there are many ways to interact with the system. Third-party developers may add new vocabulary, synonyms, and linguistic structures to the system that the system maps to concept objects and action objects to support the use case where natural language input is involved. The objects additionally include dialog and dialog templates provided by third-party developers, which contains all output strings and logic the system requires to communicate ideas back to the end user, either through visual interfaces or through eyes-free interfaces, and layout templates provided by third-party developers, which describe visually how the system presents information on a variety of devices. The objects may also include delight nuggets, which are domain oriented logic that enables the system to respond to situations in a way that surprises and delights an end user, providing additional information or suggestions that please and help the end user.

Third-party developers provide these new concepts, actions, data, monitors, and so forth to the system, in a self-interested way, with the intent of making available certain new capabilities with which an end user may interact. As each new capability is added to the system, an end user may access the new functionality and may do more than the end user was capable of doing before. The system knows more than it is taught, meaning that if a third-party developer adds ten new capabilities, the system will, through dynamic combinations of services, be able to do far more than ten new things. Given a request from an end user, the system, in a sense, writes automatic integration code that links individual capabilities into new dynamic plans that provide value for the end user.

Figure 2:
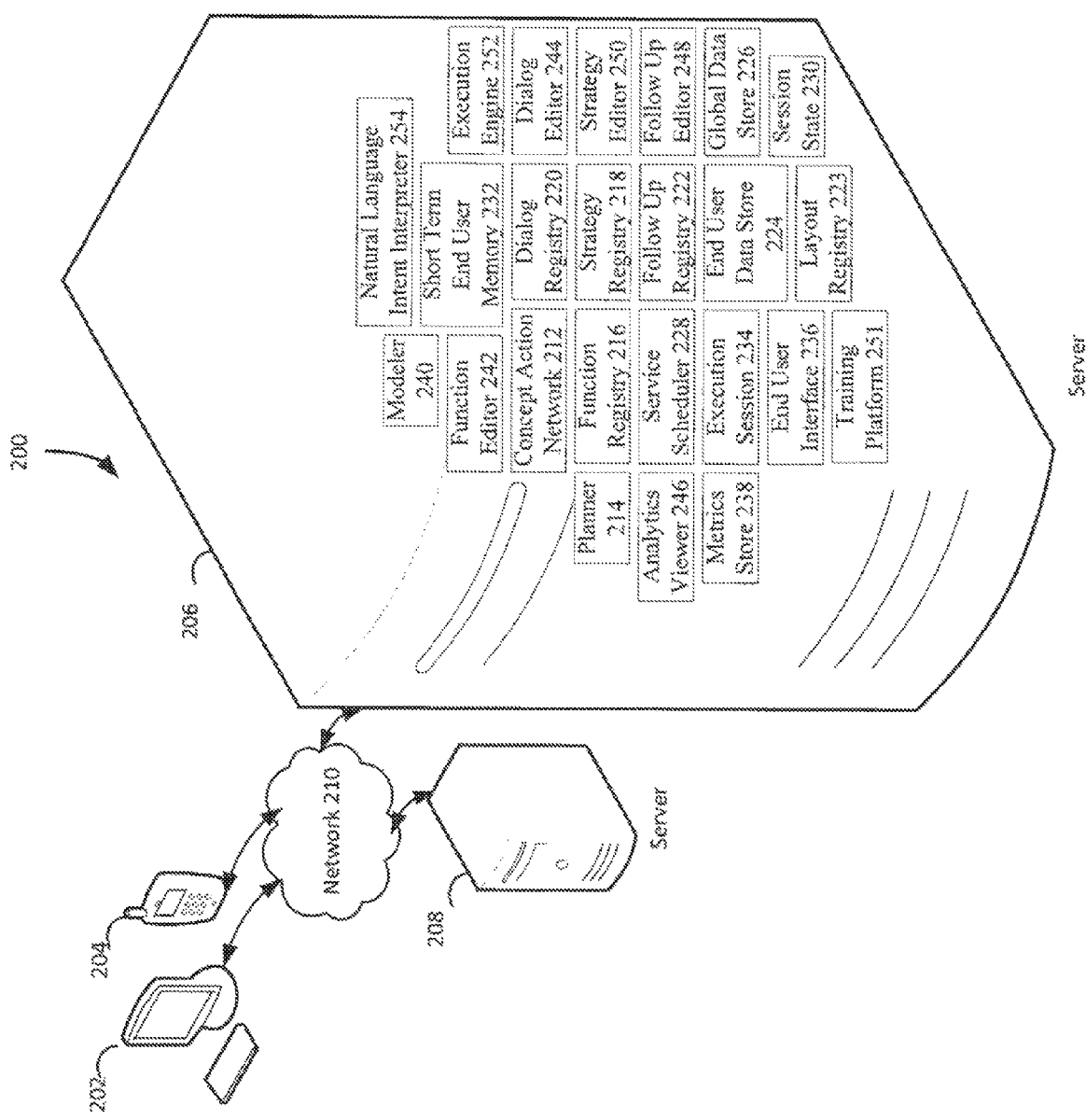
FIG. 2 illustrates a block diagram of an example dynamically evolving cognitive architecture system based on contributions from third-party developers, under an embodiment.

FIG. 2 illustrates a block diagram of a dynamically evolving cognitive architecture system 200 based on contributions from third-party developers, under an embodiment. As shown in FIG. 2, the system 200 may illustrate a cloud computing environment in which data, applications, services, and other resources are stored and delivered through shared data-centers and appear as a single point of access for the end users. The system 200 may also represent any other type of distributed computer network environment in which servers control the storage and distribution of resources and services for different client users.

In an embodiment, the system 200 represents a cloud computing system that includes a first client 202, a second client 204, and a first server 206 and a second server 208 that may be provided by a hosting company. The clients 202-204 and the servers 206-208 communicate via a network 210. The first server 206 includes components 212-254 in an embodiment.

Although FIG. 2 depicts the system 200 with two clients 202-204, two servers 206-208, and one network 210, the system 200 may include any number of clients 202-204, any number of servers 206-208, and/or any number of networks 210. The clients 202-204 and the servers 206-208 may each be substantially similar to the system 1800 depicted in FIG. 18 and described below. FIG. 2 depicts the system components 212-254 residing completely on the first server 206, but the system components 212-254 may reside completely on the first server 206, completely on the second server 208, completely on the clients 202-204, completely on another server that is not depicted in FIG. 2, or in any combination of partially on the servers 206-208, partially on the clients 202-204, and partially on the other server.

One of the server components may include a concept action network 212. A concept action network 212 is the schema for the present capabilities and knowledge of the system 200, and a structured collection of known types fortified with atomic actions on those types. The concept action network 212 organizes and facilitates the interoperating execution of Internet enabled services, and may be represented as a mathematical graph with constraints defining its structure. Third-party developers may interact with the concept action network 212 by extending the concept action network 212 with new concept objects, new action objects, and new implemented services. End users may interact with the concept action network 212 to accomplish end user tasks.

An Internet enabled service is a collection of functional interfaces to data retrievals, such as a local business search or querying a shopping cart, nontrivial computations, such as computing a symbolic integral, and real world actions, such as booking a reservation at a hotel or turning on a light in a smart enabled home. These functional interfaces are exposed to the public Internet via well-defined interfaces using standard protocols. When depicted as a mathematical graph, the concept action network 212 consists of nodes and edges. These nodes in a concept action network 212 include concept objects and action objects. A concept object is a model of a real world entity, such as a restaurant, or coupling thereof, such as a reservation, with a restaurant and a time. An action object is a model of an atomic unit of work that declares its external dependencies as input concept objects and produces a predetermined type of output concept object. The concept action network 212 may catalog similar Internet enabled services under a common schema, providing interoperability. The concept action network 212 may be depicted as a well-defined, strongly-typed mathematical graph structure that defines precisely a space of known capabilities.

The server 206 may also include a planner 214 component. When provided with an intent, a planner 214 produces a static plan of execution, which is a collection of input signals and a goal representing the semantics of an end user's desired task or step. A plan is a directed and acyclic coupling of concept action network nodes. Being directed and acyclic ensures that the plan is executable and that every step in the plan makes progress to the goal. Plans may include multiple instances of concept action network nodes, such as two distinct businesses in the case that one task includes, as a component, another task of finding the nearest coffee shop to the nearest movie theater. The planner 214 also revises plans when dynamic execution deems necessary.

The server 206 may include several registry components. A function registry 216 maps function values to action objects. Function values bundle declarative metadata about some action implementation with an invokable endpoint. A strategy registry 218 is a registry of selection strategies and instantiation strategies, both of which are used to satisfy the cardinality constraints of action inputs without bothering the end user. Strategies are keyed off the execution context in which they apply. A dialog registry 220 is a registry of dialog templates, keyed off the execution context in which they apply and guarded by additional dynamic context triggers. A follow up registry 222 is a registry of follow up plan intents/goals, used to suggest follow up actions to an end user under specific situations. Entries in the follow up registry 222 are also keyed off the execution context in which they apply and guarded by additional dynamic context triggers. A layout registry 223 stores third-party developer layout descriptions which the system 200 uses for rendering outputs based on concept object values to be rendered, such as the example of the wine recommendation described in FIG. 1.

An end user data store 224 is an end user specific storage of preferences and instrumented usage data, used to store both the raw data about decisions an end user makes and official/explicit preferences. A global data store 226 is a cross-user storage of default preferences and aggregate usage data that is updated in batches offline from end user specific data. A service scheduler 228 determines the order in which services will be called for a particular action invocation. The service scheduler 228 balances the cost and quality of each service to maximize precision and recall. A session state 230 is the state for a specific session of execution. A short term end user memory 232 is made up of recently completed plans and currently interrupted plans that are pending additional input.

An execution session 234 is a place for data, which is usually ephemeral, which an execution engine 252 uses. For example, as a plan executes the wine recommendation example in FIG. 1, the execution engine 252 stores the intermediate food classification concept object values in the execution session 234. An end user interface 236 is the user's view into the system 200 and associates an end user with an execution session. The end user interface 236 enables the end user's intent to be elicited at each step of interaction. A metrics store 238 is a data store housing all the raw, end user agnostic runtime data, such as service invocation attempts, successes, failures, latency, overhead, dialog selection counts and rendering overhead, end user request counts and overhead, and strategy selection counts and overhead, etc.

The server 206 will also include developer tools 240-251 in an embodiment. Developer tools 240-251 are a set of editors, debuggers, etc. that enable creation and updating of the data supporting the runtime environment. A modeler 240 creates and updates concept objects, such as updating primitive and structured types, and action objects, such as updating input/output/metadata schema definitions. A function editor 242 creates and updates provider specific implementations of action objects, which may involve writing some code in a sandboxed scripting language that may be partially generated and validated against action objects. A dialog editor 244 creates and updates dialog scripts that specify output messaging and logic for various aspects of the system 200, which, in an embodiment, likely involves a simple templating language with conditional code, variables, etc. An analytics viewer 246 provides insight into the data stored in the metrics store and generates reports, which may include things like performance time of various components over time, domain distribution of end user requests, and speed and success performance analytics for service providers, etc. A follow up editor 248 associates follow up goals with a contextual trigger in which the follow up goals should become active and recommended to an end user. A follow up trigger may evaluate the execution context that led to the current goal, user preferences, or environmental conditions. A strategy editor 250 writes instantiation strategies and selection strategies in a sandboxed scripting language and registers those strategies with the appropriate context in which they should be triggered. A training platform 251 facilitates a general workflow for adding, editing, and deleting training examples.

In an embodiment, the server 206 will include the execution engine 252 that interacts with nearly all components of the dynamically evolving cognitive architecture system 200 based on contributions from third-party developers. For example, the execution engine 252 weaves together the end user intent with the planner 214, strategy registry 218, dialog registry 220, end user data store 224, function registry 226, and session state 230 to set up and complete tasks. The execution engine 252 also handles interrupted tasks and resumes interruptions when more data is elicited. The execution engine 252 is instrumented, which allows the execution engine 252 to collect dynamic data like end user preferences and the success rates of using particular services. When action object preconditions are not met, the execution engine 252 may dynamically adapt and/or interactively elicit feedback from an end user in order to continue with new information. Furthermore, the execution engine 252 intelligently schedules evaluation of services within the execution order semantics. When parallel or alternative paths exist in an executable plan, the execution engine 252 dynamically determines whether to proceed along one or more paths or whether to prompt for additional end user input before proceeding. These determinations are made from a variety of sources, including past result precision, recall, performance, and both global and local user feedback.

A natural language intent interpreter 254 provides a flexible platform for inferring intent structures from natural language queries. The natural language intent interpreter 254 allows the consideration of multiple sources of data, including, but not limited to, modeled vocabulary via exact and approximate language agnostic-matching, implicitly gathered usage data, such as popularity measurement, explicitly annotated training data via machine learning, and contextual data, such as an end user's current location. Additionally, the natural language intent interpreter 254 is dynamically reactive to both the upstream producers, such as speech recognizers, and downstream consumers, such as planners and executors, of its data.

Furthermore, the natural language intent interpreter 254 is a flexible framework for handling a deep vertical integration between the concept action network 212 and all producers and interpreters of natural language. Also, the natural language intent interpreter 254 acts as a conduit through which, for example, a normally "black box" speech recognizer may access concept action network level usage data or relationships to function more accurately. Similarly, the natural language intent interpreter 254 leverages concept action network level information through its clients, such as the planner 214, a downstream consumer of the natural language intent interpreter 254, to function more quickly and accurately. The planner 214, in turn, may access internal metadata from either the natural language intent interpreter 254 itself or its upstream producers, such as a speech recognizer. Speech recognition is facilitated by concept action network specific natural language models, which are in turn bolstered with data generated from concept action network specific planning algorithms, which are tuned and guided by dynamic execution data.

The ability of the natural language intent interpreter 254 to interpret human natural language is guided by data through a process called training. Training is collaborative in that the contributions of multiple third-party developers are used simultaneously to teach the system 200 to understand language, dynamic in that new contributions are added instantly and online while removals or updates of existing contributions are reflected instantly and online as well, and interactive in that several normally intangible effects of contributions, such as their utility, their correctness, or their consistency, are made visible to contributors instantly and online throughout the training process. The system 200 joins the contributions of multiple third-party developers as a dynamic interoperating system in which all components work together to service user requests. Training is a form of contribution that drives the natural language intent interpreter 254.

The natural language intent interpreter 254 may interact with an end user through dialog. Dialog is modeled declaratively and may consist of a string template of dialog content, possibly including dependent references to other dialog declarations or runtime values, the general phase of execution in which the template applies, such as before an action evaluation, accompanying a selection prompt, or at a successful result view, the specific execution context in which the template applies, such as a restaurant, the PhoneNumber projected from an EventVenue, and the GeoRegion constraint to the FindBusiness action, zero or more contextual conditions, such as input/output modality, time of day, location, user preferences, or previous usage history. The system 200 abstracts the details of selection and presentation from end users and third-party developers, taking into account past renderings, the active output modality, user preferences, and information coverage/gain, amongst other things.

Figure 3:
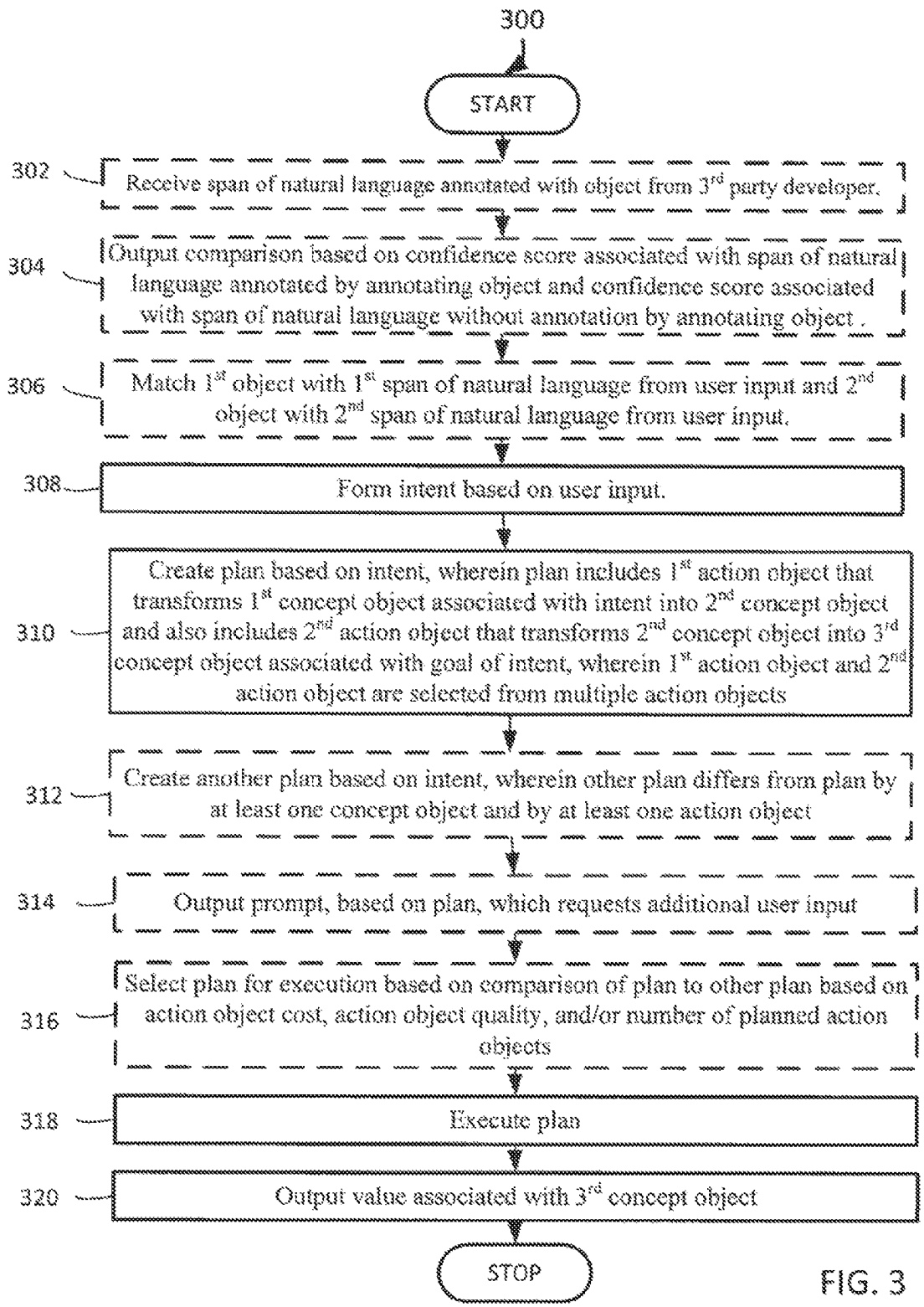
FIG. 3 is a flowchart that illustrates a method for a dynamically evolving cognitive architecture system based on contributions from third-party developers, under an embodiment.

FIG. 3 is a flowchart that illustrates a method for a dynamically evolving cognitive architecture system based on contributions from third-party developers, under an embodiment. Flowchart 300 illustrates method acts illustrated as flowchart blocks for certain steps involved in and/or between the clients 202-206 and/or the servers 206-208 of FIG. 2.

A span of natural language annotated with an object is optionally received from a third-party developer, block 302. For example and without limitation, this may include the training platform 251 receiving a query "What wine goes well with chicken parmesan" containing the annotation of natural language span "What wine goes well with" with the concept object 116 for a wine recommendation from a third-party developer who developed the concept object 116, and containing an annotation of the natural language span "chicken parmesan" with the concept object 104 for a menu item from a different third-party developer who did not develop either the concept object 116 or the concept object 104.

A comparison based on a confidence score associated with a span of natural language annotated by an annotating object and a confidence score associated with the span of natural language without annotation by the annotating object is optionally output, block 304. By way of example and without limitation, this may include the training platform 251 outputting the phrase "well learned" to the third-party developer who annotated "chicken parmesan" with the concept object 104 for a menu item. The training platform 251 outputs "well-learned" because the natural language intent interpreter 254 was able to recognize "chicken parmesan" as a menu item based on a 0.960 matching confidence score (normalized between zero and one) when "chicken parmesan" is not annotated with the concept object 104 for a menu item, and the natural language intent interpreter 254 was able to recognize "chicken parmesan" as a menu item based on a 0.966 matching confidence score when "chicken parmesan" is annotated with the concept object 104 for a menu item.

The relatively small increase in the confidence score indicates that the natural language intent interpreter 254 has already learned well how to recognize menu items. The output of "well learned" to the third-party developer enables the third-party developer to use training time more efficiently on training examples that are not already well learned rather than on training examples that are already well learned.

In another example, the training platform 251 outputs "add more like this" because in the absence of the annotated query, the natural language intent interpreter 254 was able to properly recognize "What wine goes well with" as a wine recommendation based on a 0.960 matching confidence score when "What wine goes well with" is not annotated with the concept object 116 for a wine recommendation, but the natural language intent interpreter 254 incorrectly recognizes "Chicken Parmesan" not as a dish, but rather two Ingredient concept objects 116, "Chicken" and "Parmesan", with a low confidence of 0.250. The incorrect interpretation coupled with the low confidence scores indicate that the natural language intent interpreter 254 needs more training examples to learn well how to recognize dishes, or more specifically, recognize dishes referred to in the context of requests for wine recommendations. The output of "add more like this" to the third-party developer enables the third-party developer to use training time more efficiently on training examples that are not already well learned rather than on training examples that are already well learned.

The natural language intent interpreter 254 may generate the confidence scores for comparisons in any order. For example, the natural language intent interpreter 254 generates a confidence score for a span of natural language without an annotating object, the training platform 251 annotates the span of natural language with the annotating object, the natural language intent interpreter 254 generates a confidence score for the span of natural language with the annotating object, and then the training platform 251 compares the two scores and outputs a comparison based on the scores. In another example, the training platform 251 annotates a span of natural language with an annotating object, the natural language intent interpreter 254 generates a confidence score for the span of natural language with the annotating object, the training platform 251 temporarily removes the annotation of the span of natural language with the annotating object, the natural language intent interpreter 254 generates a confidence score for the span of natural language without the annotating object, and then the training platform 251 compares the two scores and outputs a comparison based on the scores.

A first object is optionally matched with a first span of natural language from a user input and a second object is optionally matched with a second span of natural language from the user input, block 306. In embodiments, this may include the natural language intent interpreter 254 matching the span of natural language "What wine goes well with" with the concept object 116 for a wine recommendation based on a 0.883 matching confidence score and matching the span of natural language "chicken parmesan," with the concept object 104 for a menu item based on a 0.966 matching confidence score, where each of the confidence scores are greater than a matching threshold required to identify a match. While the natural language intent interpreter 254 matches spans of natural language in the user input to objects in the concept action network 212 during a recognition phase, the natural language intent interpreter 254 may need to leverage the planner 214 during an understanding phase to create an plan based on objects in the concept action network 212 which are not directly identified from spans of natural language in the user input.

An intent is formed based on a user input, block 308. For example and without limitation, this may include the natural language intent interpreter 254 responding to a user saying "What wine goes well with chicken parmesan?" by forming an intent as a wine recommendation based on the concept object 104 for a menu item, chicken parmesan. Forming the intent may associate user data in the user input with a concept object, such as associating the user saying "chicken parmesan" with the concept object 104 for a specific menu item, such as chicken parmesan. The concept action network 212 provides the ability to represent an end user query, or task specification, in a format amenable to automated reasoning and automated satisfaction/servicing. The concept action network 212 enables queries and tasks from potentially many input sources to be represented in a single mathematical structure that does not contain natural language or other potentially ambiguous constructs. Below is an example of an unambiguous intent expressed in terms of a concept action network 212.

```
1  intent {
2      goal:phone.PhoneCall
3      value:biz.BusineesCategory (Pharmacy)
4      value:biz.BusinessName(CVS)
5      value:geo.PostalCode (95112)
6  }
7
```

The system 200 forms intents from concept action network elements, such as concept objects and action objects, based on their significance to the task at hand, and these objects may be instantiated with known data values that may aid in accomplishing the task. The system 200 annotates an intent as a source signal and a goal, the collection of which forms an intent. Signals are a formalization of "what user data does the user provide," and a goal is likewise a formalization of "what does the user want to accomplish." An intent is an unambiguous, mathematical representation of these formalizations. Given a concept action network 212 and an intent, the planner 214 may automatically reason about the existence of a sequence of concept action network prescribed steps that may service an intent. These steps of sequences produced by planning are denoted as plans, or programs for the concept action network 212 that, when executed with respect to the execution semantics, satisfies the goal within an end user's intent.

A first plan is created based on an intent, wherein the first plan includes a first action object that transforms a first concept object associated with the intent into a second concept object and also includes a second action object that transforms the second concept object into a third concept object associated with a goal of the intent, wherein the first action object and the second action object are selected from multiple action objects, block 310. By way of example and without limitation, this may include the planner 214 creating a plan based on the intent by selecting the action objects 106, 110, and 114 from multiple action objects in the concept action network 212 because the planner 214 determines that no single action object exists which can transform the concept item 104 for a menu item into the concept object 116 for a wine recommendation.

Therefore, during the understanding phase the natural language intent interpreter 254 may leverage the planner 214 to efficiently create a plan by beginning with the goal of the intent and working backwards based on what is needed for each previous stage of the plan. This process of creating a plan may raise or lower the overall confidence in the interpretation of a query, in that the existence of a sensible and coherent plan may raise confidence and the lack thereof may lower it. For example, since the natural language intent interpreter 254 identifies the concept object 116 for a wine recommendation as the goal of the intent, the planner 214 identifies inputs needed for the concept object 116 as concept objects corresponding to a food category, a drink type, and a cuisine style. At this point the planner 214 understands that the concept object 112 for a food category identifies needed inputs which include the concept object 108 for a list of ingredients, and understands that the concept object 104 for a menu item may be transformed by the action object 106 into the same concept object 108 for a list of ingredients. Therefore, the planner 214 creates a plan in which the action object 106 transforms the concept object 104 for a specific menu item, such as chicken parmesan, into the concept object 108 for a list of ingredients, such as chicken, cheese, and tomato sauce; the action object 110 transforms the list of ingredients concept object 108 into the concept object 112 for a food category, such as chicken-based pasta dishes; and the action object 114 transforms the food category concept object 112 into a concept object 116 for a wine recommendation, such as a specific red wine. Although this example describes the planner 214 creating a plan by beginning with the goal of the intent and working backwards based on what is needed for each previous stage of the plan, the planner 214 may also create a plan by beginning with the intent and working forwards to the goal of the intent based on what is needed for each succeeding stage of the plan.

The concept object 104 may include data which provides instantiations of a concept object for a specific menu item, such as chicken parmesan, the concept object 108 may include data that provides instantiations of a concept object for a list of ingredients, such as chicken, cheese, and tomato sauce, and the concept object 112 may include data that provides instantiations of a concept object for a food category, such as chicken-based pasta dishes. Different third-party developers may have provided each of the concept objects 104, 108, 112, and 116, and the action objects 106, 110, and 114 to the concept action network 210 because the system 200 provides interoperability between the objects 104-116.

Creating a plan may be based on an annotated span of natural language. For example, the planner 214 creates the plan based on the third-party developer annotating the span of natural language "What wine goes well with" with the concept object 116, and the other third-party developer annotating the span of natural language "chicken parmesan" with the concept object 104, which enables the natural language intent interpreter 254 to generate an interpretation confidence score that is sufficiently higher than an interpretation score threshold to enable the planner 214 to execute the plan.

The annotating object may be the first action object, the second action object, the first concept object, the second concept object, or the third concept object. For example, in addition to the annotations of natural language spans with the concept object 104 for a menu item and the concept object 116 for a wine recommendation, a third-party developer may annotate the input "chicken, cheese, and tomato sauce" with the action object 110, which transforms the input into the annotated food category, "chicken based pasta dishes." The first object and the second object may be different objects from the first action object, the first concept object, and the third concept object. For example, the annotated object may be the action object 106 that transforms a menu item into a list of ingredients. The second concept object and/or the second action object may lack a match with any span of natural language from the user input. For example, neither the concept object 108 for a list of ingredients nor the action object 110 which transforms a list of ingredients into a food category match any span of natural language in the user input, "What wine goes well with chicken parmesan?"

The plan may include an action object based on a corresponding matching confidence score associated with the action object exceeding a corresponding threshold. For example, the planner 214 creates the plan with the action object 114 that transforms a food category to a wine recommendation because the natural language intent interpreter 254 created a confidence score of 0.845 for the action object 114 based on the matching confidence score of 0.883 for the concept object 116 for a wine recommendation.

A second plan is optionally created based on an intent, wherein the second plan differs from the first plan by at least one concept object and by at least one action object, block 312. In embodiments, this may include the planner 214 creating another plan based on the same intent, wherein the other plan includes action objects selected from the multiple action objects in the concept action network 212 to sequentially transform the concept object 104 for a specific menu item, such as chicken parmesan, eventually into the concept object 116 for a wine recommendation, such as a specific red wine.

A prompt, based on a plan, which requests additional user input, is optionally output, block 314. For example and without limitation, this may include the planner 214 generating dialog to ask the user if the requested wine recommendation is for a wine that the user wants to drink after the wine is ordered and subsequently delivered or if the requested wine recommendation is for a wine that the user wants to purchase from a local supplier within a short driving distance and then drink shortly thereafter. Outputting the prompt, based on the plan, which requests the additional user input, may be based on an interpretation confidence score which falls below a threshold. For example, the planner 214 generates speech to ask the user about when wine requested for recommendation is needed because the interpretation score for recommending a wine that is available from a local supplier within a short driving distance is lower than 0.500 due to end user preferences that record the past instances when the user ordered wine for subsequent delivery. Although this example describes planner 214 communicating with a user via speaking, the prompt and/or the user input may not be based on natural language and the user input may be provided via any of multiple modalities, such as typed entry of text via a real or virtual keyboard, or similar substitutions, touch and mouse gestures, speech, and combinations of the above.

Given the likely case of the existence of an exponentially large number of feasible plans, the planner 214 may automatically identify the most efficient or desirable plan. The planner 214 may optimize plans using independently configurable metrics, including, such as plan size and plan execution cost, where cost may include notions of time, actual money required to invoke a service step, or fit with end user preference models. The system 200 may determine the simplest plan given an intent. The planner 214 efficiently enumerates the possible plans that satisfy an intent, defined as "includes steps that connect all signals to the given goal," and selects which plan best satisfies some criteria, defined as a mathematical objective function over plans. The definition of the objective function is independent of the planner 214. One instantiation of this objective function is "simplest plan," in which the planner 214 finds the plan with the fewest number of steps.

A first plan is optionally selected for execution based on comparison of a first plan to a second plan based on an action object cost, an action object quality, and/or a number of planned action objects, block 316. By way of example and without limitation, this may include the planner 214 selecting the plan for executing the action objects 106, 110, and 114 based on three planned action objects for the plan to execute the action objects 106, 110, and 114 and five planned action objects for the other plan. Given the likely case of the existence of an exponentially large number of these plans, the planner 214 identifies the most efficient or desirable plan. Selecting the plan for execution may be based on a confidence score associated with the annotated span of natural language. For example, the planner 214 selects the first plan for execution because the first plan includes the concept object 116 for wine recommendations based on the concept object 116 having a sufficiently high confidence score due to a third-party developer annotating the span of natural language "What wine goes well with" with the concept object 116 for wine recommendations.

A first plan is executed, block 318. In embodiments, this may include the execution engine 252 executing the plan to execute the action objects 106, 110, and 114 for recommending a wine for pairing with chicken parmesan, and using the additional user input to identify a local supplier of the specific red wine. The execution engine 252 may execute a plan for recommending a wine for chicken parmesan based on an input parameter of an action object mapped to a web service parameter and a web service result mapped to an output value of the corresponding action object. Executing a plan may be based on additional user input and may include using a user decision, a user preference, and/or user application contextual information to transform a concept object into another concept object. For example, the system 200 may respond to a user request for locally available wines by identifying a supplier of a specific red wine that is located geographically second closest to the user's current location, which is identified as a favorite supplier of wine for the user based on previous purchases.

A value associated with a third concept object is output, block 320. For example and without limitation, this may include the system 200 outputting the name of a specific red wine which the system 200 outputs as a recommendation for chicken parmesan through a visual interface or through an eyes-free interface. The system 200 may select another action object from the concept action network 212 and execute the other action object to transform the concept object associated with the goal of the intent into another concept object. For example, the system 200 may also recommend purchasing a specific red wine from a local supplier that is the third closest geographically to the user because the third closest supplier is selling the specific red wine at a lower sales price than the sales price of the specific red wine at the suppliers that are closer geographically to the user. Another third-party developer may provide another action object after the system 200 forms the intent based on the user input and before the system 200 outputs the value associated with the third concept object, as the system 200 and the concept action network 212 evolve dynamically, without the need to stop providing services at runtime while being updated with additional service capabilities during the dynamic evolution.

Although FIG. 3 depicts the blocks 302-320 occurring in a specific order, the blocks 302-320 may occur in another order. In other implementations, each of the blocks 302-320 may also be executed in combination with other blocks and/or some blocks may be divided into a different set of blocks.

The natural language intent interpreter 254 leverages multiple sources of data to drive its inferences, such as model data about entities that interact with the cognitive architecture system 200, lists of natural language references to entities in the concept action network 212, sets of pre-interpreted natural language phrases with their formal intents, formalized and isolatable prior beliefs, contextual and personal clues, and other dynamic data gathered by proactively executing potential queries with Internet enabled services. As instantiated, model data about entities that interact with the system 200 includes the concrete types of and relationships between concept objects and action objects in the concept action network 212.

The primary interface for utilizing model data is through the planner 214, which is responsible for creating plans that service intents. Lists of natural language references to entities in the concept action network 212, or vocabulary lists, can be sourced in a number of ways. These include: 1) explicit modeling by third-party developers, such as the modeling of a finite list of weather conditions; 2) harvesting from data feeds, such as a well-curated list of known restaurant names; 3) collecting from Internet enabled service result sets, such as learning new restaurant names by identifying the names that appear in fresh search results; 4) specifying vocabulary lists programmatically, such as specifying that a U.S.A. primary zip code contains five digits that each take the values 0 to 9; and 5) sets of pre-interpreted natural language phrases with their formal intents, or training data.

The data can take a number of forms, including complete, fully annotated examples provided by third-party developers as they add new entities to the system 200, partially annotated examples provided by third-party developers who are experts in a limited view of the system 200, less reliable or noisy sources of examples inferred from large datasets, and automatically generated examples from active feedback, such as when an end user is satisfied with a previously unseen but well-handled query, and a positive feedback loop codifies the query and result as a concrete training instance. Examples of formalized and isolatable prior beliefs of third-party developers or system operators include, for example, that: 1) the name of a prolific musician who has appeared in one film is nonetheless generally more associated with concert tickets, not movie tickets; or 2) references to "Paris," on average, are more likely to refer to "Paris, France" than to "Paris, Tex." These prior beliefs are probabilistic and do not induce hard and fast rules on interpretation. Examples of contextual and personal clues include an end user's current location and preferences. An example of other dynamic data gathered by proactively executing potential queries with Internet enabled services is based on a query "Make me a reservation at the Rosewood" which includes static ambiguity as to whether "the Rosewood" is a restaurant, a hotel, or some other business that accepts reservations. The natural language intent interpreter 254 may speculatively plan and execute various interpretations and learn that, for example, in the geographical area where the end user resides, "the Rosewood" may be unambiguously interpreted as the name of a restaurant.

Natural language intent inference occurs in two high level phases, recognition and understanding. Put simply, the goal of recognition is to identify within a user input the individual atomic elements that correspond to objects modeled by third-party developers within the concept action network 212.

Understanding takes these atomic elements, cross references them with the concept action network 212, and assembles the elements into a formalized intent.

Recognition is primarily driven by natural language related data, such as lists of natural language references to entities in the concept action network 212, sets of pre-interpreted natural language phrases with their formal intents, and formalized and isolatable prior beliefs. Understanding primarily uses model and dynamic data, such as model data about entities that interact with the system 200, and contextual and personal clues. This data division is not strict, however. For example, contextual location data may help the system 200 identify an unknown proper name as being similar to the name of a film playing soon at a nearby theater. The understanding phase makes heavy use of the planner 214 to determine if an assembly of recognized elements can be formed into a sensible plan. In the running example, the system 200 may recognize "wine recommendation" and "chicken parmesan" as possible concept objects and then use the planner 214 to enumerate possible interpretations of these concept objects, understanding those which can be formed into the most sensible plan.

The recognition phase has the primary duty of identifying spans of user input that are associated with distinct modeled entity nodes, the concept objects and the action objects. The recognition phase includes several subcomponents, such as locale dependent lexical analysis, or tokenization, identification of general lexical properties of the user input, identification of typed concept value spans, identification of typed concept/action route spans, identification of hierarchical structure evident within user input, and inference of the overall goal. Examples of identification of general lexical properties of the user input include relations such as synonymy and hyponymy, general unmapped concepts such as that a span of user input is generally a "place." and other characteristics, such as parts of speech tags.

An example of identification of typed concept value span is the phrase "chicken parmesan" in the running example. In addition, each value span can be associated with a canonical form. For example, an end user may provide input referencing the fast food chain "MacDonalds," which may be associated with the canonical form corresponding to the proper business name "McDonald's." Identification of typed concept/action route spans are based on the intent format, which allows for strong execution hints to be provided as signals within intents. These hints guide the planning and execution process toward a desired mode when it would be otherwise ambiguous.

In the running example, the user input span "What wine goes well with" provides a signal for the "wine.FindWineReconmmnendation" action object, which directs the system 200 toward a specific and intended use of the value "chicken parmesan" for the menu item concept object instead of for other irrelevant uses, such as identifying recipes or nutrition information for "chicken parmesan."

Identification of hierarchical structure evident within user input, or sub-plan spans are based on the unambiguous intent format, which allows for the grouping of value and route signals into strictly ordered hierarchical sub-intents, or sub-plans. The phrase "Find parking lots near the White House in Washington, D.C." may involve a sub-plan that involves first finding the White House in Washington D.C., then creating a search radius, and finally finding parking lots within that search radius. Sub-plans induce distinct extra steps that may normally be avoided during plan construction, and often result from prepositional phrases like "near X." Separate from values, routes, and sub-plans, the recognition phase attempts to infer hints as to which modeled node, concept object or action object, is most likely to be the overall goal of an end user's query. A generalization of this task is the inference of a viable domain of model elements, which is a conservative filter on all model elements that collectively represent the domain of the query. Queries to the system 200 are highly dynamic, composable, and do not fit into strictly modeled domains like "restaurants" or "air travel." Here, domain only refers to an objective and automated partitioning of the model elements learned from data.

FIG. 4 displays an example set of inferences 400 for a "What" token 402 of a given end user query for a dynamically evolving cognitive architecture system based on contributions from third-party developers, under an embodiment. The inferences are divided into the categories of values, routes, and goals, including sub-plans. Many alternative inferences exist, and each potentially recognized element is associated with a distinct probability. Value spans contain additional information, such as the likely canonical form for the value. For example, the system 200 may provide two canonical values for "chicken parmesan." a longer "chicken parmesan" value with a high confidence probability, and a shorter "chicken" value with a much lower confidence probability.

These subcomponents provide a unified model and language for several types of concrete techniques to interact. The instantiation of the system 200 and the concept action network 212 allows for several parallel (independent) and serial (conditional) recognizers to operate and collaborate, such as various statistical natural language models, information retrieval systems, such as using a keyword search to identify concept objects relating to a query and labeling the concept objects as routes, rule engines, pattern based recognizers, and corrective and/or predictive input systems, which including syntactic systems such as spellchecking and semantic systems such as usage aware predictive user input. The recognized user input spans and confidence values are readily combinable across recognizers. The preferred instantiation implements a number of strategies for doing so, including a priori tuned combination functions, such as linear averaging and additive voting, as well as fully data driven methods. For fully data driven methods, the provenance of each recognized input span is tracked throughout the execution of the system 200. Over time, the system 200 learns, for example, that a statistical recognizer is very frequently correct, and it begins to weight or trust its recognitions higher. Similarly, consistently poor results from noisy recognizers, such as keyword searches, may over time cause the system 200 to distrust them.

The suite of recognizers is able to generate both closed lexicon matches, which are primarily driven by vocabulary data, and open lexicon matches, which are primarily driven through contributions from third-party developers. In the running example, "chicken parmesan" is recognized as an instance of a modeled component, MenuItemName. This recognition would be considered closed lexicon if the system 200 had been taught explicitly about this unique value through, for example, a vocabulary entry with this exact value. This recognition would be considered open lexicon if the system 200 was not cognizant of this exact value, but deduced given all evidence (the preceding words were "What wine goes well with" and similarly prefixed queries often end in MenuItemNames) that the most probable interpretation of these two words was as some two word MenuItemName.

The ability to interpret in both an open and a closed lexicon manner allows inferences to be as precise as possible when desired, such as when reasoning about the names of countries, while still being flexible enough to reliably handle naturally open lexicon values, such as the body of a text message. The recognition phase produces two primary products, a set of input spans (values and routes) coupled with estimates of their correctness in the form of probabilities, and a set of structural hints in the form of input spans relating to hierarchical sub-plans and the overall goal. The understanding phase takes these spans and hints and produces a set of ranked interpretations. An interpretation consists of an unambiguous intent written in the formal intent syntax, which differs from standard formal intents in that it contains full provenance data for every item and structural grouping in the intent, including the natural language input that induced them as well as the individual component implementations that performed the inference, a confidence score reflecting the belief in the probability that the inferred formal intent matches the user's true intent, and an optional number of sub-scores that may be used to further rank and/or explain interpretations.

Understanding solves an optimization problem that involves synthesizing interpretations that both minimize undesirable characteristics and maximize desired ones. For example, all else being equal, the understanding phase prefers interpretations that understand more words or unique concepts, or cover more, of an end user's query. In the running example, this heuristic causes the system 200 to prefer interpretations that search specifically for wine recommendations based on "What wine goes well with" rather than more general and simple wine related queries based on "What wine." This heuristic also avoids conflicts, which may occur when two similarly typed matched spans overlap.

An example of an undesired conflict would be the simultaneous inclusion of both "chicken" and "chicken parmesan" in an interpretation, assuming both spans of natural language were generated from the same source input. The model of the concept action network 212 instantiated within the system 200 heavily influences the production of interpretations. The model may influence the understanding of the query "What wine goes well with chicken parmesan?" in several ways, namely through the planner 214. The planner 214 may boost a confidence score in terms of feasibility of execution. The understanding phase may leverage the planner 214 to deduce that there is in fact a way to dynamically compose concept objects and action objects such that a MenuItemName concept object may be transformed, in a sense, into a WineRecommendation concept object. The planner 214 may also boost a confidence score in terms of sensibility of execution, similar to the feasibility of execution, but further refined to include some measure of desirability on the plan of execution. For example, the understanding phase may use the planner 214 to note that there is a simple, direct path through the model elements associated with the input spans "What wine goes well with" and "chicken parmesan." and score that interpretation highly. The planner 214 may lower a confidence score in terms of feasibility of execution. For example, while a MenuItemName concept object may be transformable into a WineRecommendation concept object, the reverse transformation may not be possible. This same procedure may be used to avoid taking a great semantic leap in the cases of nonsense queries, such as "Find wine recommendations for United Airlines."

The planner 214 may lower a confidence score in terms of sensibility of execution in a manner that is similar to lowering a confidence score in terms of feasibility of execution, but generalized so that feasible but undesirable interpretations are penalized. Here, undesirable interpretations may be instantiated with many concrete definitions, including both static metrics like number of steps and complexity and dynamic metrics like user feedback and popularity. As interpretations are built, the understanding phase accumulates a confidence score in each interpretation. Each confidence score may be expressed as a continuous value normalized between zero and one, and may be optionally stratified into discrete levels. For example, a value in a defined high range may enable the system 200 to move forward with the execution of the first interpretation, whereas the inference of several possible interpretations whose confidence scores lie in a defined medium or uncertain range may require the end user to provide additional input or confirmation. Confidence scores are dynamically evaluated for accuracy over time by, for example, soliciting end user feedback or processing log data for successful end user queries. This evaluation data completes a feedback loop that constantly improves the ability of the system 200 to understand user queries. Improvements to confidence scoring are handled both automatically, such as through learning hints that the understanding phase can use, and manually, such as through improving the accuracy of deliberately designed metrics.

Figure 5:
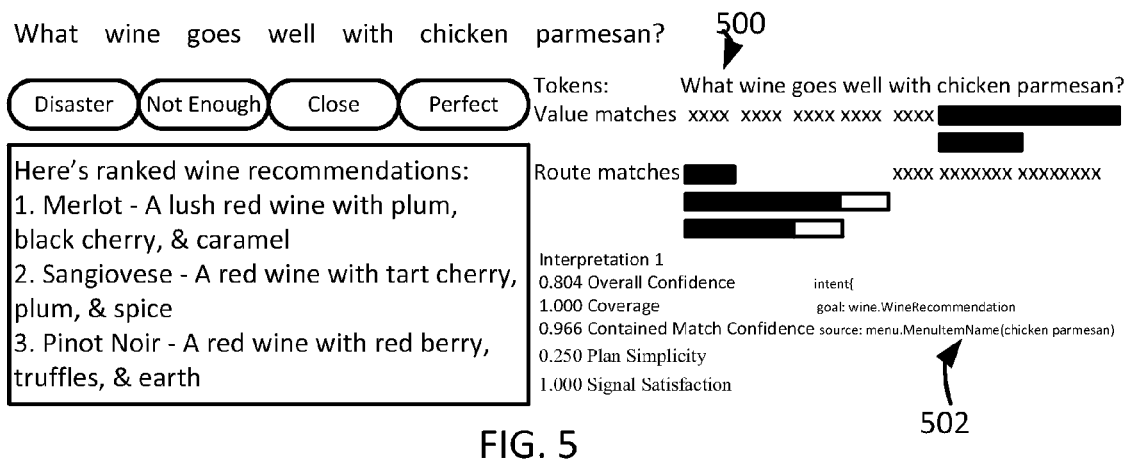
FIG. 5 illustrates an example interpretation for a dynamically evolving cognitive architecture system based on contributions from third-party developers, under an embodiment.

FIG. 5 depicts an example interpretation 500, a pictorial output of the recognition phase and an interpretation produced by the understanding phase, for a dynamically evolving cognitive architecture system based on contributions from third-party developers, under an embodiment. The interpretation is presented with its confidence scores, as well as end user feedback buttons for validating the performance of the system 200. The recognition phase of the natural language intent interpreter 254 process benefits from lists of concrete values that a given concept object may take. For example, a list of values for a menu item concept object may include chicken parmesan, lasagna, steak au poivre, and bananas foster. These lists of values are referred to as vocabulary.

Vocabulary lists are optional because the system 200 is not restricted to recognizing the precise set of values taught to it. By implication, these lists need not be exhaustive. Rather, vocabulary allows the natural language intent interpreter 254 to function more accurately and with higher confidence. In the running example "What wine goes well with chicken parmesan?" the system 200 may infer a correct interpretation in the absence of any explicitly listed vocabulary values. However, the addition of an explicit association between "chicken parmesan" and the MenuItemName concept object 502 causes the inference to occur more quickly, more accurately, and with a higher final confidence score. Vocabulary also provides a natural means for the system 200 to replace elements of an end user's query with a canonical form to facilitate the interoperation with various Internet enabled services. For example, a "Find Ingredients of a named dish" action object may be highly sensitive to minor variations in dish names, like spelling errors, extra words, or misplaced capitalization. A vocabulary entry for "chicken parmesan" may allow the system to replace a commonly mistaken form, like "chicken parmegan," with a correct and canonical form that allows the end user's query to succeed. The system 200 provides a resolution mechanism for cases in which multiple apparent canonical forms exist. Vocabulary may be added to the system 200 in various ways, including manually, through batch processing of files or databases, or through harvesting Internet exposed data feeds, which are particularly relevant for capabilities that reference concrete values with a high churn rate, such as a constantly increasing list of movie titles or a list of restaurant names in a rapidly expanding neighborhood of a city.

An example of vocabulary terms for airplane model names that were harvested from an external data source includes Airbus A320, Airbus A321, Airbus 330-200, Airbus 330-300. Airbus A319, Boeing 767-300ER, Ilyushin II 96-300, Sukhoi Superjet 100-958, Boeing 737-700, Boeing 737-800, Boeing 767-200, Boeing 767-300, and Boeing 777-200. The system 200 provides tools and access methods that facilitate the use and maintenance of vocabulary, such as external storage for large sets of vocabulary with fast, indexed retrieval; flexible indexing and filtering, including by location for geographically related entities; sorting, querying, and grouping by various types and relationships in the model; summary statistics, including, but not limited to overall size, individual term frequency, and usage data: and the ability to mark concept objects on a per type basis as being compatible with forms of approximate indexing. Examples of approximate matches include missing word matches such as "steak poivre" matching "steak au poivre," phonetic matches such as "stake oh pauve" matching "steak au poivre," stemmed form matches such as "steaks" matching "steak," and lexical near miss matches such as "steka" matching "steak." The quality of all such approximate matches is measured and incorporated into all stages of inference, including the final confidence score.

A training example, or training instance, is a user request expressed in natural language textual format that has been annotated or aligned with the appropriate system response, the intent. For example, "what is (the population) [g:geofacts.Population] of (san jose) [v:geo.LocalityName] ca [v:geo.ISOSubdivision.Code]?" In the preceding example, the natural language query "what is the population of san jose, CA?" has been trained to the following unambiguous intent through a collection of three inline annotations tied to specific words and/or phrases.

```
intent {
    goal: geofacts.Population
    value: geo.LocalityName (san jose)
    value: geo.ISOSubdivision.Code (ca)
}
```

A third-party developer submission of this training example is collaborative for a number of reasons, such as use, content, and process. The submission is necessarily collaborative in that the submissions from many (usually, all) third-party developers are combined by the natural language intent interpreter 254 into a general model that handles user requests. This collaborative learning and synthesis produces an instance of the system 200 that is more effective at understanding users than the simple sum of its individual contributions. For example, one instantiation of the natural language intent interpreter 254 may function by breaking training examples into slices of small phrases, which the natural language intent interpreter 254 could then combine using measured summary statistics. In addition to the example ("what is the population of San Jose, Calif.?"), a third-party developer may train "How many people live in China?" and the system 200 could leverage both examples as a general model so that the system 200 could correctly understand a not-fully-trained, but still reasonable user query, like "How many people live in San Ramon, Calif.?" The submission may or may not be collaborative by way of the models accessed in the concept action network 212, which are contributed by multiple third-party developers. In the population query example, there are three referenced models: Population, LocalityName, and ISOSubdivisionCode. If any two of these models were contributed by two different third-party developers, the training example is a different type of collaboration. The submission may also be collaborative if it involves the editing of one third-party developer's training example by a second third-party developer in order to, for example, fix an error.

The system 200 supports being dynamically trained while actively running online. Many types of learned systems are statically trained, in that their general models are built via an offline, and often expensive, batch-mode process. For example, a static system may store its training instances in a database, and once a week the model is retrained in one lengthy pass. The drawback of this approach is that the effects of the changes are not observed until the next periodic retraining. In addition to being statically-trainable, the system 200 is fully dynamically trainable in all respects of training, un-training, and retraining. When a training example is submitted, the entire general model is updated such that the new training example is integrated with whatever derived knowledge has been gleaned from all existing training.

After dynamically training an example, the system 200 is in the exact same state as the system 200 would have been in had the system 200 been stopped and retrained in a static manner. Similarly, training may be un-submitted, or removed, from a running system such that the general knowledge of the system 200 reflects the absence of a previously-trained example. After dynamically un-training an example, the system 200 is in the exact same state as the system 200 would have been in if the system 200 had been stopped and un-trained in a static manner.

Training may also be updated, which can be a combination of un-training and training. For example, if a third-party developer trained an example with a mistake in it, such as annotating "San Jose" as a state instead of as a city, the third-party developer could correct the error, and the system 200 could remove the data from the general model implied by the incorrect version and retrain the system 200 based on the corrected version, deriving the new general data instantly and online. After dynamically retraining an example, the system 200 is in the exact same state as the system 200 would have been in had the system 200 been stopped and retrained in a static manner. Dynamic training is enabled by underlying forms of learning that support this modality. For example, an instance of the system 200 may focus on learning over statistical models whose parameters can be estimated solely by counting occurrences of elements.

Dynamic training enables a suite of interactive components of the system 200 that support the process of training, which together form the training platform 251. One standard developer-facing interface to the training platform 251 is the trainer tool, which facilitates a general workflow for adding, editing, and removing training examples. Basic features of the trainer tool include searching as well as the loading of training examples into a working set of training most relevant to the modeling task at hand. For example, a third-party developer loads all training related to the rental car reservation models, and begins training by entering or importing unannotated user queries as plain text.

Figure 6:
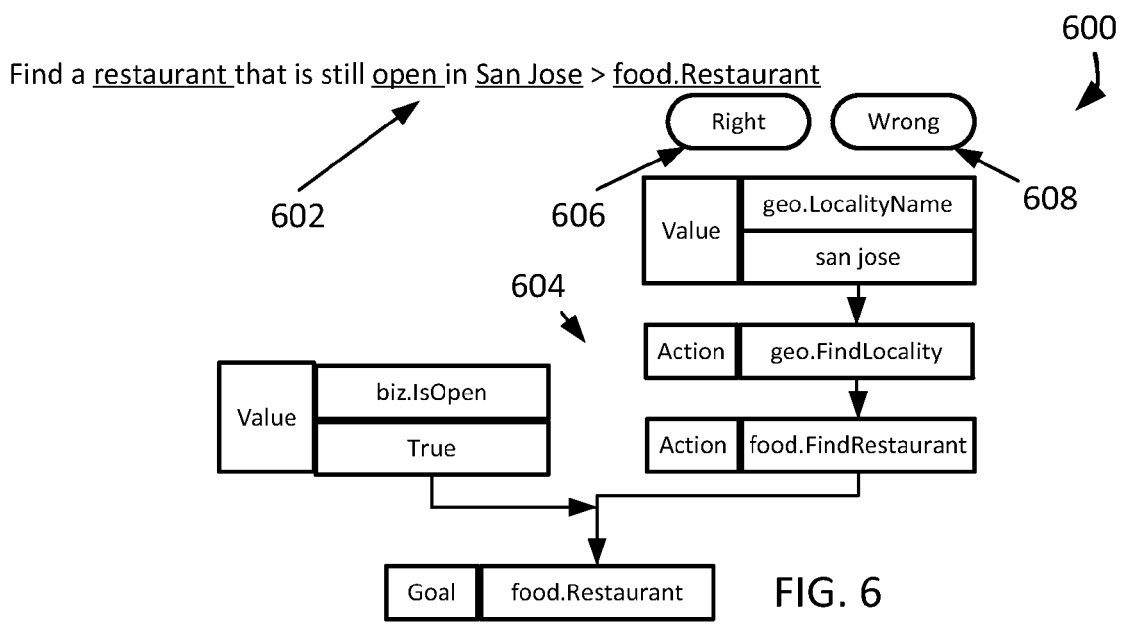
FIG. 6 illustrates an example response from a trainer tool to an unannotated user query for a dynamically evolving cognitive architecture system based on contributions from third-party developers, under an embodiment.

FIG. 6 depicts an example response 600 from a trainer tool to an unannotated user query, which displays suggested annotations for the user query, for a dynamically evolving cognitive architecture system based on contributions from third-party developers, under an embodiment. In this example, a third-party developer has entered the request 602 "Find a restaurant that is still open in San Jose." The current general model, which leverages knowledge from all training instances, produces suggested annotations for the query. These annotations are indicated as underlines in the text, and the implied plan 604 for the intent is displayed for verification. If the suggested annotations are correct, the third-party developer selects the right 606 option to add the training instance as is, and an enable option to induce the system 200 to learn instantly from the training example. If the suggested annotations are incorrect, the third-party developer selects the wrong 608 option, and an editor appears, which enables selections over words and phrases to be annotated using a graphical popup. As annotations are added, removed, or otherwise changed, the trained plan 604 updates. When finished with an instance, the third-party developer selects a "save" option. If training of an instance is complete and appears correct, such that that the plan 604 services the needs of the query 602, a third-party developer may select an "enable" option to induce the system 200 to add and learn from the instance. Updates (edits) and removals are straightforward, in that they are triggered by "edit" and "delete" options, and their interface is identical. During and after any training modifications, the training platform 251 handles updating the running state of the system 200 by leveraging the dynamic training capability.

Traditional trained systems operate on singly-sourced batches of curated data, which is often passively gathered, but actively or semi-passively annotated. Practitioners may then train and evaluate these systems by performing various offline scientific analyses. An example is the standard cross-fold model evaluation, which evaluates the general performance of the learned system. The system 200 can operate similarly over batches of training data, but the more common use case involves the active contribution of data from a large number of third-party developers, which introduces new requirements and constraints: Unlike voluminous data scraped from the Internet, third-party developers' time and other resources are highly limited. Therefore, training is focused on contributions that will directly improve the ability of the system 200 to understand user requests.

Third-party developers are given immediate feedback on the quality and completeness of their training so as to guide their efforts and give the third-party developers a sense of progress, and in most cases, a sense that the training process is finite. Statistically-driven systems are inherently robust to many kinds of normally disruptive training, like examples with mistakes. However, it may be the case that a third-party developer is regularly making systematic errors and truly disrupting the ability of the system 200 to understand certain classes of queries. Therefore, third-party developers receive instant feedback when their training is having an unintended effect on other areas of the system 200. The training platform 251 provides these abilities with online analyses that are exposed to third-party developers through a training user interface. The most prominent of these analyses is the generality analysis.

The training platform 251 performs the following procedure on one training example at a time, and the training tool requests that the procedure be performed for every training example visible to third-party developers. The training platform 251 trains the example using online dynamic training, but omits training if the example is already trained. The training platform 251 records the text and the intent of the request, as provided by the third-party developer. The training platform 251 un-trains the example using online dynamic training, enters the training text, without annotations, as a new user request, and compares the response of the natural language intent interpreter 254 to the trained intent provided by the third-party developer. If the response of the natural language intent interpreter 254 and the trained intent provided by the third-party developer are identical, the training platform 251 marks the as "well-learned." Otherwise, the training platform 251 marks the as "train more like this." This procedure, in effect, evaluates whether or not the system 200 could understand the text in a training example without actually being training by the example. Though counterintuitive at first, this is actually the goal of training: to produce a model so general that any one example, in isolation, functions without being trained. More importantly, when training is sufficient for a certain class of query, this is often (that is, statistically) true for most related examples. This property allows a third-party developer to use the analysis as a factor when deciding when to stop training.

The system 200 processing the query "reserve a luxury class rental vehicle at SJC between June $28^{th}$ and July $5^{th}$" results in car.BookRentalVehicle, which is marked "add more like this." The system 200 processing the query "find me a rental car now that will hold 8 passengers" results in car.RentalVehicleSolution, which is marked as "well learned." The system 200 processing the query "find a rental extended-cab pickup with unlimited mileage" results in car.RentalVehicleSolution, which is marked "add more like this." The query "what's the availability for the rental car" results in car.RentalVehicleRateAvailability, which is marked "add more like this." The system 200 processing the query "what rental minivans are available at San Diego International Airport" results in car.RentalVehicleSolution, which is marked as "well learned."

The training user interface displays the results of the generality analysis as user-friendly tags. In this example, two of the five queries are marked "well learned," and three of the five queries are marked "add more like this." This is an extremely valuable asset for third-party developers who work to improve the system 200. Third-party developers are actively guided to the types of queries with which the system 200 is currently having trouble. In this example, it appears that the general use case searching for rental cars by passenger size is well-trained, but the system 200 is having trouble with the queries with multiple options, such that third-party developers are instructed to "add more like this." Third-party developers are actively steered away from performing redundant work. Simple queries like "what is the weather outside?" may be trained well very early in the lifecycle of an instance of the system 200, such that later additions of the same type would be wasted effort. Furthermore, implementations of the system 200 benefit as well. When third-party developers focus their efforts on training just the areas that benefit the system 200 the most, the overall amount of data, and thus the required computational resources, is reduced, while maintaining a similar level of performance that would have been achieved otherwise with much more data. Consistent with the dynamic nature of the system 200, this feedback is all instantaneous.

The system 200 processing the query "book me a car at SFO this Tuesday that is compact" results in car.RentalVehicleSolution, which is marked as "well learned." The system 200 processing the query "reserve a mid-sized rental vehicle" results in car.RentalVehicleSolution, which is marked as "well learned." The system 200 processing the query "reserve a rental vehicle for me" results in car.RentalVehicleSolution, which is marked as "well learned." The system 200 processing the query "book me a luxury-class car on June 10" results in car.RentalVehicleSolution, which is marked as "well learned." The system 200 processing the query "book me a economy car at SJC between February $9^{th}$ and July $14^{th}$" results in car.RentalVehicleSolution, which is marked as "well learned."

In the preceding example, a third-party developer has sequentially added five new examples to help the system 200 understand the query "reserve a luxury class rental vehicle at SJC between June $28^{th}$ hand July $5^{th}$." As these examples are added, the system 200 builds a more general model of its knowledge of rental cars, and by the addition of the third new example, the signal on the target example transitions from "add more like this" to "well learned." As the final two examples are added, the system 200 signals immediately that each of the two is "well learned," such that the third-party developer receives a strong signal to move on to other more productive training.

Other analyses include plan analysis, vocabulary analysis, and consistency analysis. Plan analysis activates the planner 214, evaluates a current plan for a given training example's literal interpretation, and searches for known error classes, such as unused signals. A failure of this analysis is a strong indicator of a training error that should be fixed before enabling the example. Vocabulary analysis triggers when the generality analysis fails, which is when the training tool marks an example with "add more like this." Vocabulary analysis reports whether or not the addition of vocabulary terms, which is separate from training, often much less labor-intensive, and more automatable than training, could significantly help how well the example was learned. Consistency analysis simply evaluates whether or not the system 200 returns the correct interpretation after the example has been trained. In the vast majority of cases, this test passes. A common failure cause, however, is when a training example is wholly inconsistent with the other training in the system 200. For example, if a third-party developer trained "Book me a rental car" to be a "weather tomorrow" query, it is likely that even with this erroneous training example included in the active training set, that a previously trained system 200 would return the proper rental car interpretation.

All analyses are updated live for the working set, which in most cases appears instantaneously. In addition, an asynchronous process may evaluate these analyses continuously for the entire system 200, enabling global impact analysis. Global versions of the preceding analyses generally operate as summaries. For example, a summed generality score over all training examples may be interpreted as "how well is the system likely to understand user queries, on average?" Another example is an instance of the aforementioned impact analysis: "given a change in training, how are all other training examples affected?" If the analyses report problems, then the training example could be reviewed. If the analyses report no significant change, then the changes were relatively isolated. If the analyses show marked improvement, then the training changes are shown to be beneficial to both the third-party developer and the instance of the system 200 as a whole.

The phases of the natural language intent inference process require data to guide their inferences. This data requirement stems from the inherent ambiguity in human language and is supported by the inherent dynamism of the system 200 which allows new capabilities, and combinations thereof, to be added nearly continuously. Training includes various data formats for providing examples of potential queries along with expected interpretations; processes streamlining the generation of this data by third-part developers, including wizard-like concrete steps that simplify the process and make it finite; tools that automate, simplify, speed, and make finite the potentially complex process of writing and providing training data; and continuously monitoring the quality of data and enabling the system 200 to respond gracefully to various situations, including, for example, the inclusion of potentially poor quality data, or the obsolescence of a set of data if an underlying capability is changed. A training example providing potential queries along with expected interpretations is:

"(what wine is good)[wine.WineRecommendation;g] with (chicken parmesan)[menu.MenuItemName.v]?
"(what wine goes well)[wine.WineRecommendation;g] with (lasagna)[menu.MenuItemName.v]?
"(what wine pairs)[wine.WineRecommendation;g] with (filet mignon)[menu.MenuItemName.v]?
"(what wine pairs well)[wine.WineRecommendation;g] with (salmon)[menu.MenuItemName.v]?
"(wine pairing)[wine.WineRecommendation;g] for (pasta primavera)[menu.MenuItemName.v]?
"(wine pairings)[wine.WineRecommendation;g] for (bananas foster)[menu.MenuItemName.v]?
"(wine recommendation)[wine.WineRecommendation;g] for (steak)[menu.MenuItemName.v]?
"(wine recommendations)[wine.WineRecommendation;g] for (swordfish)[menu.MenuItemName.v]?

The above example illustrates one data format for training the natural language intent interpreter 254 through an inline annotation format that intersperses the known true intent with the potentially ambiguous natural language request. Each instance is a training example. Training examples may take several forms and be used in several contexts, such as fully-annotated complete queries, partially-annotated complete queries, fully-annotated partial queries, and partially-annotated partial queries. A fully-annotated complete query is a training example for which a query is fully disambiguated. The depicted training format is fully expressive in that, with enough annotation, any intent expressible in the formal intent syntax is expressible as an annotated training example.

The system 200 may use fully annotated examples to improve both the recognition and understanding phases, and may additionally use these examples as test cases. A partially annotated complete query is a full query that is only partially annotated, which a third-party developer may provide these to teach the system 200 about objects with which the third-party developer is familiar with without the burden of full awareness of the entire system 200. In the running example, a third-party developer may teach the system 200 about the wine recommendation concept object in isolation, while another third-party developer may teach the system 200 about the menu item concept object. A fully-annotated partial query is a training example that represents partial phrases that are often a common component of an end user's query, such as "3 A.M." or "near my house." A partially-annotated partial query is a training example over a partial phrase that may or may not be fully annotated.

Since training is the primary way for third-party developers to teach the system 200 to understand natural language, the quality and quantity of training greatly influences the ability of the system 200 to understand. The system 200 allows for the development of tools and processes that simplify and speed the training process for third-party developers. These tools and processes may take several forms, such as automated and semi-automated training, training feedback, assisted training through a wizard, and suggestive training.

Third-party developers may pose queries that the system 200 may or may not be able to interpret correctly. If a proposed interpretation is correct, the third-party developer may instantly convert the proposed interpretation into a training example. If a proposed interpretation is incorrect, the third-party developer may make the necessary corrections before resubmitting the corresponding query. This training process may also be generalized to partially labeled queries, especially those that heavily leverage the dynamic, cross domain nature of the system 200.

In the running example, a third-party developer of a wine recommendation object may posit that the system 200 has been taught about menu item concept objects and submit a partially trained example for "What wine goes well with chicken parmesan" in which only "What wine goes well with" is annotated. In response, the third-party developer may receive the best inference of a fully trained example that does annotate "chicken parmesan." That example may be executed by the system 200, and should the third-party developer judge the interpretation to be correct, the third-party develop can add the example to the system 200 as a fully annotated training example.

Third-party developers receive near immediate feedback from their submission of training, including, but not limited to, consistency, correctness, and global impact. A third-party developer receives instant feedback about whether or not a training example is consistent or contradictory. For example, if a third-party developer submits a training example for "What wine goes well with chicken parmesan" that is annotated as performing a flight search, the system 200 will raise an immediate warning. For correctness, or alignment with true intent, a third-party developer may instantly view the present understanding of an example and reconcile this understanding with the third-party developer's intent. For example, a third-party developer may mistakenly annotate only the first word of "chicken parmesan," but that error will become immediately obvious when tested against the system 200. For a global impact, a third-party developer may view a training examples' impact on the remainder of the system 200, including its potential negative impacts on other functional components.

For assisted training through a wizard, after a third-party developer trains with respect to the models the third-party developer created and worked with, these models may be used as a natural checklist that guides the training process and judges its sufficiency. In the running example, presume that "FindWineRecommendation" is an action object that may be provided with a dozen optional inputs, such as FoodType, DrinkType, and CuisineStyle. A training wizard may ensure that a third-party developer writes training examples that cover each of these inputs as well as important combinations of these inputs.

Suggestive training is based on a third-party developer receiving examples of end user queries, where possible while maintaining privacy, which likely relate to model components which the third-party developer contributed. The third-party developer may then modify and annotate these end user queries and submit the end user queries as training examples. In the running example, a third-party developer may be presented with historical queries that appeared to be related to wine recommendations, but at the time were not serviceable.

The system 200 provides a flexible framework for incorporating other, more general forms of natural language-related knowledge that build on the ideas of vocabulary and training. In general, other sources of knowledge may be added in a modular way that, by construction, cannot significantly worsen the quality of inference in their absence. Many sources of knowledge may be integrated, such as prior beliefs and context.

Third-party developers often have prior beliefs that are difficult to formalize as vocabulary or training. For example, in response to the end user query, "Find Justin Bieber tickets," the system 200 may correctly recognize that Justin Bieber as both a singer and an actor, and may not be able to determine whether the end user query intends to find concert tickets or movie tickets. However, the third-party developer of the ticket finding action object has a strong prior belief that Justin Bieber is better known as a singer than he is as an actor, such that biasing the interpretation results may be correct in this situation. Prior beliefs may be modeled in the system 200 in a number of ways. For this example, the third-party developer may encode the fact that "Justin Bieber is a well known musician" as a fact about a specific type in the system 200. In this case, the third-party developer might model that "in the context of the music.ArtistName type, 'Justin Bieber' is a frequently appearing value." Such facts are modular, simple to add, and are not specialized to any one inference technique, including any natural language intent inference step, recognition or understanding.

Although prior beliefs may resemble strict rules, the system 200 treats prior beliefs as measured suggestions. The influence of prior beliefs propagates throughout the system 200, and any conflicts between prior beliefs are handled nondestructively. For example, the modeling of two separate but strong prior beliefs about "Justin Bieber" does not cause all inferences about that value to fail. Where applicable, prior beliefs influence the final confidence score of an interpretation.

An end user may interact with the system in a conversational manner, such as the example queries "What's in chicken parmesan?" and "What wine goes well with it?" The first query may be interpreted unambiguously in the absence of context, but the second query is automatically serviceable only with contextual data. Here, context is broadly construed to mean any dynamic data not immediately inferable from the immediate query. Context may reference such data sources as the previous query or queries, current location data, and/or user preferences. The natural language intent inference pipeline incorporates contextual data in much the same way that other non-vocabulary and non-training data sources, such as prior beliefs, are utilized. In the above example, the set of model elements that could possibly bind to "it" may, in the independent setting, be any data type for which the system 200 could possibly find a wine recommendation, and the data type value may be indeterminate. When context is implemented as a short-lived prior belief, "it" is recognized as having a strong probability of referring to the previously mentioned menu item, "chicken parmesan."

Instances of the system 200 are highly dynamic systems and the interpretations of natural language can be both inherently ambiguous and subjective, such that there is a significant potential for errors in interpretation. Errors in interpretation are immediately visible and are directly related to end users' perceptions of the general performance of the system 200. Quality assurance of the natural language intent inference pipeline is thusly implemented as a first class component of the system 200 that runs automatically and continuously. In the system 200 where independent third-party providers create new models, functions, and potentially the language definitions that map to them, the quality assurance process takes on an increased role during submission approvals. The automated quality assurance takes a number of forms, each with complementary aims, such as internal consistency evaluation, robustness evaluation, concept value recognition evaluation, and out of domain evaluation.

All (positive) trained data encode some or all of a true interpretation of a given natural language query, and each of these examples acts as a test case. For each element of trained data, the system 200 continuously evaluates whether or not the system 200 correctly interprets the example as trained and, if interpreted correctly, whether or not the examples were interpreted with a high confidence value. Failures may be due to a number of causes, such as inconsistent or conflicting training examples, vocabulary, or beliefs, such when "What wine goes well with chicken parmesan" is mapped to two distinct and unrelated interpretations by two different third-party developers. The internal consistency evaluation also provides a principled approach to the maintenance of natural language data. When modeled elements such as concept objects and action objects are added to and removed from the system 200, the natural language data must evolve synchronously. This internal consistency evaluation quickly identifies what must evolve, and, where possible, makes suggestions as to how to do so.

The natural language intent inference pipeline is regularly tested with two classes of injected error, variations in training and variations in tests. Each training example is regularly subjected to a suite of mutation operations that test the resilience of the system 200 to poor or missing training data. These mutations include complete removal, in which case the example itself continues to be used as a test case, intent preserving changes to the natural language, such as substituting values for other values of the same type, and true error injection, such as adding spelling errors or dropping terms. All of these operations force the system 200 to learn from imperfect data while subjecting the system 200 to the same suite of tests. Similarly, these mutations may be used to generate additional test inputs from existing training examples. For example, the training instance "What wine goes well with chicken parmesan?" may be used to generate type compatible tests like "What wine goes well with Steak au Poivre?"

The system 200 models elements that correspond to real world entities, and many of them are named in a highly varied way. For example, there are millions of business names and hundreds of thousands of unique names of films. The correctness of the interpretations rests on the ability to recognize these named objects accurately and reliably. The system 200 runs a suite of tests that regularly evaluate the ability to recognize named objects. These tests involve performing substitution of named objects with known structure queries, as before, and performing automated experiments over large user input corpora which, while not able to be interpreted directly as queries, are known to contain references to many of the named values of concepts that are modeled in the system 200. For example, copyright issues notwithstanding, if the system 200 accesses the archives of the text of a leading wine related publication, the system 200 could then regularly test the ability to recognize all referenced wines and wine-related proper terms, like varietals, appellations, and producers.

At any given time, some queries will be out of scope for the system 200, which maintains a suite of such queries, both contributed by third-party developers and harvested from usage logs, where allowed with privacy controls. The system 200 continuously evaluates these queries to ensure that these queries produce no interpretations, produce interpretations with very low confidence scores, or produce interpretations that represent a graceful degradation of service quality if the queries do yield interpretations with significant confidence scores. For example, if, at the current instant, the system 200 did not have the ability to display individual constituent components of a weather report in response to an end user query "What is the temperature in Fahrenheit outside?" a reasonable approximation response to this query might be to display the current weather in its entirety. The system 200 automatically triages all failures according to their likely cause and forwards any correctable failures to third-party developers. For example, the system 200 detects that an additional vocabulary list entry would have prevented a robustness test failure and automatically suggests such an action to the third-party developers associated with the corresponding concept action. Third-party developer actions are then reevaluated, which guides third-party developers toward producing quality, general solutions.

The natural language intent inference component may interface with speech recognition systems. Abstractly, these speech recognition systems work by leveraging data and algorithms to segment sequences of phonemes into likely interpretations of words, such that their inferences are often approximate, and many sensible interpretations may exist for a given utterance. For example, in a noisy environment a recognizer may not be able to unambiguously recognize whether a spoken query is "What wine goes with bananas foster?" or "What wine goes with banana forester?"

Speech recognition systems often carry forward such ambiguity by exposing the alternatives through a well-defined application program interface. The system 200 handles these speech alternatives in full form using its own natural language intent inference. In this example, the two alternative interpretations for each of the two words are carried forward from a speech recognizer. The resulting interpretations are initially sensible because a banana forester is a profession of a person who harvests bananas in a forest for a living while bananas foster is a dessert made from bananas and vanilla ice cream, with a sauce made from butter, brown sugar, cinnamon, dark rum, and banana liqueur. As the understanding of the utterance progresses, the more likely meaning becomes clear. In this case, the "What wine goes with" portion of the utterance remains fairly unambiguous, and can be used in a top down evaluation of any subsequent interpretations: finding a wine recommendation requires a food classification. According to the model, as interpreted by the planner 214, it is not possible to sensibly plan from the profession "banana forester" to a food classification, while it is both possible and much more sensible to plan from the menu item "bananas foster." This procedure straightforwardly generalizes from this reconciliation of application programming interface exposed ambiguities to a full vertical integration of the speech recognizer, natural language intent inference component, and the planning and execution system.

The execution semantics of the concept action network 212 both permit and require nontrivial interaction with an end user before, during, and after plan execution. These points of interaction convey to an end user what is happening, what is needed, what actually happened, and what can happen next. Sometimes, the system 200 may need to ask a question or elicit additional input from an end user to proceed with a task. The back and forth exchange between an end user and the system 200 may be referred to as interaction, and the output side of the interaction may be referred to as dialog.

When communicating results, status, or clarification requests to an end user, the system 200 may choose to convey this dialog output using text, speech generation, graphical representations of such forms or other user interface representations, or combinations of all three. Due to the composable and emergent nature of the system 200, third-party developers may not be able to anticipate a priori every possible interaction with sufficient detail. Interactions need to be somewhat dynamic, generic, and reusable, the same way that concept and action models are dynamically composed and reused to fulfill an end user's intent. Therefore, the dialog explains the context of the interaction to the user and makes certain that the system 200 is doing the right thing. Detailed and/or precise dialog can accompany those anticipated interactions that a third-party developer deems matter. Surprise and delight may be possible. The challenge is a dichotomy of genericity and specificity.

A natural approach for dialog production in a composable system is composition. The dialog editor 244 specializes in the composition of natural language dialog, and uses a number of structural elements to help manage and organize this task, such as dialog events, dialog fragments, binding contexts, dialog templates, and invariants and metrics. Dialog events are high level abstract points at which interaction dialog is requested by the system 200. Dialog fragments, derived from the structure of the concept action network meta-model, may be used for grammatical composition and delegation. Binding contexts are simplified representations of the execution semantics that allow chunking up execution plans into manageable, composable pieces. Dialog templates are context sensitive instantiations of events or fragments with conditions and template expressions to be evaluated and produce output. Invariants and metrics are for composing events and fragments in a controlled, natural sounding way, framed as an optimization problem.

Dialog events are the defined entry points into the dialog editor 244 for the rest of the system 200. When a part of the concept action network 212 requires or desires dialog, the part specifies an execution context and an event mode. Event modes capture the high level purpose of the requested dialog, and include, but are not limited to, instantiation mode, selection mode, route mode, progress mode, authorization mode, confirmation mode, storage mode, result mode, no result mode, and follow up mode. Instantiation mode is an event to request one or more values from an end user. Selection mode is an event to instruct an end user to select from a set in order to continue, optionally explaining the set in context. Route mode is an event to request one or more ways of proceeding with upstream execution. Progress mode is an event to explain an action that is about to be invoked. Authorization mode is an event to prompt for authorization to call a service. Confirmation mode is an event to ask for confirmation to invoke an action. Storage mode is an event to ask for confirmation to store one or more values. Result mode is an event to fully explain a result set in context. If there is a single result whose value is easy to paraphrase, the value may be included in the output. No result mode is an event to fully explain the lack of results. Follow up mode is an event to modally prompt for a follow up action to some result set in context. Dialog event productions form a complete output intent, maximize the relevant information in context, and are produced atomically or assembled by delegation to constituent dialog fragments.

The system 200 outputs three main types of prompts, elicitation prompts, selection prompts, and route prompts. The system 200 outputs an elicitation prompt when new information is required by the system 200 at plan execution time. A user responds to an elicitation prompt with a value of the required type or a way to compute a value of the required type. A response to an elicitation prompt and subsequent planning after an elicitation prompt enables the system 200 to enhance the original plan with additional intent. The system 200 keeps the original intent and all original plan nodes, and adds new intent and/or new plan nodes. The system 200 outputs a selection prompt when the user needs to select from information that has been collected or computed during some original plan execution. A user responds to a selection prompt with one of the listed values or a way to narrow down the list of values. A response to a selection prompt and subsequent planning after a selection prompt enables the system 200 to clarify and refine the original plan by replacing some of the original intent with new intent. The system 200 may preserve some original intent and some original plan nodes, but the system 200 will use new intent to replace or filter some old intent in the new plan. The system 200 may also introduce additional plan nodes. The system 200 outputs a route prompt when the user needs to select from two or more alternative ways of accomplishing something. These alternatives are typically different actions that either have side-effects or that would require further, more-specific prompting. A user responds to a route prompt with a way to proceed or a specific value that implies a specific way to proceed. A response to a route prompt and subsequent planning after a route prompt enables the system 200 to clarify and refine the original plan by removing and/or replacing some of the original non-intent plan nodes. The system 200 preserves all original intent, and may introduce additional intent from the response to help create a more succinct plan.

In order to provide relevant and meaningful dialog in a concept action network 212, without all composable relationships known a priori, dialog event productions delegate to specialized fragment productions wherever possible. Dialog fragment productions create output fragments of the linguistic forms specific to each fragment mode. Fragment modes include concept fragment mode, action fragment mode, input fragment mode, and value fragment mode. The concept fragment mode paraphrases an execution context as a determiner phrase, parameterized by a determiner type, and works on both concept objects and action objects, treating either as a concept object. An action fragment mode paraphrases an execution context as a verb phrase, and works on both action objects and concept objects, treating either as an action object. An input fragment mode describes an execution context as an adjective or adjectival clause. A value fragment mode produces the canonical representation of the dynamic values present in an execution context.

A binding context serves to define the applicability of a dialog template by specifying a linear, downstream slice of concept objects and action objects. The downstream slice can capture single, standalone nodes, or more meaningful sequences of nodes, like action inputs, action invocations, and/or property projections. For example, the following binding context defines some template applicability to a phone number that is passed into an action object as an input:

```
context {
    number ( phone.PhoneNumber )
    action ( $Action )
}
```

However, this next binding context adds additional specificity to define applicability to a phone number that is first projected from a business, then passed into some action object as an input:

```
context {
    bizniz ( biz.Business )
    number ( phone.PhoneNumber )
    action ( $Action )
}
```

While some execution context may exist that fits both contexts, a more specific binding context is often preferred to a less specific one. Another purpose of the binding context's sequence of concepts and actions is to serve as a named parameter list for associated expressions. Each step of the sequence is a parameter, and each parameter can have a name attached. In the previous example, there are three named parameters: bizniz, number, and action. At evaluation time, the named parameters are bound to the actual execution context that the binding context matched. Any conditional expression or template expression associated with the binding context can use the named parameters in the production of dialog output.

Dialog event modes and fragment modes are instantiated as dialog templates, which combine a mode with a binding context defining static applicability and available parameters, an optional conditional expression for dynamic applicability, and a template expression to produce the desired output. A key power of template expressions is their ability to dynamically delegate to other dialog fragments, passing along their attached, unconsumed context. Multiple, overlapping templates can be defined by third-party developers or by network operators. Typically, templates provided by network operators serve as defaults that are used to provide a baseline quality of dialog.

Template expressions can include special structural blocks to encode richness and variation such as optional blocks, conditional blocks, join blocks, and choice blocks. The template expression itself can be statically analyzed for a number of features, such as required values, optional values, delegated rendering metrics, value rendering metrics, and bound parameter usage. These features can later be used as metrics to guide template selection/evaluation and dialog production, which allows for different modalities and/or different events to prioritize different features, based on personal preferences or end user experience.

Linguistic agreement is notable challenge that arises when generically producing user input based event and fragment productions for a given language. Linguistic agreement involves matching values of grammatical categories between parts of a sentence. The dialog editor 244 takes a language independent approach to handling linguistic agreement by introducing dialog features as abstractions and usage restrictions over the common grammatical categories. These features are tied to the execution semantics of a concept action network plan, and can include the count of results at the position, the contextual position of execution, the direction of execution, and the mode of dialog production. The count or expected count of the results at the position is an abstraction over the grammatical number category. The contextual position of execution is an abstraction that aids in encapsulating many grammatical category agreements, like case and gender. The position of an execution context is the modeled node, either a concept object or an action object, in the context of the upstream sources that the node is derived from and/or the downstream targets that will be derived from the node. The direction of execution is an abstraction over grammatical tense and aspect, and includes pre-evaluation pre-dependency, pre-evaluation post-dependency, mid-evaluation, and post-evaluation. The event mode and fragment mode of the dialog production are abstractions over grammatical mood and person. The event mode is the top level dialog event for which the fragment is being produced. By redefining linguistic agreement in terms of the count, position, direction, and mode features, the dialog editor 244 is able to remain language independent at the output production level. The language dependent details of each feature are specified as declarative, conditional constraints at the language specific template layer.

For any given execution context and event or fragment mode, there can be a number of applicable templates to select and render. The dialog editor 244 can use a number of metrics and fitness functions to determine the best dialog output to produce by taking into consideration the presence and/or count of required elements, the presence and/or count of optional elements, the presence or absence of result value fragments (result value fragments are often preferred for eyes free modalities while they tend to duplicate information for modalities that include result lists), length of concept and input fragment rendering chains used to craft more or less detailed output based on the experience of the end user, and the number of rendered elements that cover intent signals. The selection function itself can be end user and modality specific, allowing the dialog editor 244 to plan the dialog production specifically for each end user.

Dialog output can be highly variable because of the emergent, composable nature of the system 200 and extensibility afforded to third-party developers for context sensitive dialog fragments. To ease in the development and quality assurance process, the dialog editor 244 tracks the detailed provenance of all templates contributing to a dialog output production. Every element of dialog output rendered by a dialog template tracks the evaluated expression, the unevaluated template expression, the template author, the template mode, and the bound context, complete with count, position, and direction of each parameter. If a template delegates to another dialog fragment during its evaluation, the full provenance record of the delegate is tracked as well.

In addition to interpreting intents to create plans which execute multiple action objects, as described above in reference to the method of FIG. 3 and depicted in the user interfaces of FIG. 4 through FIG. 6, the system 200 may interpret an intent which requires the execution of only a single action object. Since the system 200 can interpret user input via vocabulary and training examples, the process of improving vocabulary and training examples determines how well the system 200 handles user requests. For example, a user in Washington D.C. makes a request to the system 200 to find parking near the White House. The natural language intent interpreter 254 interprets the user's request "Where can I park near the White House?" However, the quality of results may be poor if the natural language intent interpreter 254 unhelpfully infers that the user is asking for restaurants, rather than parking lots. In this situation, the user clicks a "thumbs down" button on the results. Later a third-party developer named Alice is interested in improving geographic business queries, and begins evaluating quality to improve handling such requests. FIG. 7, which is described below, depicts a system interpretation based on an effort to improve handling such requests.

FIG. 7 illustrates an example user interface for third-party developers for a dynamically evolving cognitive architecture system based on contributions from third-party developers, under an embodiment. The user interface 700 for third-party developers dynamically shows interpretations of natural language based on current training. The user interface 700 depicts an interpretation by the natural language intent interpreter 254 to Alice's test query, "Where can I park near the White House?" This interpretation looks for businesses that will match the vocabulary "park" near the White House, which is correct. FIG. 8, which is described below, depicts a system interpretation of another effort to improve handling such requests.

Figure 9:
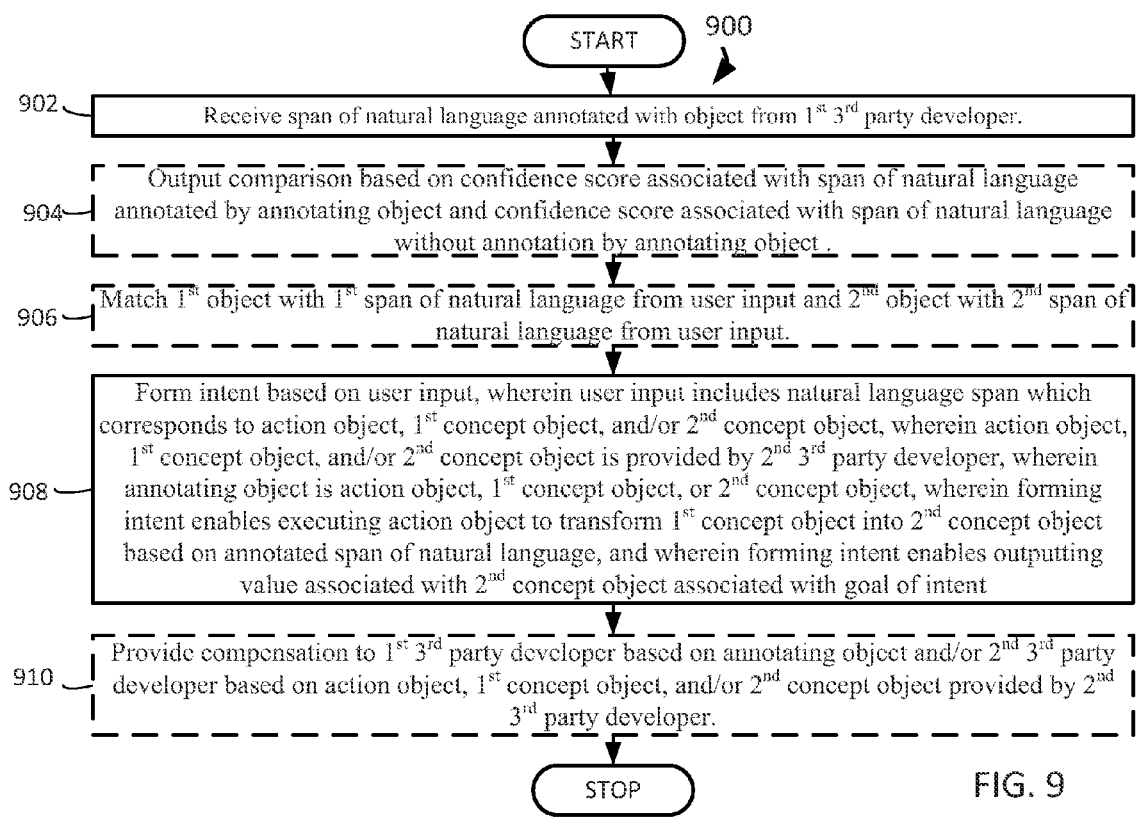
FIG. 9 is a flowchart that illustrates another method for a dynamically evolving cognitive architecture system based on contributions from third-party developers, under an embodiment.

FIG. 8 illustrates another example user interface for third-party developers for a dynamically evolving cognitive architecture system based on contributions from third-party developers, under an embodiment. Based on feedback from the user, which is retained by the system 200, Alice also tests the interpretation of a slightly different request, "What's a good place to park near the White House?" The user interface 800 depicts that the natural language intent interpreter 254 interprets Alice's slightly different request incorrectly, because in previous training by another third-party developer, the word "place" has typically been used to refer to restaurants, rather than businesses or parking facilities. Therefore, Alice understands that more training is needed to handle this example. FIG. 9, which is described below, describes a training method, which can handle this example.

FIG. 9 is a flowchart that illustrates another method for a dynamically evolving cognitive architecture system based on contributions from third-party developers, under an embodiment. Flowchart 900 illustrates method acts illustrated as flowchart blocks for certain steps involved in and/or between the clients 202-206 and/or the servers 206-208 of FIG. 2.

A span of natural language annotated with an object is received from a first third-party developer, block 902. For example and without limitation, this may include the training platform 251 receiving Alice's training example, What's a (good place)[g:biz.Business] (to park) [v:biz.BusinessCategory:Parking] {near (the white house) [v:biz.BusinessName]} [g:geo.GeoRegion]. FIG. 10, which is described below, depicts a system interpretation based on the addition of Alice's training example. The user interface 1000 indicates that the interpretation made by the natural language intent interpreter 254 is now correct.

A comparison based on a confidence score associated with a span of natural language annotated by an annotating object and a confidence score associated with the span of natural language without annotation by the annotating object is optionally output, block 904. By way of example and without limitation, this may include the training platform 251 outputting the phrase "well learned" to Alice, who annotated "good place." The training platform 251 outputs "well-learned" because the natural language intent interpreter 254 was able to recognize "good place" as corresponding to a route associated with a parking request action object based on a 0.480 matching confidence score (normalized between zero and one) when "good place" is not annotated with a route associated with the action object for a parking request, and the natural language intent interpreter 254 was able to recognize "good place" as a route associated with a parking request based on a 0.720 matching confidence score when "good place" is annotated with a route associated with the action object for a parking request. The output of "well learned" to the first third-party developer enables the first third-party developer to use training time more efficiently on training examples that are not already well learned rather than on training examples that are already well learned. Alternatively, the training platform 251 outputs "add more like this" to encourage Alice to provide additional similar training examples so that the 0.720 matching confidence score for "good place" may increase above 0.720. The output of "add more like this" to the first third-party developer enables the first third-party developer to use training time more efficiently on training examples that are not already well learned rather than on training examples that are already well learned.

If desired, Alice may manually review how her training has affected other known training results, based on summary or statistical reports provided by the system 200, or automated tests based on known queries. For example, the annotation of the phrase "good place" as a route to a business could affect handling of requests for restaurants, such as "What's a good place to eat?" Alice may add or edit training data further, or even edit services or objects to address modeling issues. Then Alice then publishes her changes, and pending approval by the community operator and/or the system operator, the changes become available to users.

A first object is optionally matched with a first span of natural language from a user input and a second object is optionally matched with a second span of natural language from the user input, block 906. In embodiments, this may include the natural language intent interpreter 254 matching the span of natural language "good place" with a route associated with the action object for a parking request based on a 0.720 matching confidence score and matching the span of natural language "near downtown San Jose," with the concept object for a geographic location based on a 0.966 matching confidence score, where each of the confidence scores are greater than a matching threshold required to identify a match, and where the concept object for the geographic location is provided by a second third-party developer named Bob.

An intent is formed based on a user input, wherein the user input includes a natural language span which corresponds to an action object, a first concept object, and/or a second concept object, wherein the action object, the first concept object, and/or the second concept object is provided by a second third-party developer, wherein the annotating object is the action object, the first concept object, or the second concept object, wherein forming the intent enables executing the action object to transform the first concept object into the second concept object based on the annotated span of natural language, and wherein forming the intent enables outputting a value associated with the second concept object associated with a goal of the intent, block 908. For example and without limitation, this may include the natural language intent interpreter 254 responding to a user saying "Where is a good place to park near downtown San Jose?" by forming an intent as a parking recommendation based on the concept object for a geographic location, downtown San Jose. The natural language intent interpreter 254 does not execute the action object for the parking recommendation, but provides the intent to the execution engine 252, which executes the action object for the parking recommendation, which transforms the concept object for the geographic location into a concept object that lists specific parking lots near downtown San Jose, which the system 200 outputs as the response to the user's query.

Compensation is optionally provided to at least one of the first third-party developer based on the annotating object and the second third-party developer based on at least one of the action object, the first concept object, and the second concept object provided by the second third-party developer, block 910. By way of example and without limitation, this may include the system 200 providing compensation to Alice based on annotating "good place" because the user query for parking near downtown San Jose benefitted from this training, and because Alice's annotating object enabled the system to significantly increase the confidence score associating with interpreting "good place" from 0.480 to 0.720. The compensation increases a likelihood of further use of at least one of the annotating object provided by the first third-party developer and at least one of the action object, the first concept object, and the second concept object provided by the second third-party developer. For example, part of the compensation provided to Alice is the increased use of Alice's annotating object for subsequent queries. In another example, part of the compensation provided to Bob is the increased use of the concept object for the geographic location object, which was provided by Bob, which may be referred to as increased traffic for Bob's object. As a result of training attribution analysis, the system 200 can track statistics on which training examples have contributed to which results that are positively rated. In this example, Alice obtains compensation, such as virtual credits, every time a user gives positive feedback to results that were influenced by her training data. New contributors can write new services, and benefit from contributions of others. For example, the third-party developer named Bob integrates a new service. As part of the process of producing training data, all available training data provided by previous developers, including Alice, is available. New training can be suggested based on a variety of factors. For example, training examples that have been positively received involving some of the same concepts could be suggested to Bob, and he could include or adjust the training data to improve results for user requests that involve his own services. The benefit of training by others can also go on behind the scenes, without direct awareness by the new contributor, if a set of training data has been determined relevant to the new training data, either by automated or other mechanisms, such that the set of training data may be used to automatically backfill and complete the new training data. The system 200 may enable Bob to pass on compensation to Alice for the training examples that were useful to him. Alternately, the system 200 can automatically credit Alice when Bob uses training examples based on or similar to hers.

In another example, Alice annotates the span of natural language "cool my bedroom to" with a thermostat setting action object. Bob has already provided the concept object for thermostat values in degrees Fahrenheit. The natural language intent interpreter 254 interprets the span of natural language "Cool my bedroom to 68," as the intent to change the thermostat setting in the user's bedroom to 68 degrees Fahrenheit. The natural language intent interpreter 254 provides the intent to the execution engine 252, which executes the thermostat setting action object to transform the previous thermostat setting concept object into the new thermostat setting concept object with the value of 68 degrees Fahrenheit, which results in outputting a value which cools the user's bedroom, as requested. Although the previous example describe the combination of contributions by third-party developers who provide training and provide an object, the system 200 may also combine contributions by third-party developers who each provide training and combine contributions by third-party developers who each provide objects.

Although FIG. 9 depicts the blocks 902-910 occurring in a specific order, the blocks 902-910 may occur in another order. In other implementations, each of the blocks 902-910 may also be executed in combination with other blocks and/or some blocks may be divided into a different set of blocks.

FIG. 10 illustrates another example user interface for third-party developers for a dynamically evolving cognitive architecture system based on contributions from third-party developers, under an embodiment. The user interface 1000 indicates that the interpretation made by the natural language intent interpreter 254 is now correct.

Figure 11:
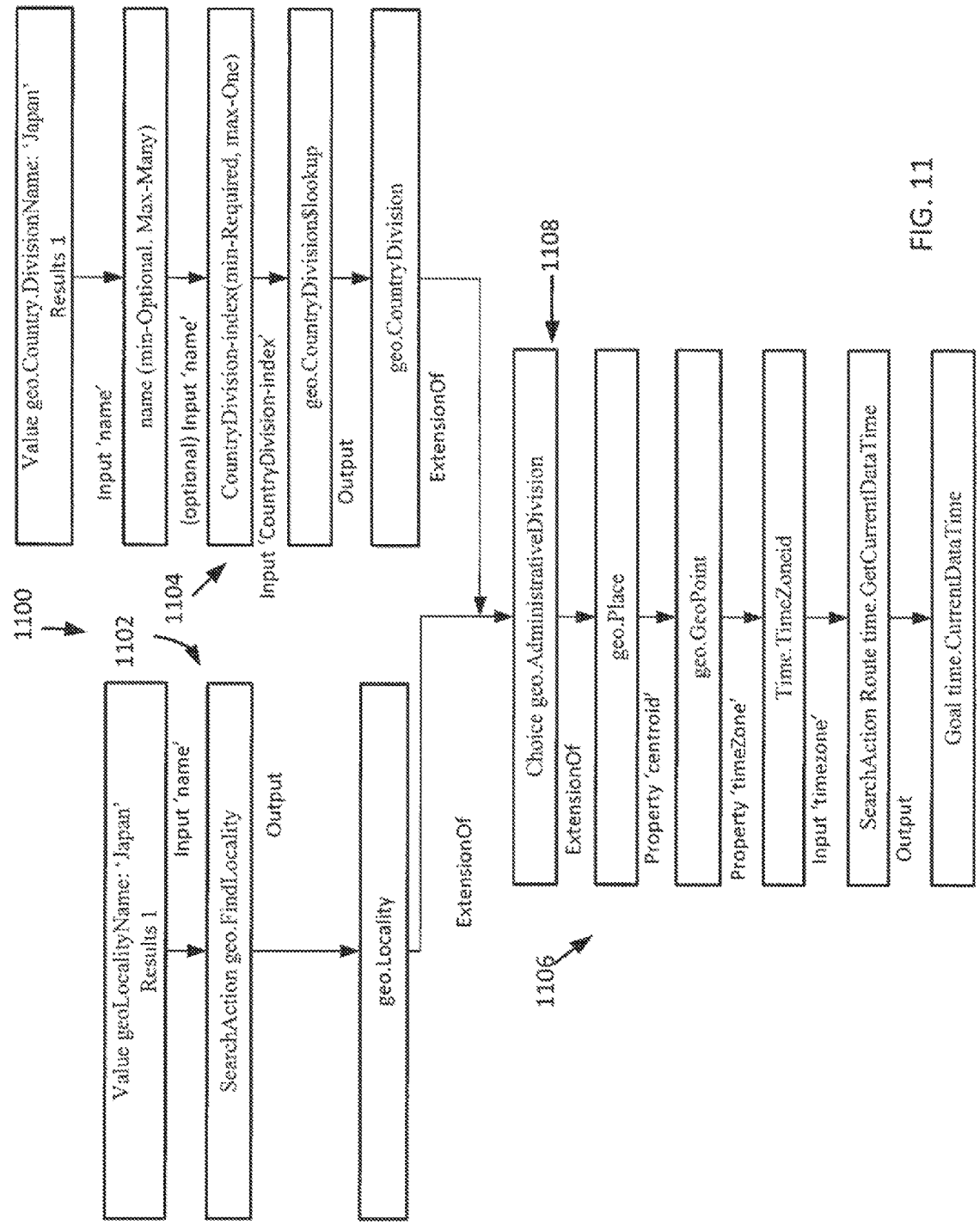
FIG. 11 illustrates a block diagram of an example plan for a dynamically evolving cognitive architecture system based on contributions from third-party developers, under an embodiment.

FIG. 11 illustrates a block diagram of an example plan for a dynamically evolving cognitive architecture system based on contributions from third-party developers, under an embodiment. In this example, the system 200 responds to a user saying "What time is it in Japan?" by creating the plan 1100. The plan 1100 includes a left branch 1102, a right branch 1104, and a central branch 1106. The plan 1100 represents an ambiguity based on the assumption that a third-party developer has taught the system 200 that "Japan" could be both the name of a country and the name of a city, which is called a locality in the general geographic model. Therefore, the planner 214 begins with two given source signals, both with concrete values of "Japan," but with two different types, city name and country name. The left branch 1102 and the right branch 1104 represent the resolution of the respective city and country source signals to a common resolved form, an AdministrativeDivision. The system 200 knows how to get a time zone from an AdministrativeDivision, from which the system 200 can query the current time. The static plan 1100 represents an effort at unifying the source signals under a coherent plan that will achieve the goal. At runtime, the system 200 executes both the left branch 1102 and the right branch 1104, either serially or in parallel. When the values "join" at the AdministrativeDivision node 1108 labeled "choice," the following three cases may occur. First, "Japan" is a city, and not a country, such that the system 200 selects the locality value without prompting the user and returns the time. Second, "Japan" is a country, and not a city, such that the system 200 selects the country value is selected without prompting the user and returns the time. Third, "Japan" is either both a city and a country, or more than one of either, such that the system 200 prompts the user to clarify. This process is subject to dynamic learning, whereby the system 200 "learns every day." As the system 200 is used, users will respond to prompts like this to inform the system 200, and the third-party developers by proxy, that "Japan" is not a city, or is rarely a city, and the system 200 subsequently adjusts its behavior. Although FIG. 11 illustrates an example of the system 200 creating a single plan with a joining sequence that includes a limited number of action objects and concept objects, the system 200 creates multiple plans each of which may include any combination of linear sequences, splits, joins, and iterative sorting loops, and any number of action objects and concept objects.

Figure 12:
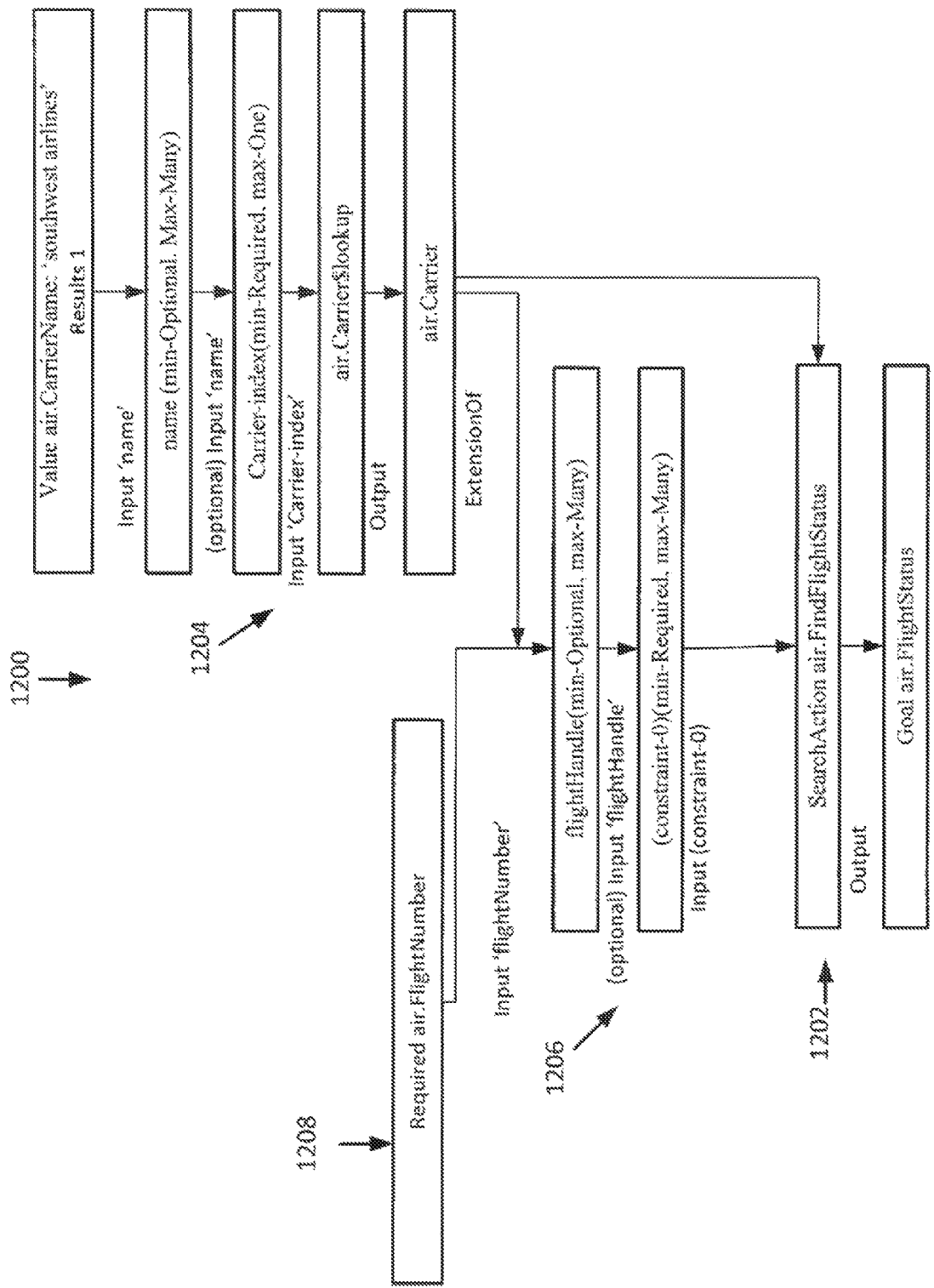
FIG. 12 illustrates a block diagram of another example plan for a dynamically evolving cognitive architecture system based on contributions from third-party developers, under an embodiment

FIG. 12 illustrates a block diagram of another example plan for a dynamically evolving cognitive architecture system based on contributions from third-party developers, under an embodiment. In this example, the system 200 responds to a user saying "Find Southwest flight status." by creating the plan 1200. The plan 1200 includes an action object 1202, a right branch 1204, a central branch 1206, and an object 1208. A third-party developer models the "FindFlightStatus" action object 1202 to accept both a "flightHandle," which consists of a required FlightNumber and an optional carrier, and a carrier. The third-party developer indicates that the action object 1202 can handle queries like "status of flight 501" and "status of united 501" without interrupting the user. However, the "Find Southwest flight status" query does not contain enough information because there are too many flights to reasonably query or present the results to the user, such that the system 200 must query the user for clarification. The right branch 1204 involves a resolution to a carrier given its name, such as "southwest." Assuming that the right branch 1204 succeeds, the system 200 uses a "split" with the carrier identification to both initiate the construction of a flight handle, in the central branch 1206, and pass directly to the FindFlightStatus action object 1202. The construction of the flightHandle follows what the third-party developer has prescribed, that it must contain a FlightNumber. When the system 200 cannot find a flight number, the system 200 inserts a placeholder in the "Required: air.FlightNumber" object 1208, which will later induce the system 200 to prompt the user with, for example, "Which southwest airlines flight(s) would you like to check?" Although FIG. 12 illustrates an example of the system 200 creating a single plan with a join and a split, which includes a limited number of action objects and concept objects, the system 200 creates multiple plans each of which may include any combination of linear sequences, splits, joins, and iterative sorting loops, and any number of action objects and concept objects.

Figure 13:
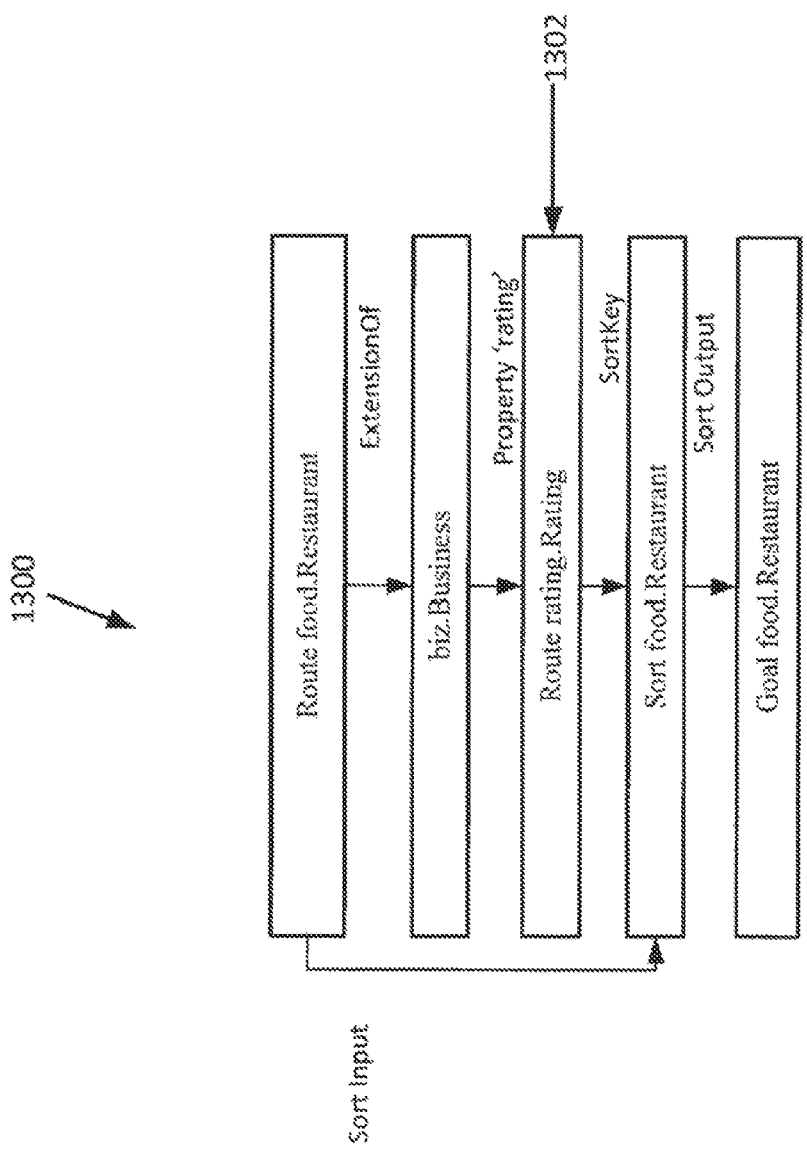
FIG. 13 illustrates a block diagram of yet another example plan for a dynamically evolving cognitive architecture system based on contributions from third-party developers, under an embodiment

FIG. 13 illustrates a block diagram of an example plan for a dynamically evolving cognitive architecture system based on contributions from third-party developers, under an embodiment. In this example, the system 200 responds to a user saying "Show the highly rated restaurants," by creating the plan 1300. This example assumes to have a set of restaurants, perhaps from a prior result. The system 200 may cache user input data and system output data from a previous user request, and use the cached data as context for a subsequent user request. For example, the system 200 may cache user input data and system output data from a previous user request to find restaurants within a proximity of a shopping area that the user plans on visiting, and use the cached data as context for the subsequent user request for the highest rated of the identified restaurants. The system 200 transforms the user's intent of "highly rated" into a reference to the "rating.Rating" concept 1302, with special platform-provided instructions to "sort by this." Although FIG. 13 illustrates an example of the system 200 creating a single plan with a iterative sorting loop that includes a limited number of action objects and concept objects, the system 200 creates multiple plans each of which may include any combination of linear sequences, splits, joins, and iterative sorting loops, and any number of action objects and concept objects.

Figure 14:
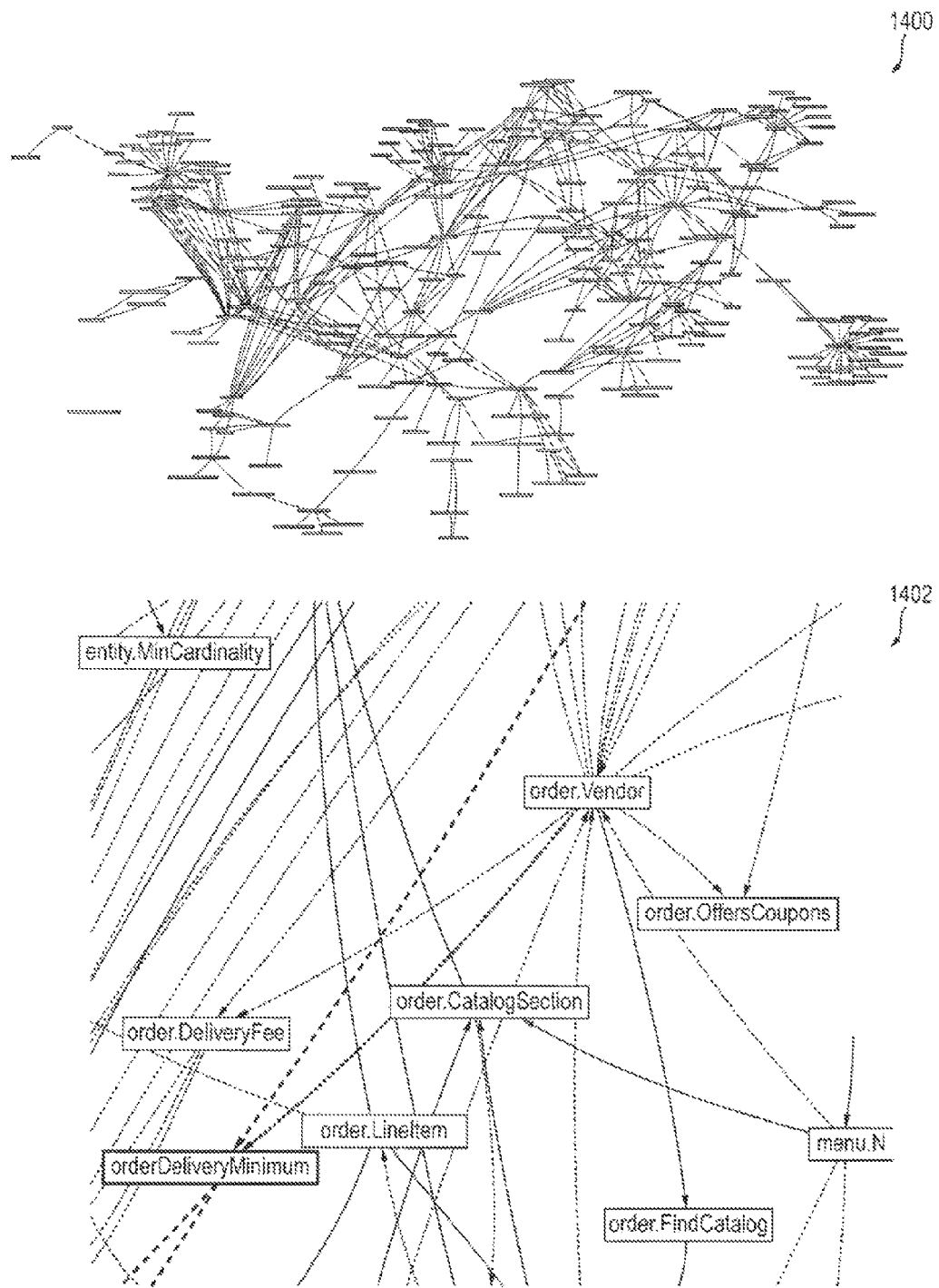
FIG. 14 illustrates a block diagram of an example of abstract representations of a small concept action network for a dynamically evolving cognitive architecture system based on contributions from third-party developers, under an embodiment.

FIG. 14 illustrates a block diagram of an example of abstract representations of a small concept action network for a dynamically evolving cognitive architecture system based on contributions from third-party developers, under an embodiment. Although the abstract representation 1400 of a small concept action network includes about 300 objects, a real-life concept action network could include thousands or millions of objects. The detailed slice 1402 of abstract representations of a small concept action network includes labels on concepts and actions and their relationships.

An extension is a strong relationship between concept objects corresponding to the classic "is a" relationship in computing and philosophy. Concept objects related by extension are expected to be substitutable. For example, if a restaurant extends a business, a restaurant is expected to have all of the components of a business and is expected to be able to be used anywhere a business is expected. Concept objects may extend more than one other concept object, as the concept action network 212 supports multiple inheritances.

A property is a strong relationship between concept objects that corresponds to the "has a" or containment relation. For example, a business (Business) has a property for its phone number (PhoneNumber). Properties may represent a one-to-many relationship, such as a business having multiple phone numbers, and these properties may carry cardinality restrictions.

Action-connection edges include inputs and outputs. Inputs connect concept objects, such as a "restaurant," to action object inputs, such as "BookReservation." Action object inputs are models of what an action object requires in order to execute properly. Action object outputs connect corresponding action objects to the concept objects corresponding to their output type, such as "reservation." Outputs represent what an action object produces when it executes as expected. The precise structure of the concept action network 212 acts as the central implementation point for many components of the system 200.

In some situations, the system 200 enables concept objects to be directly transformed into other concept objects without action objects. For example, if a "call" action object needs a PhoneNumber, and the planner 214 selects a business concept object, the planner 214 separates or selects the phone number component of the business concept object and feeds the phone number component to the "call" action object. The resulting sequence for this part of the plan is: beginning concept object, concept object component, action object and resulting concept object or business concept object, PhoneNumber concept object, Call action object and InProgressCall concept object. There are three main cases of concept object to concept object transformations without action objects, property projections, extensions, and contextualizations. Property projections include copying, or selecting, once piece of an existing concept object as another concept object, such as selecting a PhoneNumber concept object from a Business concept object. Extensions include treating a specific concept object as its more general form, such as treating a Restaurant concept object as a Business concept object. Contextualization includes treating a general concept object as a more specific form of concept object, such as assigning the role of ArrivalAirport to a generic instance of Airport. None of these transformations actually involve manipulation of data; they only prescribe viewing the concept object from a different perspective. The property, extension, and contextualization relationships are parts of the declarative declaration of a concept object, such that they are third-party contributions.

FIG. 15 illustrates a block diagram of example object representations for a dynamically evolving cognitive architecture system based on contributions from third-party developers, according to an embodiment. Each of the objects in the concept action network 212 may be represented in a format using domain specific languages. The format may be declarative, rather than imperative, such as is typical with many programming languages. Third-party developers specify objects and contribute the objects to the shared concept action network 212. Each object may extend or reference other objects defined by the third-party developer community. Some examples of these formats include a type system for concept objects that allows a variety of aspects of a concept object to be declared, including type extension, properties, enumerations, etc., and a format for action objects that allows declaration of inputs and outputs and other aspects of an action object. Some other examples of these formats include a language for specifying formatting and rendering of data for display to an end user, a language for implementation of functions, and a language for describing executions that may occur based on input to achieve the output.

A third-party developer may edit these objects using conventional developer tools, such as code editors, or dedicated tools specifically built for editing the concept action network 212. Third-party developers may contribute code to a versioned object storage system that optionally supports collaborative development and may allow third-party developers to track versions of their code, as well as fork or merge changes from one set of objects to another, much as with standard revision control systems. The object representations 1500 shows possible syntax for describing a few concept objects, which include primitive and structure types, with optional extensions and properties. The object representations 1500 shows a sample action object, including inputs, input types, input constraints, and outputs.

FIG. 16 illustrates a block diagram of example dialog templates for a dynamically evolving cognitive architecture system based on contributions from third-party developers, according to an embodiment. Another example of the formats using domain specific languages is a templating language for specification of language dialog that will be shown to an end user. The example dialog template 1600 and 1602 include patterns that indicate applicability of dialog expressions in different situations.

FIG. 17 illustrates a block diagram of an example description of an equivalence policy 1700 for a dynamically evolving cognitive architecture system based on contributions from third-party developers, according to an embodiment. Yet another example of the formats using domain specific languages includes an equivalence specification language that allows declaration of when different concept values are equivalent. For example, two restaurants may be considered equivalent if their phone numbers are the same, so the language allows description of the identifying fields that determine equality or inequality. The example description of an equivalence policy 1700 indicates when businesses, restaurants, or geographic points may be considered equal, based on structural, string, or numeric equality.

Figure 18A:
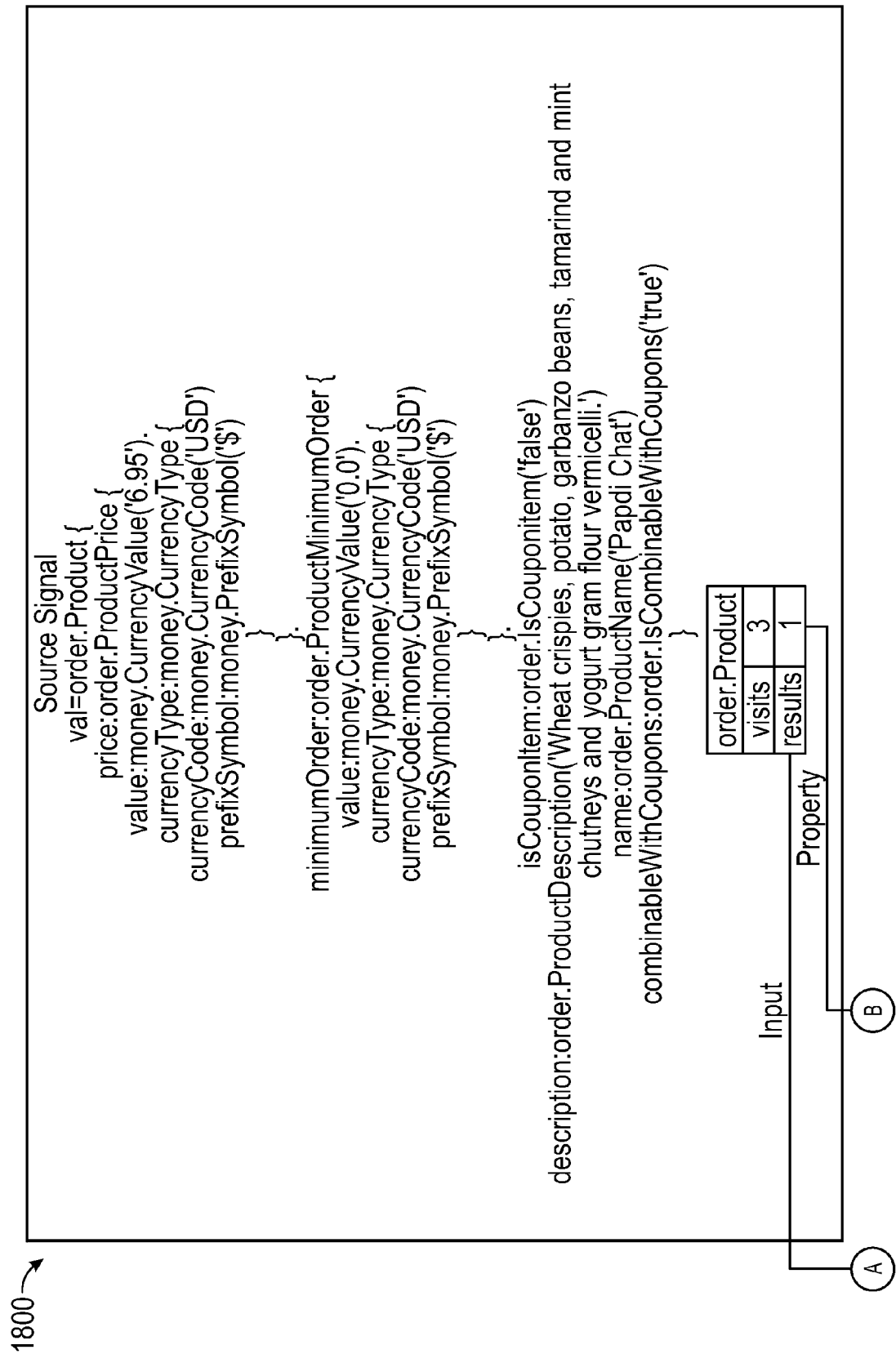
FIGS. 18A and 18B illustrate a block diagram of example concept action network nodes and edges for a dynamically evolving cognitive architecture system based on contributions from third-party developers, under an embodiment.
Figure 18B:
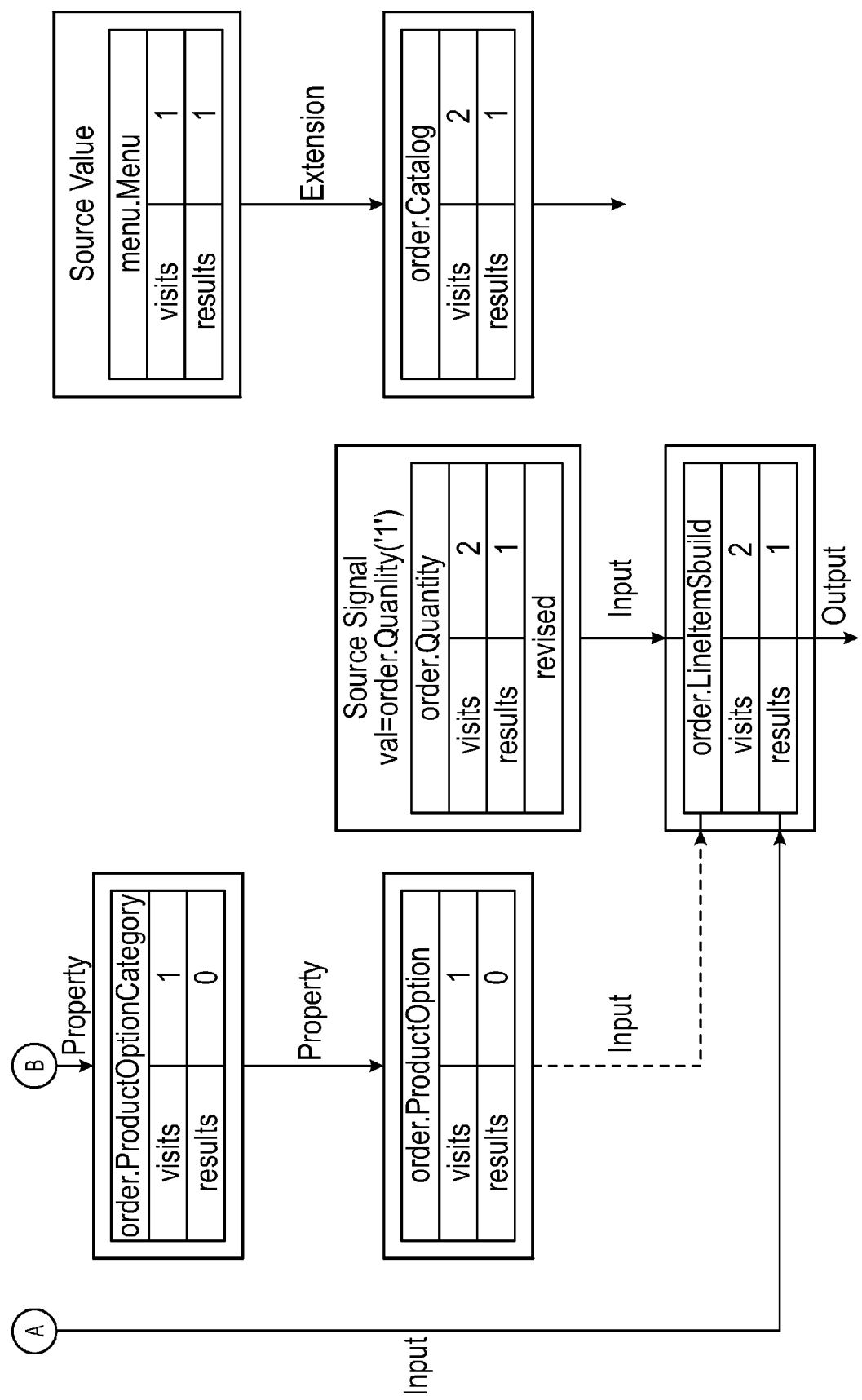

FIGS. 18A and 18B illustrate a block diagram of example concept action network nodes and edges 1800 for a dynamically evolving cognitive architecture system based on contributions from third-party developers, according to an embodiment. The elements, such as nodes and edges, in the concept action network 212 map to well-defined semantics that allows an end user to use them. The process by which a node, such as an action object, is executed or evaluated corresponds to the invocation of a provider. For example, the execution semantics may prescribe: 1) the invocation of one or more Internet enabled services; 2) the manipulation of data returned by a service in a well-defined way; 3) the dynamic disambiguation of information, both implicitly from intermediate results and explicitly through end user input prompting; 4) the elicitation of additional information, such as credentials for a service; and 5) the interactive rendering of results produced at one or more nodes, starting and termination conditions and a well-defined execution order.

An example of an element of these semantics is the evaluation of property edge. Property edges exist between concept objects and are interpreted as selective forms of data copying. The execution of a property edge involves selecting a component, or piece, of one concept object and copying it into another concept object. To execute a property edge between a concept object A and a concept object B, the execution engine 252 copies the component of the concept object A corresponding to the property associated with the edge from within the concept object A and instantiates the component in the slot reserved by the concept object B. The execution engine 252 may implement these semantics as server side software. The example concept action network nodes and edges 1800 are depicted during the process of execution by the execution engine 252.

The execution engine 252 implements execution of action objects via functions, which are also contributed by third-party developers. Functions are represented in a programming language or declarative form that enables a third-party developer to fully specify how an action object is implemented in terms of data manipulations, external web service calls, and so on. In the case where functions are implemented in a traditional imperative or functional programming language, concept action network functions may correspond to methods or functions in the programming language. Concept objects may be mapped to values within the programming language. The programming environment may also offer additional features to facilitate use of web services, threading, error handling, and returning of output values as concept object values and indications of concept object types via metadata, where resource management may be facilitated by the execution engine 252. In other cases, function executable code may be synthesized by a declarative description of the function's operation, such as the mapping of input parameters to web service parameters, and the mapping of web service results to output values. Based on this declarative description, the function may be run via an interpreter or compiled into executable code.

When data values are vended by multiple functions, declaratively modeled hierarchical equivalence policies may analyze values pairwise to determine whether the data values are equivalent, are not equivalent, or are of unknown equivalence. These equivalence policies may delegate to sub-policies or use a set of predefined predicates for primitive value comparisons.

During the course of execution, the execution engine 252 may annotate data sources with metadata to indicate their source. For example, provenance may include an end user who entered the data, the name of a service, foreign keys on a remote system, and the copyright data associated with a piece of information. As data flows throughout nodes during execution, the execution engine 252 tracks the provenance of the data so that the ultimate result contains representations or links to the full, combined set of sources that contributed to a result. This information may be made available to an end user in some user interfaces. The system 200 may also use the provenance data stylistically when rendering, and to indicate follow up actions.

In an embodiment, a preference library collects two types of preference data, end user explicit and end usage implicit. An example of end user explicit data is quick completion of regular order preferences, such as when an end user starts to order a sandwich and immediately seeing the autocomplete showing the exact type and condiments from previous orders such that the end user has a quick option to complete a full order as a shortcut for the same order as the order last time. Another example of end user explicit data is the recommendation of restaurants based on known food type preferences, such as when an end user either tags foods that the end user likes in the interface in the same way a "like" button works for social networks, or explicitly tells the system 200 about specific favorite food dishes so that the system 200 may use this information to locate restaurants serving variants of this food that are known either by menu data or mentions from reviews. End user explicit data may also include "things to do recommendations," such as when an end user clicks on a quick menu of options for favorite social, cultural or category based things the end user likes to do, and the system 200 then uses this data to recommend a set of preference matched events, local attractions or other candidate geographically relevant activities with a single click of a button. A further example of end user explicit data is travel preferences, such as when the system 200 collects all travel preference data and applies the data to relevant planning and booking, such as frequent flyer information, seat preferences, hotel amenities, such as extra pillows, ocean views or rooms with entertainment systems with kids games, and general such as "hotels with a spa," hotels "on the beach," on so on. This may include the system 200 prompting the user to determine the type of trip being planned, such as individual travel, for which the system 200 uses personal preferences, or a family based trip, such as when the kids going, when it a romantic trip, or when it is an adventure trip In an embodiment, end usage implicit data may include any items ever selected via a generic menu of options becoming an implicit favorite, any specifically requested item categorized and assigned as a favorite within that category, and any ordered item in understood categories considered a favorite, such as when an end user orders pizza, this data implies that the end user "likes" pizza. Another example of usage implicit data may be if an end user frequently reserves flights that leave in the morning hours during weekdays, the system 200 understands that the end user prefers morning flights during the week. Likewise, if an end user reserves the same restaurant over and over, the system 200 assumes that the end user "likes" this restaurant and subsequently recommends restaurants similar to this restaurant when the end user is in unfamiliar geographies. Similarly, if an end user is at a certain location for four nights in a row at 2:00 AM, the system 200 infers that the end user lives at that location or if an end user travels between point A in the morning to point B and back the same route in the evening many times, the system 200 infers that the end user works at point B.

Global learning is the confirmation of hypothesis by contextual user trends. The system 200 prompts an end user for a direction when an end user input may have multiple meanings. The system 200 reviews those disambiguation samples, examine the context, and learn what most people choose in order to avoid asking next time for similar inputs.

Figure 19:
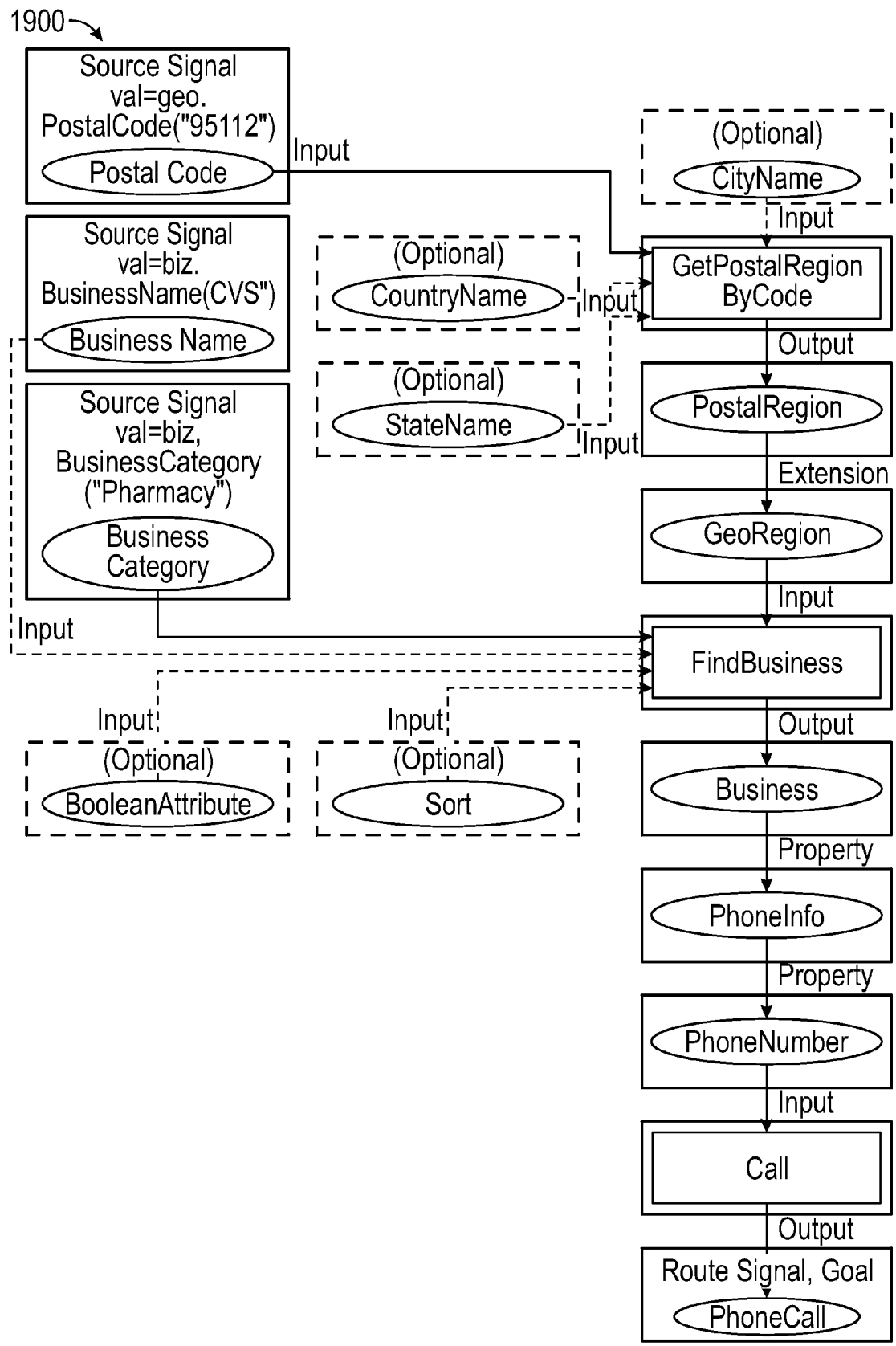
FIG. 19 illustrates a block diagram of an example plan for a dynamically evolving cognitive architecture system based on contributions from third-party developers, under an embodiment.

FIG. 19 illustrates a block diagram of example plan 1900 for a dynamically evolving cognitive architecture system based on contributions from third-party developers, under an embodiment. The planner 214 may start with a null plan, a disconnected graph consisting solely of the signals and the goal, and growing the null plan into a full executable plan. The planner 214 incrementally connects nodes in the null plan, the intentional nodes, pairwise with paths. The planner 214 may define these paths in advance, such as inferred from usage data or pre-computed via a shortest/simplest heuristic, or the planner 214 may learn the path online through the traversal of the graph structure of the concept action network 212. The planner 214 adds and removes paths as defined by a set of search parameters, including, for example, a limit on the total amount of computation performed. The addition of paths to a plan and the removal of paths from a plan effectively induces a search over a diverse sequence of plans, each of which the planner 214 evaluates for fitness via a configurable objective function. The planner 214 stores the current best plan. Should no one plan emerge as a clear optimum, the planner 214 stores a set of the current best plans and carries the set forward to the next step of the search. The example plan 1900 is the simplest plan that satisfies the previously formed intent.

Figure 20A:
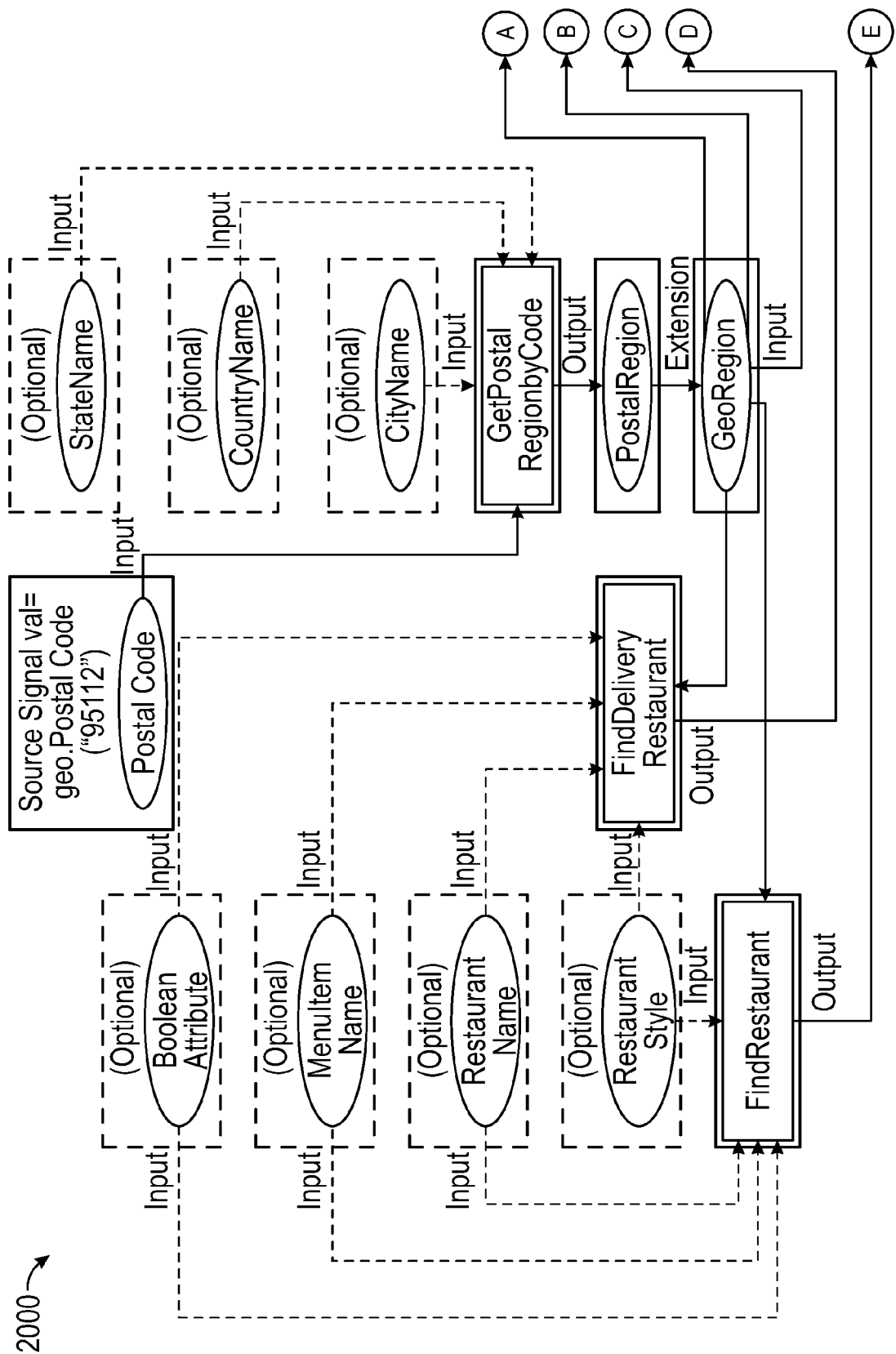
FIGS. 20A and 20B illustrate a block diagram of another example plan for a dynamically evolving cognitive architecture system based on contributions from third-party developers, under an embodiment.
Figure 20B:
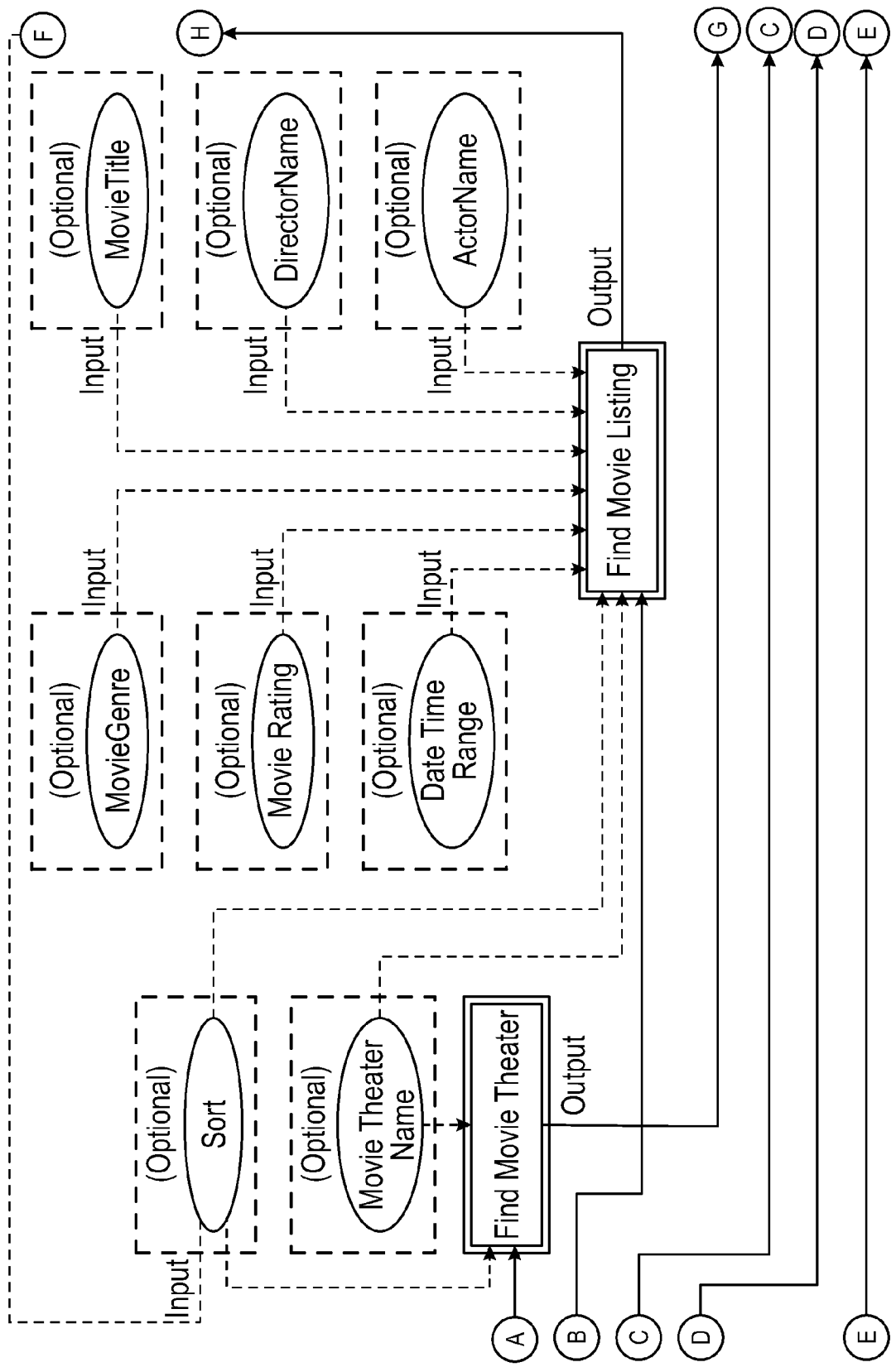
Figure 20C:
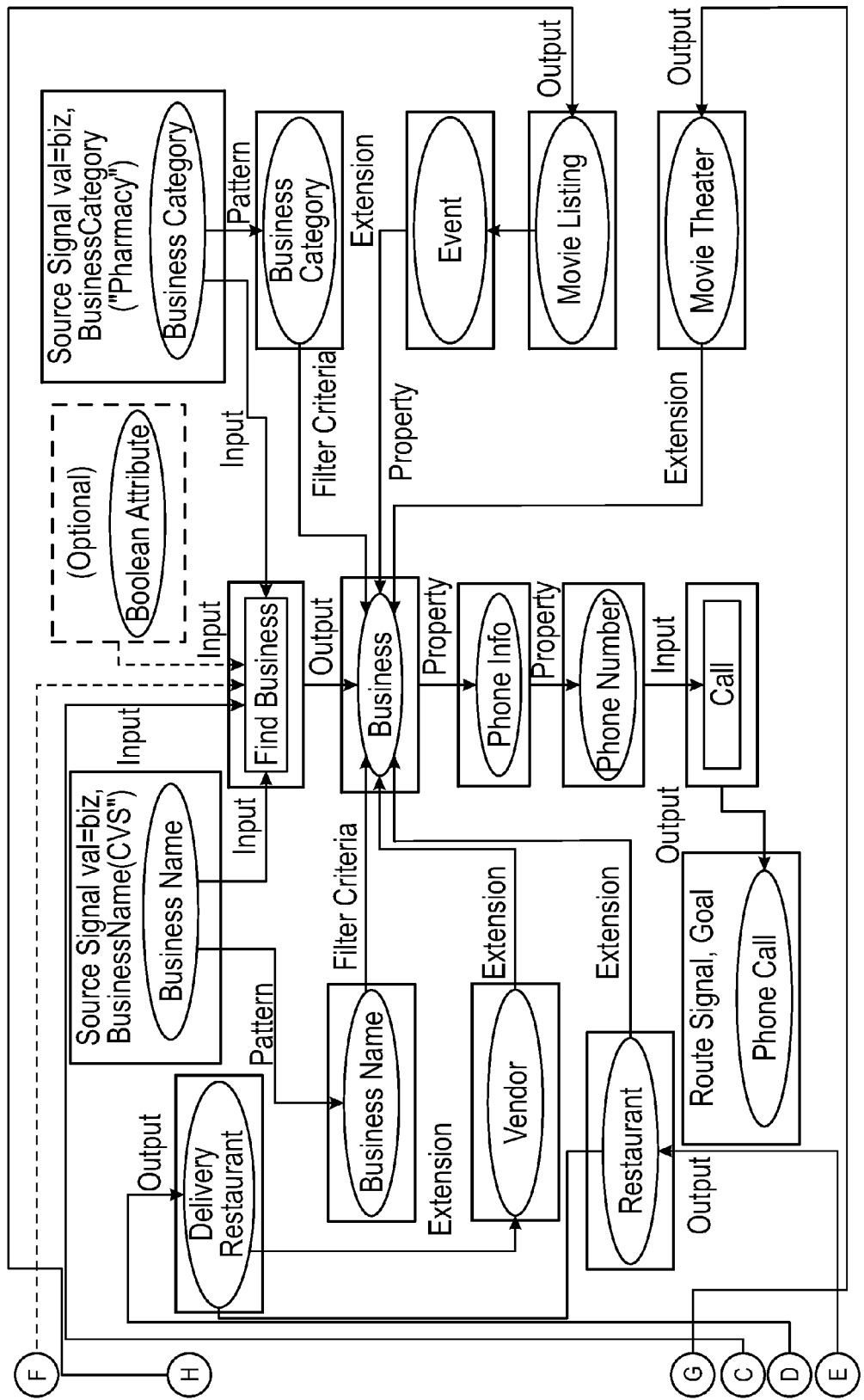

FIGS. 20A and 20B illustrate a block diagram of example plan 2000 for a dynamically evolving cognitive architecture system based on contributions from third-party developers, according to an embodiment. The system 200 may determine the family of the N simplest plans, a generalization of the above. The system 200 provides alternative execution paths as contingency plans, and find and encode alternate interpretations, or multiple hypotheses, of an otherwise unambiguous intent structure. The example plan 2000 is a version of the plan 1900, but fortified with automatically generated contingencies and alternate interpretations. The system 200 may start with a known plan as an initial state, then, using, for example, a similar search procedure as before, connect the nodes in the plan with additional alternative paths until some totality condition is reached, such that that all possible alternative routes have been added.

Figure 21:
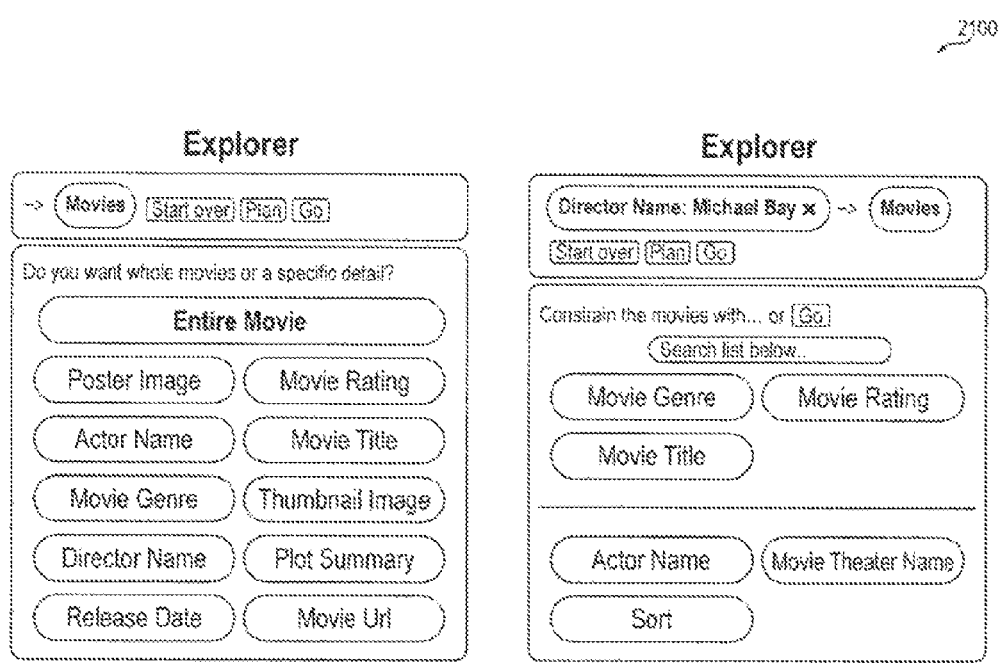
FIG. 21 illustrates a block diagram of an example user interface for a dynamically evolving cognitive architecture system based on contributions from third-party developers, under an embodiment.

FIG. 21 illustrates a block diagram of example Explorer user interface 2100 for a dynamically evolving cognitive architecture system based on contributions from third-party developers, according to an embodiment. The Explorer user interface uses the concept action network 212 and the end user interface 236 to interactively elicit intent from an end user based on an action object graph. Since the system 200 dynamically extends the concept action network 212 at runtime, what an end user may say and do changes over time. The Explorer user interface and the end user interface 236 enable an end user to form any intent representable by the concept action network 212 at the current time, and it forms the intent in a way that enables rapid construction of goals.

The system 200 shows not only obvious follow up possibilities, but longer-tail inputs that enable a rapid plan sketch to be entered, allowing the planner 214 to fill in all of the missing steps to the end goal. For example, an end user selects "phone call" as the first step, the planner 214 suggests "phone number" as a closely associated input possibility via the end user interface 236, which enables the end user to discover suggestions such as "menu item." These suggestions enable an end user to enter the plan sketch "lasagna—phone call" via the end user interface 236, and the planner 214 writes a sequence of steps that amount to "find someone who sells/has lasagna, and call that someone."

The Explorer user interface elicits a goal from an end user, such as sorting suggested goals by relevance, prioritizing the output of actions. The Explorer user interface may elicit a sub-goal, a property of the original requested goal-such as the name of a director name for a movie, from a user or continue with the original goal. The Explorer user interface suggests signals by walking the concept action network graph from the goal via extensions and action objects and finding primitive inputs, without suggesting inputs that have already been selected and are not multi-cardinal. The Explorer user interface repeats suggesting signals and finding primitive signals until an end user indicates a selection or until there are no more available signals. After an end user indicates their selection, the execution engine 252 executes the plan using the inputs and the goal. If the there is an interruption, the Explorer user interface prompts for the interruption if the interrupted concept object is a primitive, otherwise the Explorer user interface sets the goal to the interrupted concept object and begins suggesting signals and finding primitive signals. The example Explorer user interface 2100 elicits an intent structure centered around locating a movie.

Intent is not only possible from explicit indications, but may be inferred via integration with other mobile, touch, or window/desktop applications. All user interaction may be via multiple modalities, such as typed entry of text via a real or virtual keyboard, or similar substitutions, touch and mouse gestures, speech, and combinations of the above. Any entity within an end user application that is selected or represented may be starting points for interactions that involve a set of concept objects and action objects in the concept action network 212. Selection of pieces of information via an indication such as typing in a text box, having keyboard focus on a window or an object on screen, a mouse or touch gesture on a displayed object, or a natural language reference to an object may be used to select concept object values. An end user application may also represent contextual information, such as a document that is currently being edited, a geospatial location, contact information such as name, address or phone number, or any other piece of information offered to, stored, or elicited from an end user by an end user application. Such pieces of information may be referred to as cues.

Given a set of cues from an end user's use of an end user application, at any given point, the system 200 may link cues to corresponding concept action network objects or to intents in several ways. The system 200 may link cues or sets of cues to: 1) corresponding concept objects, action objects, renderings, or other information within the concept action network 212; 2) formal descriptions of intents; 3) natural language hints that may be used to describe intents; and 4) combinations of the above, such as a formally represented intent, combined with additional hints or inputs in natural language, and several additional concept objects corresponding to some of the cues.

For example, within any end user application that shows business listings, such as a touch-based map application, a web-based or mobile phone application restaurant review portal, or a search results page, an end user may select a business using appropriate modality, and then see business details. This selection allows integration with concept action network-based follow ups. In another example, while using a mapping application, an end user may ask "what are the hours of that African restaurant in Adams Morgan," the end user application, based on the context of the user looking at a map of that part of Washington, D.C., provides neighborhood restrictions on the lookup of restaurants, and the system 200 infers intent and provides execution. In addition, the mapping application may maintain references to concept object values for all objects on display, and provide those as cues directly to provide concept action network-based follow ups. In yet another example, on any representation of an object within an end user application, the end user application may offer contextual follow ups, such as menus, based on actions that correspond to actions and follow ups within the concept action network 212. Illustrating this example, an end user clicks on a calendar item, and sees a list or menu of additional actions for that calendar item, such as "invite others," "create social network invitation," etc.

The system 200 automatically renders concept object values, often taking the form of query results, with respect to declarative specifications. This automatic rendering is beneficial because it allows for different modalities, it requires third-party developers to think about the data model in a multimodal compatible manner, and it requires third-party developers to be explicit about relationships between data. The system 200 may mix and match different pieces of concept objects from different sources, such as injected layout exponential personal capabilities and presentation adaptive layout for mode, situation, and/or context. Automatically rendering concept object values with respect to declarative specifications enables the intelligent summarization of results, such as removing repeated data presenting the most relevant fragments of data, and enables intelligent, graceful degradation in the presence of bad/incomplete data to highlight contextual relevance. The system 200 may intelligently highlight results based on what an end user requested, such as highlighting selected pizza category restaurants, and enables provenance-aware rendering, such as highlighting branded data or merged data. Fully modeling the layout provides essential advantages. The system 200 structures data in a more linguistic manner and different representations of the same content support multiple platform and form factors.

The system 200 renders data based on statically typed structural data, such as concept objects, from the concept action network 212, as well as contextual information, such as the rendering modality and environment, user preferences, modeling details, including structural data about the concept objects, relative placement constraints, hints about importance of displaying different pieces of content or properties within concept objects, and the set of available templates or forms and other rendering data. The goal includes a plan for what to render and how to render it for a given modality. During a planning phase, the system 200 performs optimization over possible renderings to best fit a desired set of goals, which may be implemented by optimizing an objective function, and renders the goals based on constraints, relative placement, and/or templates.

Rendering layout may be performed server side, and optimized for lower latency, or higher quality of service, interactive use. The system 200 may minimize the amount of data sent to the clients 202-204 while still maintaining the original data structure on the first server 206 by pre-computing what data is shown to an end user in each frame. Interactive components may trigger a roundtrip to the first server 206, with the option of prefetching and pipelining the interactive responses. The system 200 implements learning-based prefetching based on an interactive user interface. By analyzing user interaction usage, the system 200 determines which interactive elements, or types of interactive elements, should be pre-fetched/pipelined to the clients 202-204 and in what order, which allows for the optimal balance. In an embodiment, the layout may be hierarchical, automatic, and template based. A set of templates may be designed to layout images, text, and buttons on a screen. These templates may have various priorities and hints assigned to text/button/image regions. The system 200 automatically lays out concept objects without explicit layout information on the concept object itself by matching the appropriate concept priorities/hints to template priorities and hints.

In addition to displaying results in dedicated applications, such as a dedicated interactive user interface, the system 200 may embed results, dialog, and interactions with concept action network execution within end user applications wherever it may be useful for an end user. An interaction that begins from within an end user application may also display its results there. For example: the system 200 may overlay results on, combine results with, or interleave results with objects displayed in an existing end user application. The system 200 may display dialog or textual interactions within the same interaction patterns of an end user application. Examples include forms, dialog boxes, touch, keyboard or mouse-oriented menus, graphical placements of objects in visual positions, such as maps or charts, and stylistic elements such as making a contact or address appear in a certain format.

Since individual services are typically built by different third-party developers, a key challenge is to reconcile three goals, the easy integration of third-party services into the system 200 by third-party developers, a high level of interoperability between these services, and a high level of quality of services offered to end users. Historically, most approaches to such a challenge are to offer a platform where third-party developers contribute their services, and interoperability is possible via the platform. However, one challenge is that such platforms for integrating third-party services may only be successful when all stakeholders have incentives to use the platform cooperatively, so each participant receives desired benefits, end users have a rewarding experience, making use of the best service for each situation. Third-party developers are compensated for value they offer end users or other parties. Other contributors, such as data providers and end users who edit or contribute content, are also incentivized to help improve user experience. Advertisers may reach appropriate audiences effectively.

Mechanisms for building a marketplace of data and services are described in the context of a platform that supports the marketplace. For example, the platform may be the dynamically evolving cognitive architecture system 200 based on contributions from third-party developers described above, or any other software framework that allows contributions of services and interoperability between these contributions. The platform offers a collaboratively extensible environment for description of data and interoperable services, built from objects and relations between objects, and uses services to handle requests. A platform may include software services hosted by third parties, which are not part of the platform, objects which include data types passed to and from services, operations that may be performed by the platform, user interface and dialog descriptions, cues for natural language processing, functions that are executable or declarative software code that implement operations, and that may access data or other services, and data, which may be any information stored by the platform and accessed by functions. A platform may also include developer tools, such as editors for objects, and mechanisms for data ingestion or upload, allow contributors to offer new functionality, and a shared, visible repository for the declarations of these objects. This may be a centralized or distributed storage system, such as a database. Contributors are people or organizations offering data, services, and/or objects for use in a platform. Advertisers are a type of contributor that may offer content for delivery to end users in exchange for compensation. Compensation to contributors may take many forms, including real or virtual currency, and/or other benefits, such as public recognition, and/or increased opportunities for use of a platform.

Invocation may be a single use of a function on behalf of an end user. For example, a platform runs executable software code on a specific input, possibly via remote services, such as looking up a city name from a postal code via a geocoding service. A request from an end user may be expressed as an intent to achieve a desired outcome that may be achieved by a combination of invocations. An object makes a contribution to the handling of a request if it is a function and it is invoked, or if it is another object and its definition is used to service a request. A visit is a view of a web page by an end user, or other form of digitally mediated user attention, such as an end user impression of an advertisement, or interaction with a widget or game. Traffic is quantitatively measured visits or contributions to services. Measurements may be in aggregate numbers of visits, level of engagement by an end user, or other more complex numeric representations of total contributions and visits.

The marketplace for services is a set of processes and technical mechanisms to encourage effective use of the platform. The processes and mechanisms are designed to achieve the goals of high quality of individual services, in terms of data quality and completeness, features, and any other aspects that affect end user experience. Another marketplace goal is interoperability with other services, so that contributors may derive benefits from others' contributed objects and data, both via explicit dependencies and via automated means supported by a platform. Other marketplace goals include software code reuse and consistency, so that contributors may do this with less software engineering effort, accurate indications of suitability, via metadata and dynamic measurements, so that a platform may accurately determine when services are suitable for a request, and performance, including low latency, low cost to serve requests, and other metrics.

The parties within a marketplace are the end users, a platform operator, and contributors of several types. The contributors may play several roles in the marketplace. Content application program interface providers desire branding, to sell advertising, and/or to sell access to restricted content. Data providers and data curators want recognition, payment for all content, and/or payment for enhanced or premium content. Transaction providers desire branding and transactions via selling of some good or service. Advertisers desire traffic from qualified end users. A single person or organization may play more than one of these roles.

A platform may offer technical mechanisms for handling an end user request and invoking and combining services to respond to it. A challenge of a marketplace is to select and prioritize the services that are used, so that goals of different parties are met. Selection relies on accurate accounting of service usage and contributions. A platform may be instrumented to maintain current information, such as contributions per contributor and per object and per group of objects, including invocation contexts, number of invocation times, implicitly and explicitly expressed end user experience metrics, and performance metrics.

Traffic management may include desired limits on whether a service or object may handle a request. For example, restrictions may be expressed by number of requests, by type of request, by rate, such as a number of requests per minute. In addition, these quotas may be expressed individually per end user, or for sets of end users. A traffic quota for an object is a representation of such desired traffic constraints for contributions from an object or service. A platform may provide mechanisms for enforcement of traffic quotas.

In many situations a platform may choose services to meet explicitly known constraints. These may include contractual goals on service use, in which specific contributors may have traffic or data driven constraints, such as number of requests per hour, or requests containing a specific keyword or involving a certain geographic region. A platform may use standard mechanisms to ensure execution meets specific contractual needs, such as using certain services, white labeling avoiding certain services, and packaging of dependent services. End user expressed approvals are approvals made by an end user, either in response to a request, or via a previous selection of a service via existing phone/social network applications, or via explicit preference over services or categories of services. Contributed services may be reviewed by a single reviewing authority, such as the platform operator, to determine if they meet desired goals for authority based approvals. Services may have provisional approval for specific traffic levels, or for specific periods of time, or be unconditionally approved for use at any level. A platform may directly use traffic management facilities to ensure these goals are met for explicit selection mechanisms.

Assuming a service meets explicitly specified restrictions, a platform may control traffic via implicit means, via a continuous process that begins by the assignment of initial traffic quotas via a policy. The automatic traffic control mechanism may maintain a set of current quotas which are enforced by a platform. Handling of requests may result in new analytics data, which a platform may use to update a set of current quotas. The initial quotas for services or objects may involve the speculative assignment of traffic based on initial indicators. A platform may dynamically rank objects and services according to the analytics provided by the platform, and dynamically adjust traffic quotas. Analytics signals that may contribute to traffic quota assignment include performance, including latency, automatically measured response quality, such as via known sentinel queries, or contributed test cases from contributors or users, precision/recall based on implicit user feedback, such as frequency of follow up queries, precision/recall based on explicit user feedback, such as a thumbs up or thumbs down selected by an end user in a user interface, after receiving a response, evaluations from human evaluators, such as from paid evaluators, or from other third party services, and proxy ranking off other indicators, such as a contributor's web domain ranking, or the ranking of that contributor's applications in an a publicly browsable application store.

A traffic assignment policy, whereby quotas are determined from these signals, may be fixed set of rules, or determined via more complex algorithms, including machine learning based approaches. A few other processes may supplement the processes described above, such as automatic reporting of analytics and ranking data in a forum for third-party developers, end users, and the public to peruse, and to offer recognition to exceptional contributions. Another process may be the curation of services and objects based on review/approvals for categories or services, and peer reviews/curation. Yet another process may include service tiers, in which a platform maintains metadata on all services and objects, so that different levels of stability are simultaneously available, such as bleeding edge, beta, and stable. End users may opt into the tier of their choice. Further processes may include promotion and discovery of services, such as end user facing features for discovery of available services based on suitability, intent elicitation from end user based on available services, and prioritization based on payment category of service, such as free, paid, freemium, etc.

A marketplace may support accounting and controls on all contributions from services and objects, enabling parties in the marketplace to enter into a variety of transactions: End users may pay to use services or objects, contributors may pay other contributors on which they depend, contributors may pay end users or other curators for help improving their services, contributors may pay the platform operator for operations of their services, and advertisers may pay the platform operator to obtain traffic or visits. In each of these cases, payment may be any form of compensation, immediately, or in the form of an agreement. Examples of end user transactions include free, but limited quantity or via promotion, purchase per request or by subscription, and freemium, for which limited features are free and premium features require a fee. The platform may charge contributors based on a variety of metrics, such as the number of objects contributed, the number of objects making contributions to end user requests, traffic levels, and the amount of data stored.

A platform operator may adjust traffic quotas based on a variety of compensation from advertisers. A key approach may be via bid and auction mechanisms using real or virtual currency. A platform may select bids via an auction mechanism, which may include ranking based on a variety of factors, including bid price, contributor, object, or group scores, user preferences, current situation, time of day, geographic location, current or upcoming calendar events, etc., and known preference history based on specific attributes, preferred services. Advertisers may bid for traffic that captures contextual moments that fall outside of traditional keyword matching sponsored links, such as hotels bidding to be the first choice offer for airline weather delays near airports, bars bidding to offer drink specials to 21-35 year olds in the vicinity with a Klout score over 55, restaurants bidding to offer drink/dinner specials to sports fans in the time, and location vicinity of large games or events. In another example, the platform may use a trusted personality algorithm to promote timely sponsored service suggestions based not only on intent inference but also using known preference history based on specific attributes, preferred services and context information such as time of day and location information. Offers may be filtered through probability of attractiveness filters and delivered via proactive suggestions from the assistant via dialog alert.

The system 200 makes possible a marketplace for content and services where contributors can provide services, objects, and data, and may receive compensation of various types. The quality of the user experience when using the system 200 and the quality of contributed services are dependent on the quality of many parts of the system. The areas for measuring quality include the following. Natural language intent interpretation quality is based on the accuracy and completeness of the mapping of a natural language input to a formal intent based on the concept action network 212. The planning output quality is based on the degree to which the plan expresses a reasonable approach to achieving the user's intent. The execution behavior quality is based on how well the execution flow meets users' expectations or needs. For example, prompt ordering quality is based on whether interruptions occur in the most helpful order for the user, and strategy selection quality is based on which of a known set of strategies are used for confirming actions, or selection or instantiation of values. Semantics quality is based on how well the concepts and approach to handling a request make sense to users. For example, whether there are follow ups or combinations of services that are unexpected, inappropriate, or do not feel right to users. Result ranking quality is based on how well ordered lists of results are presented to the user. For example, if searching for "best Mexican restaurants," the way results are ranked by quality and geographic location to the user, as well as preferences. User interaction quality is based on how the system 200 displays results to the user, or how the system 200 elicits input. For example, the quality of the rendering of user interface elements, including outputs and form inputs, or the quality of generated dialog. Overall experience quality is based on a subjective ranking of overall quality of the user experience, from inferring intent to delivering results, as well as all the steps in between, such as eliciting inputs and displaying or presenting results. Services and data contributed by providers can be rated individually. For example, whether the address, culinary style, phone number, and store hours are correct for a restaurant listing. Reconciled or combined data quality is based on the quality of results when combining or merging data from multiple service providers, such as data read from databases containing manually or automatically merged data from many providers, and results after merging of results via an equivalence policy and/or when ranking combinations of results from multiple providers. Special domains quality is based on aspects of quality that are evaluated separately based on the kind of data, such the handling of geospatial and temporal data: Geospatial examples include recognizing place names from context, canonicalizing and merging variant names, good understanding of proximity, and effective and accurate display of geospatial data, such as addresses or maps. Temporal examples include recognition of times and dates from natural language ("Columbus Day," "next week Thursday," "five minutes before my meeting with Joe in December"), common temporal knowledge (holidays, time zones), common sense interpretations (such as what "soon" or "tomorrow" mean in context, what are good default times for scheduling a meeting, what "early June," or "second week of June" mean) and accurate time representations and calculations, including time zones, time periods or durations, overlaps, etc.

Quality measurements can be based on a variety of data from the system 200 and from the community of contributors and users. This data includes several major categories, such as usage data, training data, feedback data, grading data, editorial contributions, aggregated data, and analytical data. As users make requests, the platform maintains usage data, such as raw logs and processed logs. Ongoing user requests produce raw logs of actual user requests and how they are handled by the system 200, while processed logs include aggregate and sampled data from raw logs, such as statistics, reports, anomalous or interesting examples, etc. Some elements of the system 200, such as the natural language intent interpreter 254, are trained by having users or developers provide examples and interpretations of those examples, or training data, which includes explicitly annotated training examples provided by a developer and implicit training examples that are presented to users or developers and confirmed. Users of the system 200, including those being paid or volunteering to improve quality by using an enhanced user interface with additional feedback buttons or forms, give feedback as to the quality of some of aspect of the experience of using the system 200. This feedback data may be provided explicitly, via a user interface, such as a "thumbs up" button next to a result, and/or implicitly, via analysis, such as noticing rephrasing or retries by users, or having buttons or prompts that correlate with a user's satisfaction or dissatisfaction, such as follow ups that only make sense if the previous request was satisfied, or follow ups that allow a user to start over and try again. Grading data is created when specific outputs from the system 200 are rated by people, by automated means, or by semi-automated means. Grading data is similar to feedback, but is generally via an offline or more controlled process where graders or grading processes evaluate quality. Grading data may be created by manual grading via a dedicated user interface, by automated grading based on known examples and expected results, or based on existing grading results. For example, the system 200 may infer grades on subcomponents from signals on end to end results, such as if there was feedback on overall experience, and the system 200 may cluster or statistically analyze this distant supervision to discover local supervisory signals that certain plan features were associated with the poor experience and infer a grade on those plan features. Grading data may also be created by semi-automated or combinations of manual and automated grading, such as automatically generated use cases that are manually validated for quality via statistics or semi-automated means.

Editorial contributions are provided when users or contributors make adjustments to content to improve the user experience. These editorial changes may be made anywhere there is an opportunity to select or edit content, such as dialog or a training example, or to add metadata. Editorial contributions may be provided by a user, via the same user interface used for handling requests, such as clicking a button to offer a suggested correction to a typo in a piece of dialog. Editorial contributions may be provided by a developer, via an alternate user interface that highlights possible errors in dialog, possibly based on feedback or usage data. Editorial contributions may be provided to improve training, for example, by picking similar training examples and confirming them. Editorial contributions may be provided to improve data reconciliation, such as merging two entries, such as business listings, from different sources that represent the same thing, such as the same business. Editorial contributions may be provided to improve rules or ranking suggestions, such as blacklists (e.g. never list businesses with certain words in the name) or heuristics, such as adding an equivalence policy that states that businesses that are geographically proximate and have the same phone number are the same business. Editorial contributions may be provided to group together clusters of objects, such as similar concepts, or actions that operate similarly. Editorial contributions may be provided to mark objects with metadata such as tags or topics, to add flags for testing or review, or to mark for additional editorial follow up.

Usage, training, feedback, and grading data may also be aggregated, clustered, or grouped according to selected features of interest, and may be referred to as aggregated data. The following are some examples of aggregated data. Data values generally have types corresponding to concepts, like business or restaurant. In some cases, system 200 clusters similar concepts. For example, two contributors might use slightly different concept objects for a business, one concept object for a rated restaurant with a rating, and another concept object for a delivery restaurant, which contains details about how to order delivery. By looking at usage data, or annotations from editorial data, or statistical analysis, such as text-based or feature-based clustering techniques, the system 200 may put these related concept objects into a cluster. The system 200 may apply subsequent analysis to the cluster of restaurant related concept objects contributed by various developers. More generally, the system 200 may mark all usage, training, feedback, or grading data with one or more pieces of metadata called features. The system 200 may cluster data with common features according to these features and provide similar, but less granular, data to form clusters. For example, all concept objects that are variations on a restaurant may share a food seller feature. All concept objects that have a field with a phone number share a callable feature, and therefore also form a cluster. Similarly, these features are added or removed by contributors or the system operator, allowing clusters to be edited. Clusters can be formed automatically, or semi-automatically based on vocabulary or natural language training contributions. For example, if the vocabulary or other training around two concept objects involve similar language, as measured by standard techniques in information retrieval, then the system 200 may cluster these two concept objects together. The system 200 may perform or report on all of the above usage, training, feedback and grading by cluster, as well as individually. The system 200 may use aggregated clusters to automatically improve natural language training for one domain, by applying learned synonym and usage patterns from another similar domain. For example, the system 200 may apply restaurant attributes trained by developers of a delivery restaurant use case, when needed, to user requests for rated restaurants, even though previous training examples for rated restaurants never mentioned those attributes.

Analytical data includes statistical or other computed analyses of contributions and usage, such as training summary analysis, training attribution analysis, and training prioritization and suggestion. Training summary analysis includes coverage statistics, such as which concepts and actions have associated training data. For example, the percentage of concept objects or action objects (or nodes in the concept action network 212) that have at least n training examples (for n=1, 2, 3 . . . ). Training summary analysis also includes precision and recall statistics, which are scores of precision and recall of the system 200 against expected results, based on known, scored examples. Training attribution analysis may be based on which training examples have been most frequently used, and are thus most important to the overall perceived quality of the system 200, which contributed to interpretations most significantly, either by producing them outright or by increasing the system's confidence in them, which resulted in interpretations with the highest feedback scores, and which were most general, such as whose constituent components were used most often to improve the results of other, possibly unrelated queries. Training prioritization and suggestion may be based on coverage, precision, feedback grading results, and other data, such as what types of training are most likely to improve quality. For example, the system 200 may categorize feedback and grading by domains (such as movies, sports, food and nightlife, geospatial, medical, etc.), and metrics can point to which domains require more training editing or contributions. Training prioritization and suggestion may also be based on error classification, such as when training is solicited in response to automatically recognized error classes. For example, if, based on feedback, the system 200 has trouble recognizing the full titles of movies, the system 200 can request more training examples that use movie titles in various conversational contexts. An implementation of retrieval methods for these classes of data can follow a tag and propagate scheme. The system 200 may assign each item of data, such as training examples and vocabulary terms, a unique identifier. The system 200 may associate each processing step, such as an inference, with a finite set of these data items. As the system 200 produces its computations, system 200 updates these sets through a propagation strategy that mirrors that of the computation itself, albeit in an abstract form. For example, if training examples t1 and t2 both contributed confidence in a particular interpretation of a user query by the system 200, then the system 200 will update its tag set to include both t1 and t2.

As with other data and service contributions discussed above, training, feedback, and grading data can be contributed as part of the marketplace. The result is that parts of the system 200 are continually improved by the community. Some examples of contributions include contributing new services, objects, or data, or editing existing ones, improving natural training coverage, and vocabulary or annotated complete or partial training examples. Areas of focus may be determined manually, or by statistics or reports. The system 200 measure improvement by feedback, grading, or analytical data. The system 200 may base improving natural language training accuracy on correcting or improving existing training examples that have reported issues, and tuning existing examples based on statistical analysis. For example, the system 200 may base additional annotations or variations on training data on areas that have low reported accuracy The system 200 may base improving natural language training accuracy on identifying areas for improvement based on grading. For example, grading of known sets of requests or intents, requests or intents flagged by contributors, grading natural language interpretations, grading planning outputs, grading execution behavior, and grading overall experience. Participants may contribute features and assignments of features to objects so that clustering is improved. Participants may also contribute general assistance or answers to questions in online forums or any other venue where contributors can communicate to assist each other.

Contributions are also not always immediately available for use, but are subject to approvals. The system 200 initially commits contributions to a staging area, where the contributor may test them, but the contributions are not available for other users. The system 200 manages different sets of versions of the services (such as the definitions of the services, and any code used to interact with external services), objects (such as models and dialog), and data (such as feeds) as sets of changes using standard software engineering methodologies, such as a version control system over a source tree of files that supports commits, branching, and merging, such as a revision control system like Git®. Contributions are then evaluated and may be marked for approval, similar to the way code changes are merged into a production branch in standard software development practice. Evaluations can be made of changes individually or in combination with other contributions, by automated or human means, or a combination, by the system operator, or by other contributors with privileges to review and approve changes. The ability of contributors to perform approvals is in some cases contingent on ratings or other attribution based tests. In this way, approval privileges may serve as an incentive to reward the most dependable and productive contributors.

Contributed objects, in general, have associated permissions, which are metadata indicating access rules for the objects. Permissions may allow or forbid viewing and editing by others. Permissions are based on ownership. Objects are usually viewable and editable by their owner, but often also have read or write permissions for other contributors, for groups of contributors, or for everyone. Contributions are also subject to permissions, based on general rules set by the system operator (for example, functions are not readable except by the owner, but concept objects and action objects are readable by everyone), or via finer grained permissions set by policies determined by the contributor and/or the system operator on a per object basis.

The goals of the compensation and ratings system are to incentivize contributors to make helpful contributions, via compensation, including money or credits, recognition, or privileges, to expose levels of trustworthiness of contributors to other contributors and to the system 200, and to be robust in the face of manipulation by contributors who seek to get compensation without improving quality. Compensation may take any form that incentivizes contributors, including: money, revenue sharing of income generated by services, credits or other virtual currency, publicity or recognition among contributors, among the community using the system 200, or more generally, such as in print or online media. Compensation may include badges or badge levels, and lists of top contributors in different categories. For example, badges by contribution type (modeling, training, grading, etc.), badges by domain or areas of expertise (sports, food, etc.), and public elite status that is visible on the contributor's profile. Compensation may also include the opportunity to use the system 200 or external services, such as services provided by business partners, to a greater degree or in enhanced ways, for example with enhanced permissions to perform various actions. Compensation may further include opportunities to acquire additional visits or traffic for services provided within the system 200. Participants in the marketplace can receive compensation for use of services, and contributions of services, objects, or data to the system 200. Compensation may be earned in a variety of ways, such as, compensation for training contributions, new contributions or editorial contributions such as editing examples.

The system 200 determines compensation by many factors, such as contributions that were requested by other contributors, that improve selected metrics, such as coverage or accuracy, feedback scores, grading scores, and that are approved of or used by other contributors. Compensation for training improvements include editorial contributions, such as correcting training examples. Compensation may include credits or reviews granted to contributors by other contributors, such as votes, grading, or donation of credits. Compensation may be for reviewing or approving the contributions of other contributors. Compensation may include revenue sharing by the system operator, such as a percentage of revenues generated by fulfilling a request being paid to the contributors who made fulfillment of the request possible. Compensation may include revenue sharing or compensation paid by one contributor to another, such as a service provider which generates revenue by fulfilling one service may pay other contributors for contributions that are helpful in fulfilling the request. For example, an early contributor may invest substantial resources to build and improve the quality of natural language interactions with restaurant searches, which in turn causes restaurant searches to be popular and profitable queries with end users. Later contributors may then add an interface to a function implementation of the restaurant search action object, an implementation that may be revenue producing and in a sense, revenue stealing in its own right. The presence of tracked contributions enable the system 200 to fairly redistribute this revenue to the earlier contributors.

Compensation may include credits, which are one or more numeric values maintained by the system 200 for each contributor representing an earned balance. The system 200 may combine credits, feedback data, grading data, and analytical data to give one or more numeric ratings to contributors. Ratings are impacted by the number of contributions provided, and/or some qualitative value assigned to those contributions. For example, adding new models or function implementations where none exist may result in a higher rating than adding new properties to existing models. Similarly, the first training examples added for an area not well covered may confer a higher rating to the users who contributed them than those added later, as the former have a greater impact on the overall quality of the system 200. Credits and ratings can interact with the way the system 200 operates, particularly with service selection.

Service selection by the system 200 is based in part on ratings. Contributors, including advertisers, can use credits to buy traffic, to obtain visits to particular services, such as system 200 may provide traffic up to a purchased number of visits, and then automatic traffic allocation takes over, and to ensure inclusion of certain results to specific actions, or preferential ranking of these results when they appear. Credits and ratings may be used to buy certain privileges, such as enhanced weighting to training data because the system 200 may use ratings or credits to infer authority or accuracy. For example, the system 200 may give more weight to training data from highly rated users during model training than to data from lower rated users. Credits and ratings may also be used to buy use of special system services or capabilities. Credits and ratings may additionally be used to buy access to certain administrative privileges, which may grant decision making abilities, or voting rights, on the changes made by other contributors to selected areas, or even whether to grant similar privileges to other contributors. As a result, the system 200 may have a hierarchy to these administrative privileges, with higher levels granting more rights, or conferring the same rights for more areas of the system 200. The system 200 can also assign traffic and privileges based on ratings.

Surfacing the attribution of contributions is another way in which participants receive recognition or compensation for their efforts. As an example, for any given natural language interpretation, the system 200 may use a user interface to enable users who made contributions (such as training examples, vocabulary) in support of the natural language interpretation, possibly rated by impact of the contributions, to view the final result. Similarly, the system 200 may use dashboards to enable users to view summaries of contributions made by others, as well as their own. The summaries may provide aggregates, show the total number of contributions, with the ability to categorize these, such as by type, areas affected, rating, quality improvement, etc. The system 200 may collect aggregated numbers for all users into leaderboards, providing a contributor ranking for each of the categories. The system 200 may measure the impact of contributions for attribution using any or a combination of attribution metrics depending on the quality and performance characteristics required for the application. These include: computationally intensive but highly accurate leave-one-out or cross-fold evaluation, incremental online update and split testing evaluation of the system's internal models, and relatively efficient approximations due to information theoretic or statistical functions (such as parametric or nonparametric tests for statistical significance, Pearson correlation coefficient, mutual information, information gain ratio, etc.) which assess the statistical significance, marginal informativeness, and redundancy of contributions compared to previous contributions and internal models within the system 200.

Finally, attribution and credits enable creation of interactive experiences that mimic games, with winners, high scorers, teams, and so on. The system 200 may use gamification of the contribution process to incentivize contributors to participate within a single game, or during a specific period of time, or among a specific group of people, such as during a hackathon. Each contributor may have privileges that reflect what contributions they are allowed to make. Attributions, ratings, and credits all can influence what privileges are available to each contributor. Note that the dynamic nature of the marketplace means the system 200 uses some contributions to improve contributions made by others. For example, when a developer introduces a new concept object, the system 200 may suggest other similar concept objects, based on clusters or similarity of structure and similarly for training data. The suggestions may encourage the developer to reuse those concept objects, or to base the new concept object on the old concept object, enhancing or extending the new concept object with new properties or fields.

Furthermore, the system 200 can automatically improve the quality of the user experience via automatic processes based on end user behavior. For example, the system receives the request "Where can I find good Mexican food in Springfield?" The system 200 encodes this request via natural language interpretation as a formal expression known as an intent, which has a goal and signals that indicate information or preferences of the user, which are typed values. For example, this is one interpretation of the above request as an intent:

```
intent {
    goal: food.Restaurant
    value: food.RestaurantStyle (Mexican)
    value: geo.CityName (Springfield)
}
```

Figure 22:
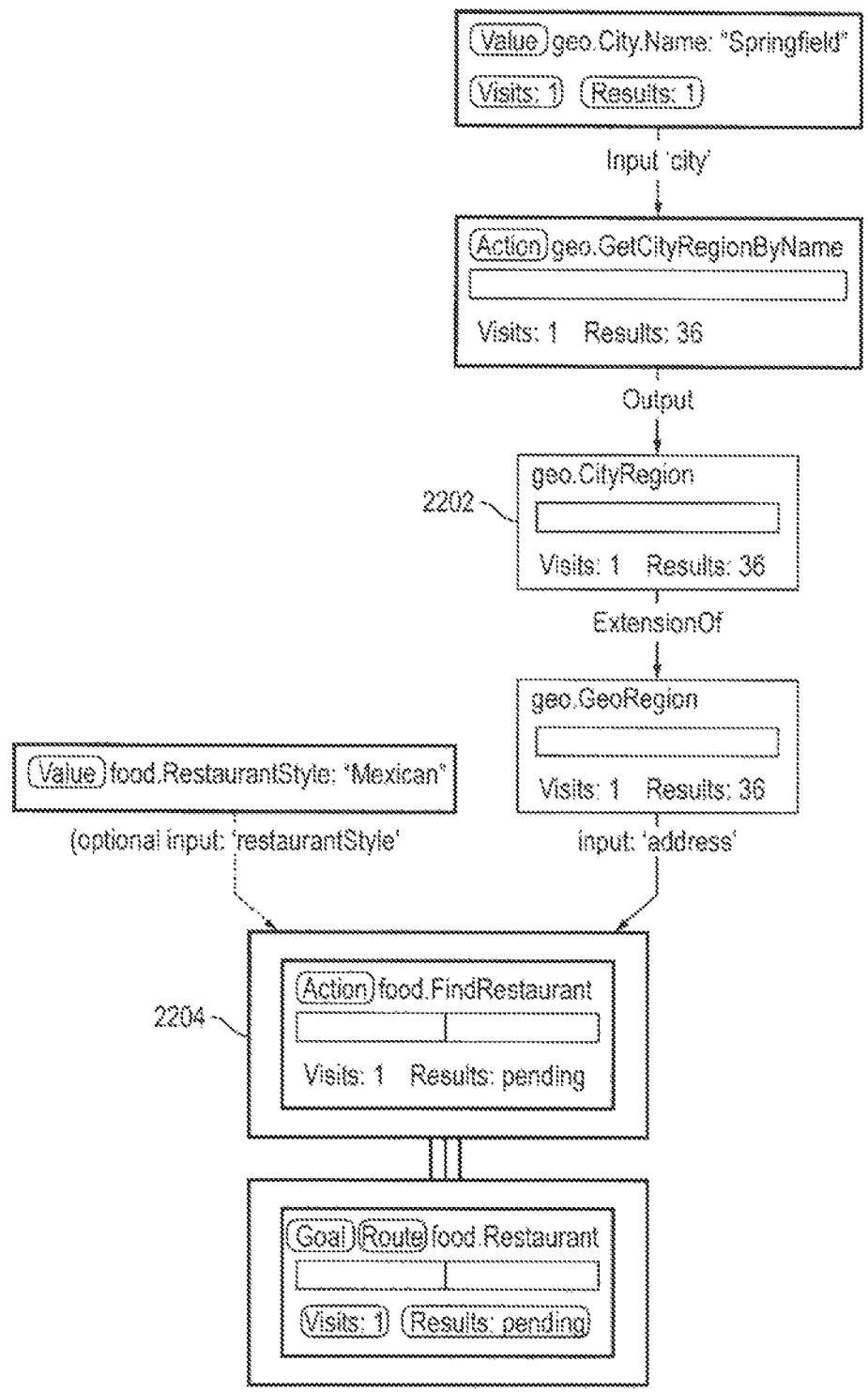
FIG. 22 illustrates a block diagram of another example user interface for a dynamically evolving cognitive architecture system based on contributions from third-party developers, under an embodiment.

The planner 214 satisfies the intent via a plan, which consists of a graph of concepts and actions that describe possible procedures to obtain the goal. FIG. 22, which is described below, depicts a plan that achieves this intent.

FIG. 22 illustrates a block diagram of another example user interface for a dynamically evolving cognitive architecture system based on contributions from third-party developers, under an embodiment. In FIG. 22, edges represent data flow of one or more values, and may be labeled to reflect the way the data is handled. For example, the output of the action is a geo.CityRegion 2202, which is a kind of GeoRegion, which is the type required by the action food.FindRestaurant 2204. Plans may be more complex. For example, the system 200 may create a more complex plan in response to receiving the user query "What are some Mexican restaurants near here?" FIG. 23, which is described below, depicts a more complete plan that reflects different ways to get a get the location the user is interested in, relying on various geography-related actions.

Figure 23A:
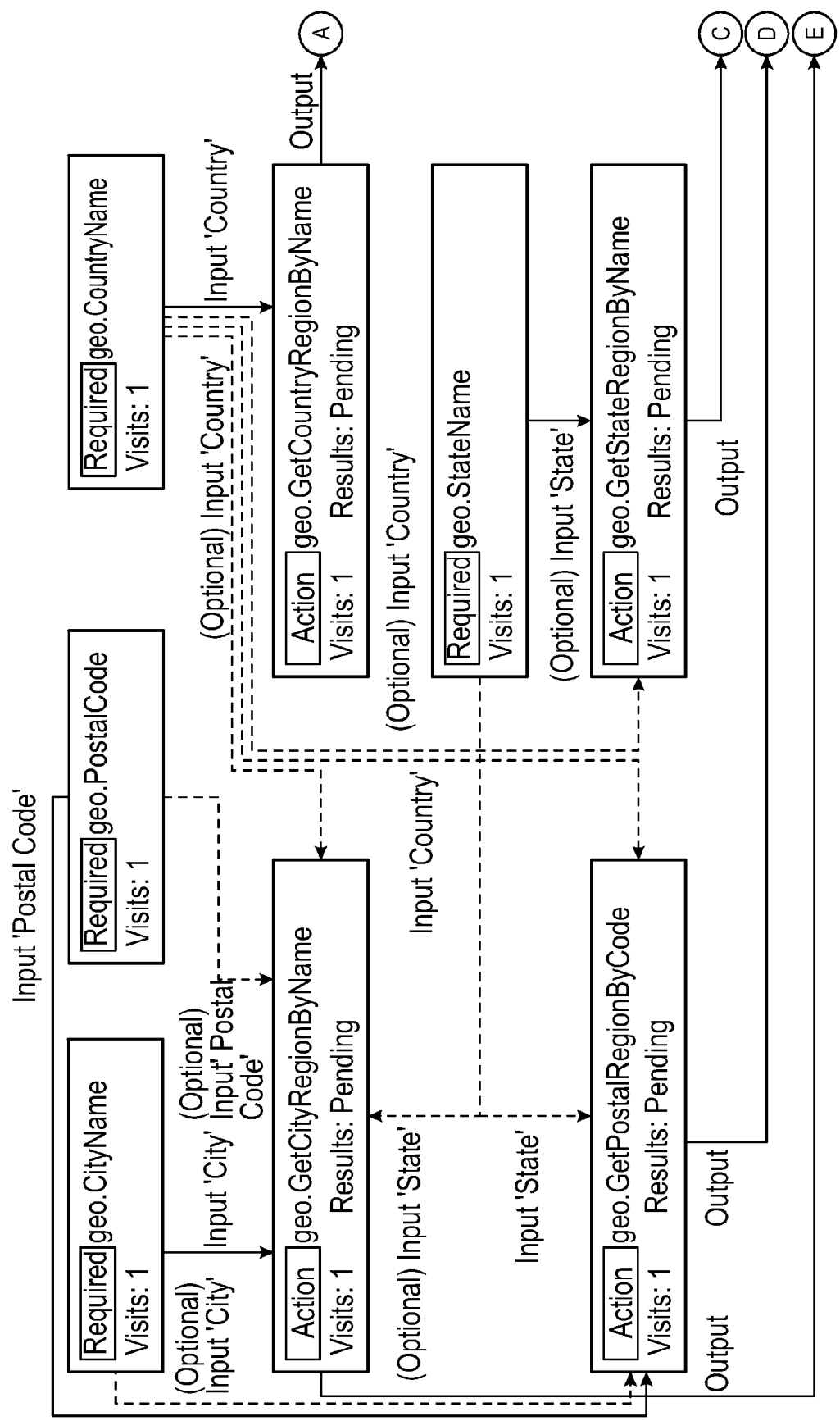
FIGS. 23A, 23B and 23C illustrate a block diagram of yet another example user interface for a dynamically evolving cognitive architecture system based on contributions from third-party developers, under an embodiment.
Figure 23B:
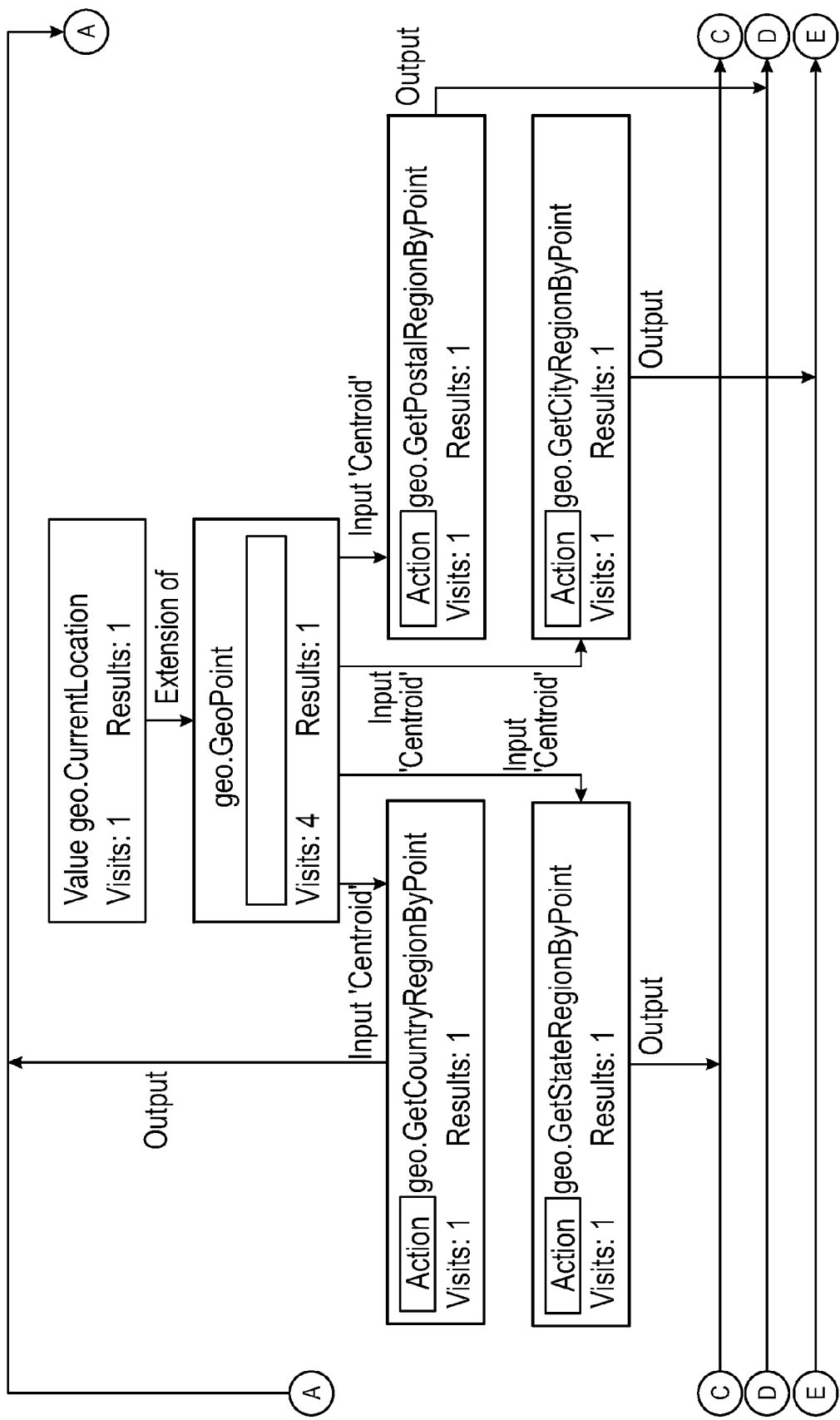
Figure 23C:
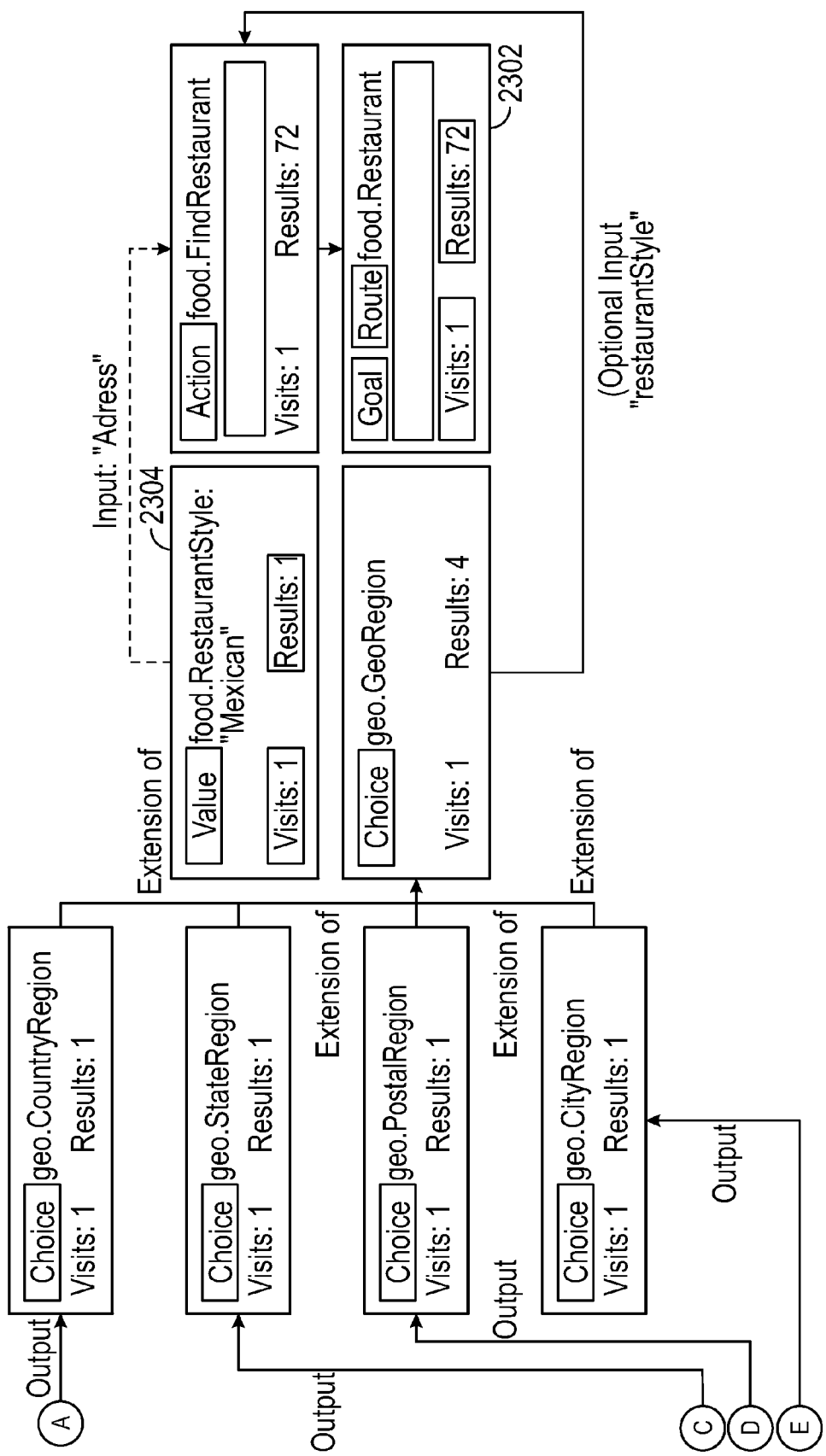
Figure 24:
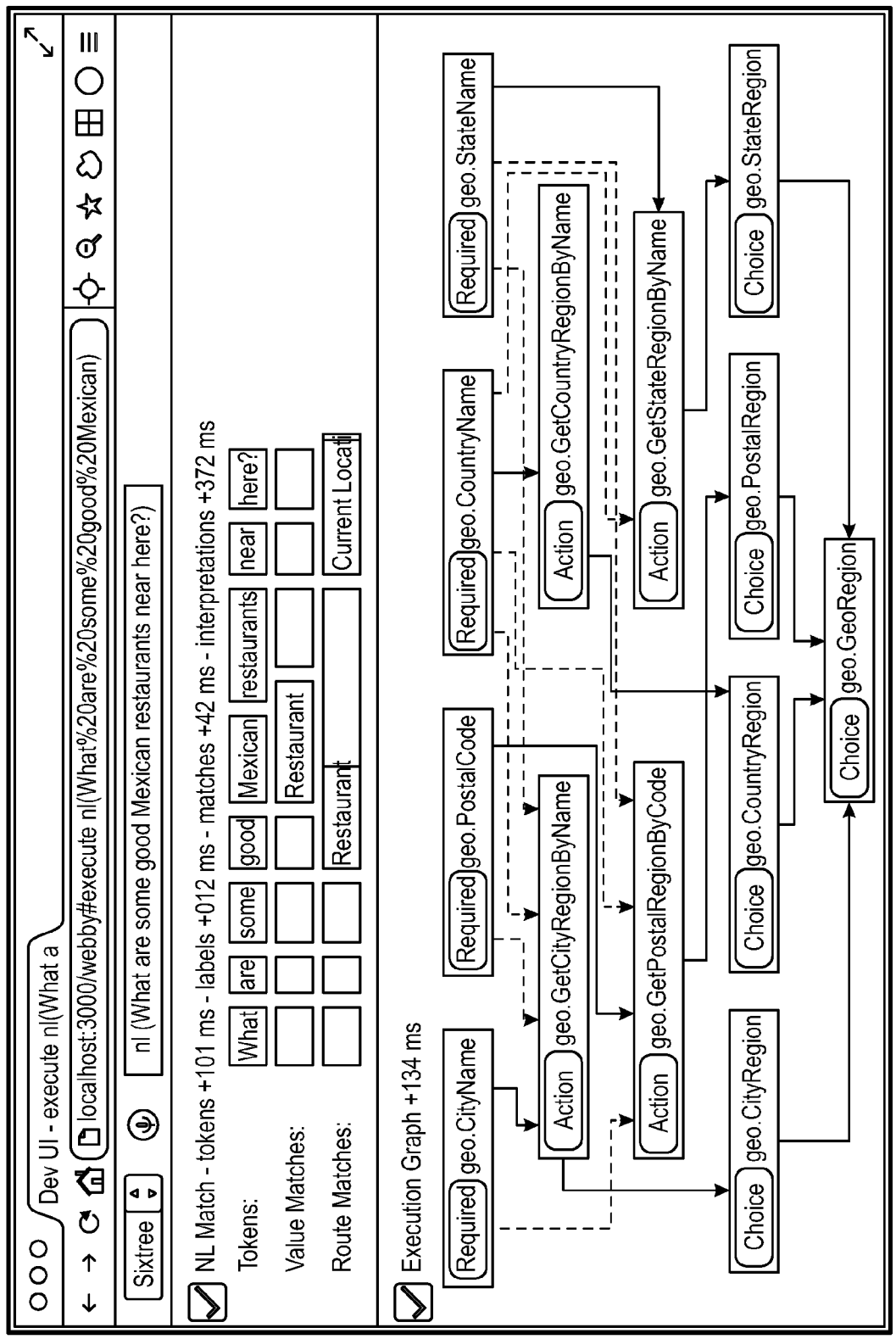
FIG. 24 illustrates a block diagram of a further example user interface for a dynamically evolving cognitive architecture system based on contributions from third-party developers, under an embodiment.
Figure 25:
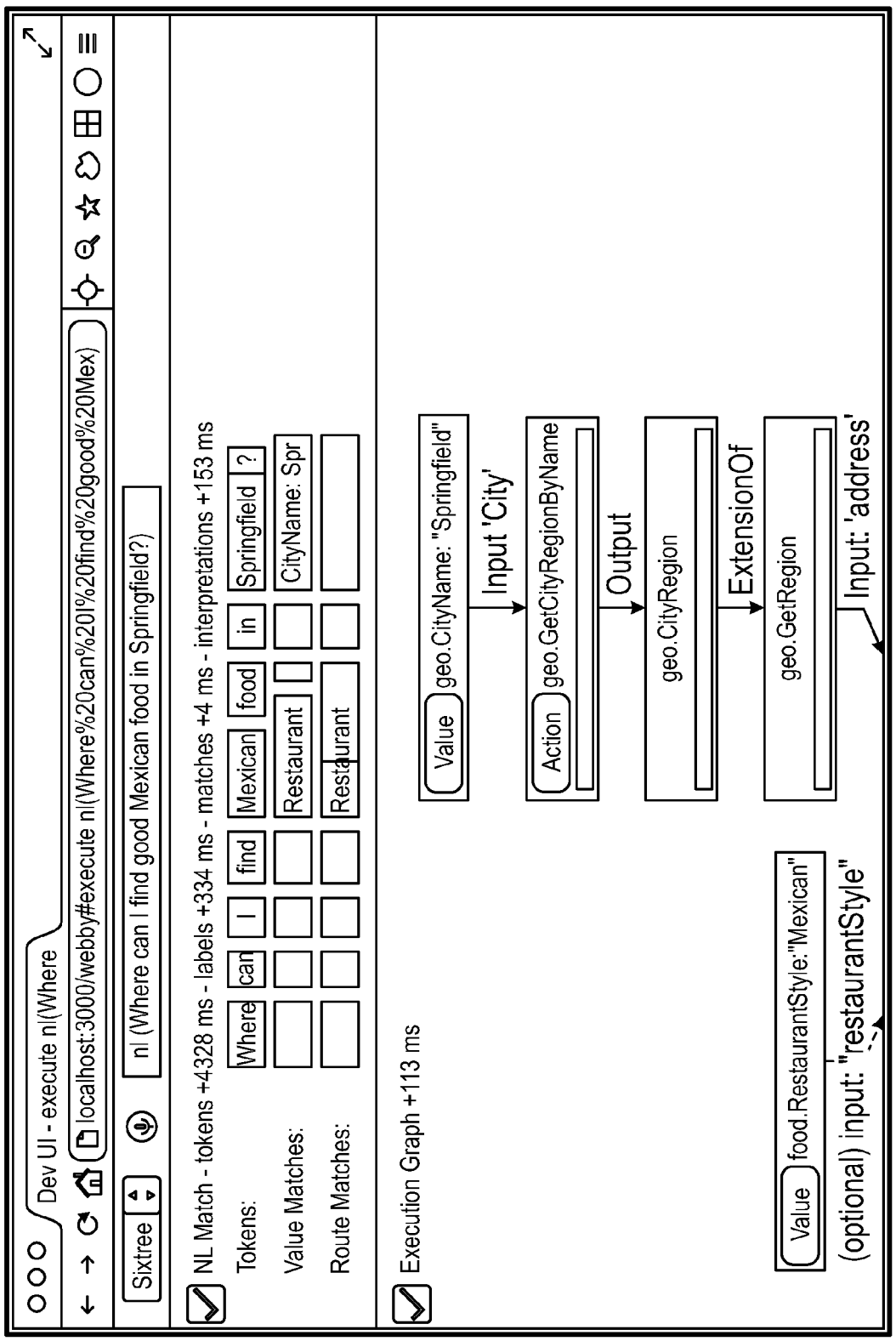
FIG. 25 illustrates a block diagram of yet a further example user interface for a dynamically evolving cognitive architecture system based on contributions from third-party developers, under an embodiment.

FIGS. 23A, 23B and 23C illustrate a block diagram of yet another example user interface for a dynamically evolving cognitive architecture system based on contributions from third-party developers, under an embodiment. FIG, 23 C depicts nodes that include the goal 2302, signals such as the inputs, in this case "Mexican", of type food.RestaurantStyle 2304, and actions with inputs and outputs that are concepts. Some concept nodes are choice points, which indicate that the given concept can be obtained in more than one way. The execution engine 252 processes the plan, walking the graph to verify inputs are obtained, and all required actions are performed, interacting with the user and calling functions that implement the actions within the plan. FIG. 24, which is described below, depicts an example interaction with the system 200 with an under the hood user interface that reveals to a developer the full natural language interpretations, the plan, and the execution of this request:

FIG. 24 illustrates a block diagram of a further example user interface for a dynamically evolving cognitive architecture system based on contributions from third-party developers, under an embodiment. The execution engine 252 has selected various function implementations for the action, and executed them, to yield results that system 200 renders for the user. In some cases, the system 200 can chose to fulfill the request immediately and provide results. In other cases, further interaction with the user may be necessary. FIG. 25, which is described below, depicts an example of a selection prompt based on the request "Where can I find good Mexican food in Springfield?" where the execution engine 252 observes, when executing the action that identifies geographic lookups by name, that the name Springfield returns many city names, and one city must be selected.

FIG. 25 illustrates a block diagram of yet a further example user interface for a dynamically evolving cognitive architecture system based on contributions from third-party developers, under an embodiment. FIG. 25 depicts that the user is prompted to specify which city of Springfield is desired.

In general, for more complex intents, the execution engine 252 has several responsibilities. These responsibilities include choosing routes, or ways that the goal in the plan can be fulfilled, and making choices at the choice points, finding input values needed for actions, either by interrupting the user, or by accessing values in other ways, such as from the user's profile, and selecting one or more functions appropriate to each step. These responsibilities include interrupting the user to request directions or additional detail, including route prompts that indicate what way a particular goal can be achieved, selection prompts that allow a user to select which input is appropriate, instantiation prompts that allow a user to provide a value for a concept, confirmation prompts that ask the user to confirm an action by a function, and authorization prompts that request the user to authorize access to resources on remote Internet sites. Authorization for a developer's function to access an external resource can be supported on the web with the commonly supported OAuth protocol. For example, the system 200 might ask "can developer X access your list of Facebook friends?" and provide a link where the user authorizes this access with Facebook®.

A key challenge to ensuring a good user experience during plan execution is that interruptions to the user should only be made when necessary, and that the system 200 should automatically act whenever possible. For example, if a user asks "Where are Mexican restaurants?" the action to find restaurants requires a geographic region. The execution engine 252 must determine whether to use the user's current location, and return results near them, or ask the user to identify a location. Similarly if the user requests "Book me a table at Shiva's at 7 pm," after system 200 determines all restaurants plausibly matching that name, the execution engine 252 must determine how the most likely match should be selected. And given a good candidate restaurant that matches the request, the system 200 must determine whether to use the candidate without confirmation when accessing a reservation service, or whether to ask the user to confirm the exact restaurant and location, since it could be wrong. The choice of what to do in such situations must be made by the system 200. However, the strategy for making choices can be very complex, so the decision process is extensible and easy to improve by contributors. In fact, the decision process is trainable via standard machine learning based approaches. Finally, contributors may offer new, complex recommendation strategies, or very specific information that is useful, depending on the situation, so the system 200 supports a wide variety of contributions to the decision process. In many situations during execution, the system 200 must make a type of decision that involves making a choice on how execution will proceed. Types of decisions include a route decision, a selection decision, and an instantiation decision. A route decision concerns how to pick a particular route through a plan graph. A route decision corresponds to a way to achieve the goal, such as in cases where the plan graph admits choices, which branch of the plan graph will be executed. A selection decision chooses among multiple possible values for an input of a given type, which is a bounded choice from a known set of options. An instantiation decision supplies a value of a given type, which is where a value is needed, but no candidates are available, so an instantiation decision is an open or unbounded choice.

For example, the correct city of Springfield must be chosen as a selection decision in response to the query "Where can I find good Mexican food in Springfield?" In response to the query "What are some Mexican restaurants near here?" the execution engine 252 must decide whether to prompt the user for geographic information, such as a city name, or to invoke the action that retrieves the current location, which is a route decision. An instantiation decision is required if a plan requires an email address or a geographic location, and no appropriate values are available. Each type of decision concerns the selection of a value, from an optional set of valid options. In the case of route decisions, the value is the node, or concept object, that defines that branch of the plan graph. In the case of selection decisions, the system 200 chooses the value from the known set of valid options, which are arising from earlier upstream results in plan execution, such as the output of an action object, or the retrieval of a set of values from a user's profile. For instantiation decisions, no set of valid options is available. A decision must either assert a value, that is, select it and use the value on behalf of the user, and proceed with execution, or prompt the user for the value. When prompting a user for a value, the system 200 may show a default value or other hints, such as a prioritized ranking of results, to the user, so that the user interface can highlight a selection, or prefill a form, or similarly make the prompt less burdensome for the user. A decision point is the state of execution at a point where the system 200 must make a decision, and corresponds to a node in the plan graph and possibly other decision context, which is additional information relevant to the execution, such as the user's locale, their geographic location, their preferences, etc. A decision set is a set of decision points, aggregated from plan graphs or fragments of plan graphs from one or more users.

The system 200 makes decisions based on pieces of executable code called advisors that provide information upon which the decision is made. An advisor's input is a current execution point and valid options, if present. A specific advisor may be applicable only to certain types of decision points, for example, for instantiating or selecting among a specific type, such as a specific advisor which only helps choose businesses. An advisor's output, or advice, is a set of zero or more values tagged with numeric weights, selected from the valid options, if applicable. The weights can signify a variety of things, and may be purely informational, reflecting an attribute or value of the value of interest, or may actually be offering a recommendation, by intending the weight to be a ranking, such as an ordering reflecting an estimated probability of the value being one the user will select. Advisors may be annotated by a developer with metadata indicating that the output is intended as a ranking. In some cases, such information can be used by machine learning systems, discussed below, to bootstrap more quickly.

Following are a few examples of possible advisors. Given an input of the type city, an advisor returns the population of the city. Given an input of the type city, an advisor returns a normalized score reflecting the notability of the city, optionally weighted by current geographic location. Given an input of the type restaurant, an advisor returns the rating of the restaurant based on a single third party service, such as Yelp@. Given an input of the type restaurant, an advisor returns a ranking of restaurants based on popularity and ratings from a variety of sources. Given a request for a restaurant, an advisor identifies the current decision point, factors in details that are available, such as if a cuisine type or a meal type is identified, as well as any stored user preferences, and, if suitable results are found, returns ranked recommendations for lunch, dinner, etc. Given an input of the type business, an advisor returns a "1" if a business is suitable for children, and a "0" otherwise. Given an input of the type address, and a context that includes profile information about the geographic areas the user commonly frequents, an advisor returns a score indicating how likely the user is to visit that address.

The purpose of advisors is not to make decisions directly, but to produce a broad and rich set of information and/or recommendations that then serves as input into the decision process of the system 200. Advisors can be added by system operators, or supplemented by contributors, by offering executable code or exposing web services. At a decision point, the system 200 assembles this advice and makes a weighted recommendation, which consists of a set of selected values with numeric weights, a prompt decision, such as, whether to assert a value or to prompt the user, and optionally a set of hints. The overall decision process of the system 200 may be as follows. The system accepts a user request, and converts the request to an intent and a plan. During execution, at every point where a decision is possible, the system 200 consults all applicable advisors and records their advice. At each decision point, the system 200 calculates a weighted recommendation based on advice. The system 200 uses the weighted recommendation to choose routes or select or instantiate values, prompting the user if appropriate. The system 200 uses the hints to adjust the user experience as desired. For cases where the system 200 prompts the user, the system 200 records the user's choice along with the decision point and all advice, and uses this record to improve future decisions.

The hints described above may include data on which selected values are good enough to be highlighted by the user interface, or spoken via voice, etc. Typically, it would consist simply of a recommendation threshold the value below which the values in the weighted recommendation are considered too uncertain to display to the user, unless the user indicates interest, such as by scrolling down or clicking on a button for more results. Calculating a weighted recommendation based on the advice is where the system 200 uses standard machine learning approaches to produce weighted recommendations. The decision training data includes manual training provided by contributors and/or the actual recorded user choices made during prompts. The features in this training data consist of the decision points and advice. Training may be performed manually, in processes similar to those described above, or via live training when the system 200 prompts the user. In the case of live training, regular user interaction provides opportunity to learn the best strategies to improve quality of user experience, in the absence of more explicit supervised training.

The system 200 may apply these techniques to personalization of user experience, where the system 200 uses machine learning to identify which strategies are preferred by a particular user, either by incorporating the user's feedback, making use of preference information stored for that user, or inferring a user's preferences based on the similarity of their known preferences to other users' preferences. Weighted recommendations may reflect a combination of personalized training and general training across many users, according to predefined methods or determined automatically by training with machine learning techniques, in order to provide the most satisfactory user experience.

When desiring to improve decisions, contributors or the platform operator can create new advisors at any time. In particular, the process for creating an advisor that makes recommendations is greatly facilitated by the existence of the decision training data. The system 200 may use this data, in full or aggregated or anonymized form, to evaluate an advisor's ranking outputs to determine if the advisor performs better than existing or past decisions, even before including the advisor in the system 200. In fact, for optimal performance in some cases, the system 200 can use specialized machine learning techniques to learn improved advisors from particular subsets of decision training data, or for certain types of decision points. In this way, advisors can be either simple or complex. The system operator or developers may simply provide informational advisors that expand the set of features over which the system 200 learns. But in addition, if desired, more advanced authors of advisors may use these more advanced techniques to produce high quality recommendations. If these high quality recommendations perform well, the recommendations achieve reliability within the system's learned decision process, effectively enabling the system 200 to augment the decision process in whichever manner best improves overall quality, without significant changes to the system's own logic.

Figure 26:
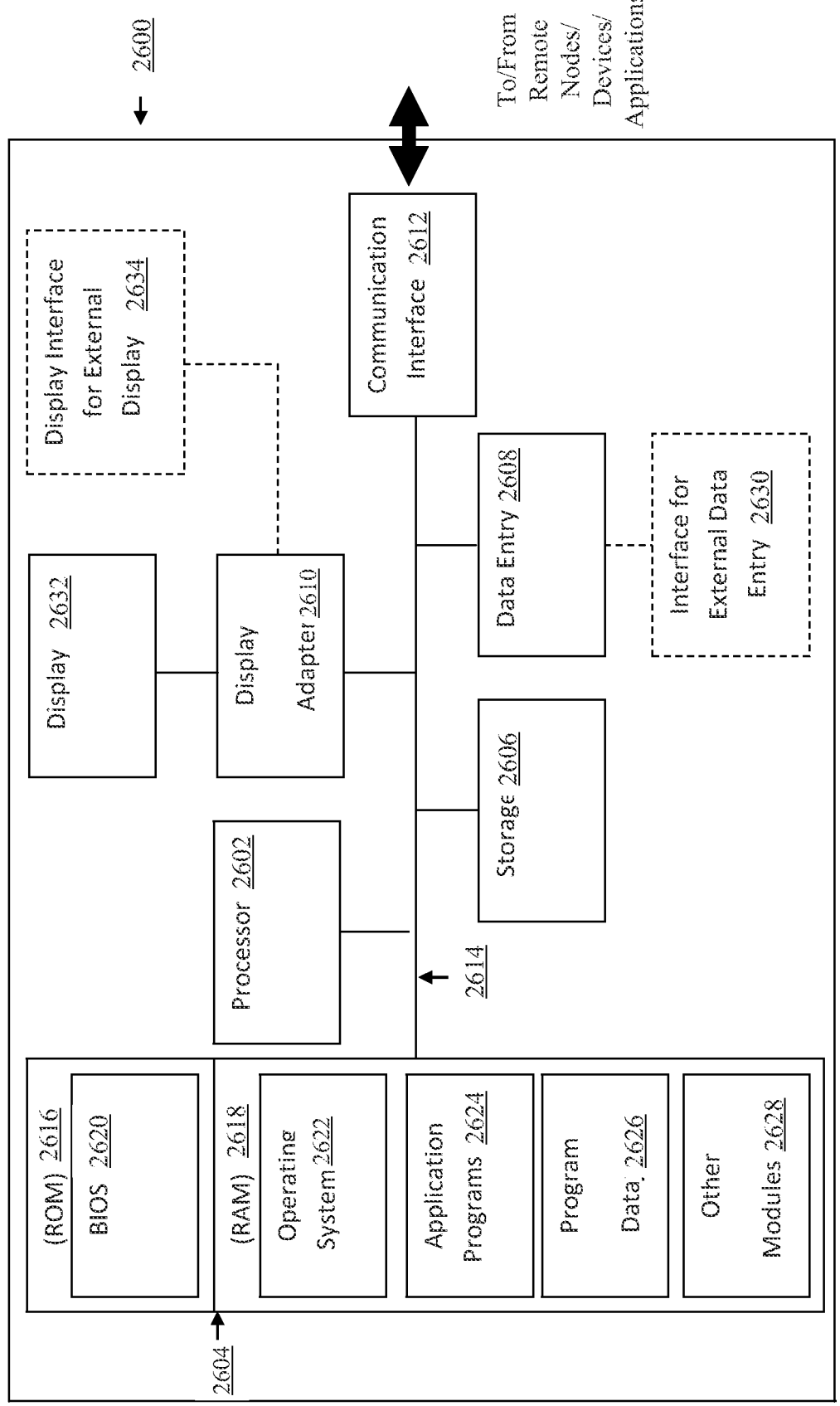
FIG. 26 is a block diagram illustrating an example hardware device in which the subject matter may be implemented.

An exemplary hardware device in which the subject matter may be implemented shall be described. Those of ordinary skill in the art will appreciate that the elements illustrated in FIG. 26 may vary depending on the system implementation. With reference to FIG. 26, an exemplary system for implementing the subject matter disclosed herein includes a hardware device 2600, including a processing unit 2602, a memory 2604, a storage 2606, a data entry module 2608, a display adapter 2610, a communication interface 2612, and a bus 2614 that couples elements 2604-2612 to the processing unit 2602.

The bus 2614 may comprise any type of bus architecture. Examples include a memory bus, a peripheral bus, a local bus, etc. The processing unit 2602 is an instruction execution machine, apparatus, or device and may comprise a microprocessor, a digital signal processor, a graphics processing unit, an application specific integrated circuit (ASIC), a field programmable gate array (FPGA), etc. The processing unit 2602 may be configured to execute program instructions stored in the memory 2604 and/or the storage 2606 and/or received via the data entry module 2608.

The memory 2604 may include a read only memory (ROM) 2616 and a random access memory (RAM) 2618. The memory 2604 may be configured to store program instructions and data during operation of the device 2600. In various embodiments, the memory 2604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 2604 may also include nonvolatile memory technologies such as nonvolatile flash RAM (NVRAM) or ROM. In some embodiments, it is contemplated that the memory 2604 may include a combination of technologies such as the foregoing, as well as other technologies not specifically mentioned. When the subject matter is implemented in a computer system, a basic input/output system (BIOS) 2620, containing the basic routines that help to transfer information between elements within the computer system, such as during start-up, is stored in the ROM 2616.

The storage 2606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 2600.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 2606, the ROM 2616 or the RAM 2618, including an operating system 2622, one or more applications programs 2624, program data 2626, and other program modules 2628. A user may enter commands and information into the hardware device 2600 through data entry module 2608. The data entry module 2608 may include mechanisms such as a keyboard, a touch screen, a pointing device, etc. Other external input devices (not shown) are connected to the hardware device 2600 via an external data entry interface 2630. By way of example and not limitation, external input devices may include a microphone, joystick, game pad, satellite dish, scanner, or the like. In some embodiments, external input devices may include video or audio input devices such as a video camera, a still camera, etc. The data entry module 2608 may be configured to receive input from one or more users of the device 2600 and to deliver such input to the processing unit 2602 and/or the memory 2604 via the bus 2614.

A display 2632 is also connected to the bus 2614 via the display adapter 2610. The display 2632 may be configured to display output of the device 2600 to one or more users. In some embodiments, a given device such as a touch screen, for example, may function as both the data entry module 2608 and the display 2632. External display devices may also be connected to the bus 2614 via the external display interface 2634. Other peripheral output devices, not shown, such as speakers and printers, may be connected to the hardware device 2600.

The hardware device 2600 may operate in a networked environment using logical connections to one or more remote nodes (not shown) via the communication interface 2612. The remote node may be another computer, a server, a router, a peer device or other common network node, and typically includes many or all of the elements described above relative to the hardware device 2600. The communication interface 2612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 2612 may include logic configured to support direct memory access (DMA) transfers between the memory 2604 and other devices.

In a networked environment, program modules depicted relative to the hardware device 2600, or portions thereof, may be stored in a remote storage device, such as, for example, on a server. It will be appreciated that other hardware and/or software to establish a communications link between the hardware device 2600 and other devices may be used.

It should be understood that the arrangement of the hardware device 2600 illustrated in FIG. 26 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 2600.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 26.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for a dynamically evolving cognitive architecture based on contributions from third party developers, the system comprising:
   one or more processors; and
   a non-transitory computer readable medium storing a plurality of instructions, which when executed, cause the one or more processors to:
   receive a span of natural language annotated with an object from a first third-party developer; and
   form an intent based on a user input, wherein the user input comprises a natural language span which corresponds to at least one of an action object, a first concept object, and a second concept object, wherein at least one of the action object, the first concept object, and the second concept object is provided by a second third-party developer, wherein the annotating object comprises one of the action object, the first concept object, and the second concept object, wherein forming the intent enables executing the action object to transform the first concept object into the second concept object based on the annotated span of natural language and outputting a value associated with the second concept object associated with a goal of the intent.

2. The system of claim 1, wherein receiving the span of natural language annotated with the object comprises receiving another span of natural language annotated with another object, wherein the other annotating object comprises a different one of the action object, the first concept object, and the second concept object, and wherein enabling execution of the action object transforms the first concept object into the second concept object based further on the other annotated span of natural language.

3. The system of claim 1, wherein the plurality of instructions, when executed, will further cause the one or more processors to output a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

4. The system of claim 1, wherein the plurality of instructions, when executed, will further cause the one or more processors to match a first object with a first span of natural language from the user input and a second object with a second span of natural language from the user input, wherein the first object comprises one of the first action object, the first concept object, and the third concept object, and wherein the second object comprises another one of the first action object, the first concept object, and the third concept object.

5. The system of claim 1, wherein the plurality of instructions, when executed, will further cause the one or more processors to provide compensation to at least one of the first third-party developer based on the annotating object and the second third-party developer based on at least one of the action object, the first concept object, and the second concept object provided by the second third-party developer.

6. The system of claim 5, wherein the compensation increases a likelihood of further use of at least one of the annotating object provided by the first third-party developer and at least one of the action object, the first concept object, and the second concept object provided by the second third-party developer.

7. The system of claim 5, wherein the compensation is based on a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

8. A computer-implemented method for a dynamically evolving cognitive architecture system based on contributions from third-party developers, the method comprising:
   receiving a span of natural language annotated with an object from a first third-party developer; and
   forming an intent based on a user input, wherein the user input comprises a natural language span which corresponds to at least one of an action object, a first concept object, and a second concept object, wherein at least one of the action object, the first concept object, and the second concept object is provided by a second third-party developer, wherein the annotating object comprises one of the action object, the first concept object, and the second concept object, wherein forming the intent enables executing the action object to transform the first concept object into the second concept object based on the annotated span of natural language and outputting a value associated with the second concept object associated with a goal of the intent.

9. The computer-implemented method of claim 8, wherein receiving the span of natural language annotated with the object comprises receiving another span of natural language annotated with another object, wherein the other annotating object comprises a different one of the action object, the first concept object, and the second concept object, and wherein enabling execution of the action object transforms the first concept object into the second concept object based further on the other annotated span of natural language.

10. The computer-implemented method of claim 8, wherein the method further comprises outputting a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

11. The computer-implemented method of claim 8, wherein the method further comprises matching a first object with a first span of natural language from the user input and a second object with a second span of natural language from the user input, wherein the first object comprises one of the first action object, the first concept object, and the third concept object, and wherein the second object comprises another one of the first action object, the first concept object, and the third concept object.

12. The computer-implemented method of claim 8, wherein the method further comprises providing compensation to at least one of the first third-party developer based on the annotating object and the second third-party developer based on at least one of the action object, the first concept object, and the second concept object provided by the second third-party developer.

13. The computer-implemented method of claim 12, wherein the compensation one of increases a likelihood of further use of at least one of the annotating object provided by the first third-party developer and at least one of the action object, the first concept object, and the second concept object provided by the second third-party developer, and is based on a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

14. A computer program product, comprising a non-transitory computer-readable medium having a computer-readable program code embodied therein to be executed by one or more processors, the program code including instructions to:
  receive a span of natural language annotated with an object from a first third-party developer; and
  form an intent based on a user input, wherein the user input comprises a natural language span which corresponds to at least one of an action object, a first concept object, and a second concept object, wherein at least one of the action object, the first concept object, and the second concept object is provided by a second third-party developer, wherein the annotating object comprises one of the action object, the first concept object, and the second concept object, wherein forming the intent enables executing the action object to transform the first concept object into the second concept object based on the annotated span of natural language and outputting a value associated with the second concept object associated with a goal of the intent.

15. The computer program product of claim 14, wherein receiving the span of natural language annotated with the object comprises receiving another span of natural language annotated with another object, wherein the other annotating object comprises a different one of the action object, the first concept object, and the second concept object, and wherein enabling execution of the action object transforms the first concept object into the second concept object based further on the other annotated span of natural language.

16. The computer program product of claim 14, wherein the program code further includes instructions to output a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

17. The computer program product of claim 14, wherein the program code further includes instructions to match a first object with a first span of natural language from the user input and a second object with a second span of natural language from the user input, wherein the first object comprises one of the first action object, the first concept object, and the third concept object, and wherein the second object comprises another one of the first action object, the first concept object, and the third concept object.

18. The computer program product of claim 14, wherein the program code further includes instructions to provide compensation to at least one of the first third-party developer based on the annotating object and the second third-party developer based on at least one of the action object, the first concept object, and the second concept object provided by the second third-party developer.

19. The computer program product of claim 18, wherein the compensation increases a likelihood of further use of at least one of the annotating object provided by the first third-party developer and at least one of the action object, the first concept object, and the second concept object provided by the second third-party developer.

20. The computer program product of claim 18, wherein the compensation is based on a comparison based on a confidence score associated with the span of natural language annotated by the annotating object and a confidence score associated with the span of natural language without annotation by the annotating object, wherein the comparison indicates an amount of training completion relative to the span of natural language annotated with the object from the first third-party developer.

* * * * *